United States Patent [19]

Bapat

[11] Patent Number: 5,295,256
[45] Date of Patent: * Mar. 15, 1994

[54] AUTOMATIC STORAGE OF PERSISTENT OBJECTS IN A RELATIONAL SCHEMA

[75] Inventor: Subodh Bapat, Fort Lauderdale, Fla.

[73] Assignee: Racal-Datacom, Inc., Sunrise, Fla.

[*] Notice: The portion of the term of this patent subsequent to Mar. 1, 2011 has been disclaimed.

[21] Appl. No.: 628,258

[22] Filed: Dec. 14, 1990

[51] Int. Cl.⁵ .................. G06F 7/20; G06F 15/40; G06F 15/419
[52] U.S. Cl. .................................. 395/500; 395/600
[58] Field of Search ............... 395/600, 500; 364/419

[56] References Cited

U.S. PATENT DOCUMENTS

| | | | |
|---|---|---|---|
| 4,930,071 | 5/1990 | Tou et al. | 395/600 |
| 5,133,075 | 7/1992 | Risch | 395/800 |
| 5,161,225 | 11/1992 | Abraham et al. | 395/600 |
| 5,181,162 | 1/1993 | Smith | 364/419 |

Primary Examiner—Parshotam S. Lall
Assistant Examiner—Ayni Mohamed
Attorney, Agent, or Firm—William A. Newton

[57] ABSTRACT

A translator for translating objects defined in an object-oriented programming environment to a relational database schema permits persistent storage of object instances as records in a relational database. Object instances are mapped to entity tables with object instances represented by entity records. Simple attributes are mapped to primitive typed attribute columns and class valued attributes are represented by foreign keys into entity attribute tables. Derived attributes are represented by joins of the parent and child entity records.

27 Claims, 38 Drawing Sheets

AUTOMATIC STORAGE OF PERSISTENT OBJECTS IN A RELATIONAL SCHEMA

CROSS REFERENCE TO RELATED APPLICATIONS

This application is related to a co-pending application, Ser. No. 07/628,120, filed Dec. 14, 1990, entitled "Automatic Storage of Persistent ASN.1 Objects in a Relational Schema" invented by the same inventor and filed simultaneously herewith. This co-pending application is hereby incorporated by reference.

BACKGROUND

1. Field of the Invention

This invention relates generally to a technique for storing object instances of an object-oriented programming language in a relational database schema. In particular, the present invention describes a method and apparatus for storing object instances in an object-oriented programming language such as C++ in a relational database using a language such as SQL (Structured Query Language), although the present invention should not be limited to these particular languages.

2. Background of the Invention

With the advent of object-oriented programming (OOP) languages, the software design paradigm has shifted such that computer systems executing a particular application are viewed as a collection of individual objects, which achieve the desired application function by exchanging messages among themselves. Object-oriented design and programming is described in *Object Oriented Design with Applications*, by Grady Booch, The Benjamin/Cummings Publishing Company, Inc., 1990. Often, it is necessary or desirable to store objects in some form of persistent storage, such as on a computer tape or disk. Most source-level languages that support object orientation do so only in memory, through the class concept. However, when it becomes necessary to store a persistent representation of objects, after the memory holding the in-core representation of the object has been relinquished by the application processes, there is in general no language support. No standard format has been defined for storage of persistent objects in, say, a disk file in an operating system.

This function is sought to be achieved by object-oriented databases, whose aim is to store persistent objects in a transportable format independent of both the underlying file system structure as well as the application's memory representation. However, object-oriented databases are currently an immature technology, and are not expected to reach maturity until some time after this writing. Accordingly, there exists a need to provide for a mechanism to provide persistent storage for objects in an OOP environment.

Relational database products currently represent a relatively mature and popular technology with which application developers have extensive familiarity. As object-oriented programming languages (such as C++ and Smalltalk) gain rapid acceptance and application development moves to object orientation, it is expected that there will be a demand for techniques to store persistent object definitions within the schema of a Relational Database Management System at least until the time when object-oriented database technology wins sufficient developer confidence to be used in a production environment and probably far beyond. In addition, many developers have substantial investments in relational database technology. Those who wish to move to object oriented applications may be able to preserve substantial portions of their development by utilizing relational database technology which is already developed.

The current invention addresses the need for such persistent storage in an object-oriented programming environment and defines an automatic mapping and an interface definition for this purpose, among other things. This allows for the easy storage of persistent representations of objects defined in source constructs of an object-oriented programming language, within the schema of a relational database. In addition to providing for persistent storage, the present invention provides a mechanism to make object-oriented data available for manipulation in relational database management environments by providing a translator function.

DEFINITION OF TERMS

Several of the terms used herein, while commonplace in relational database management environments or object oriented programming environments, may not be generally understood. General definitions of these terms are provided below. While it is not intended that the present invention be restricted by shortcomings in these definitions, it is believed helpful to provide these definitions as guidance to those unfamiliar with the terms. Those skilled in the art will understand that the present invention should only be limited by the conventionally understood meaning of these terms.

object—A real physical or abstract logical entity useful for a given application (e.g. "person").

instance—A specific realization of an object (e.g. "Groucho Marx").

object class—A template specifying the abstraction for a given set of objects having characteristics in common.

class construct—The representation of the template within the syntax of a programming language.

inheritance—The classification of classes themselves, allowing classes to be organized in a hierarchy from the most abstract to the most specific, such that the lower classes are specializations of the upper classes, possessing all of the attributes of the upper classes and defining some of their own.

filial relationship—The superclass/subclass relationship (also called a parent class/derived class relationship) along an inheritance hierarchy.

schema—The logical organization of the data structures within a database.

SUMMARY OF THE INVENTION

It is an object of the present invention to provide a method for providing persistent storage of an object in a relational database.

It is a feature that the present invention provides translation from object-oriented class hierarchy organization to relational schema organization.

It is an advantage that the present invention enables object oriented programmers to utilize relational database technology for persistent storage.

These and other objects, advantages and features of the invention will become apparent to those skilled in the art upon consideration of the following description of the invention.

In one embodiment of the present invention, a method for a computer to translate an object class hierarchy into a relational schema, includes the steps of: providing a class hierarchy of object-oriented information comprising at least one parent class having a first attribute and one derived class having a second attribute, the derived class inheriting the first attribute from the parent class; defining a first table structure, corresponding to the parent class, including a first table name, the first table structure including: a first instance identifier field for storing a first instance identifier which identifies a particular instance of the derived class, and a first field for storing instances of the first attribute, the first instance identifier field and the first field comprising a record of the first table structure; defining a second table structure, corresponding to the derived class, including a second table name, the second table structure including: a second instance identifier field for storing a second instance identifier which identifies a particular instance of the derived class, and a second field for storing instances of the second attribute, the second instance identifier field and the second field comprising a record of the second table structure; and referencing the second identifier field to the first identifier field.

According to another method for a computer to translate an object class hierarchy into a relational schema, comprising in combination the steps of: providing a class hierarchy of object-oriented information comprising at least one parent class having a first attribute and one derived class having a second attribute, the derived class inheriting the first attribute from the parent class; defining a table structure including a table name, the table structure having: an instance identifier field for storing an instance identifier which identifies a particular instance of the derived class, a first field for storing instances of the first attribute, and a second field for storing instances of the second attribute; whereby, the identifier field, the first field and the second field comprising a record of the table structure corresponding to an instance of the derived class.

An apparatus, according to the present invention, for translating information represented as an object-class hierarchy into a relational table schema includes a central processor and a computer memory, operatively coupled to the central processor, for temporary storage of information. A persistent storage media, operatively coupled to the central processor, is provided for storing information in a persistent manner. A relational database management system is stored on the persistent storage media. A program is stored in the computer memory means for representing data in an object class hierarchy. An access method is stored in the computer memory and is responsive to the program for manipulating a representation of the object class hierarchy stored in a relational table schema.

According to another embodiment, an apparatus for translating information represented as an object-class hierarchy into a relational table schema, includes a central processor and computer memory, operatively coupled to the central processor, for temporary storage of information. A persistent storage medea is operatively coupled to the central processor for storing information in a persistent manner. A relational database management system is stored on the persistent storage media. A program stored in the computer memory represents data in an object class hierarchy. A translator is stored in the computer memory, for translating the data represented in the object class hierarchy into a relational table schema.

The present invention provides a translator for translating objects defined in an object-oriented programming environment to a relational database schema permits persistent storage of object instances as records in a relational database. Object instances are mapped to entity tables with object instances represented by entity records. Simple attributes are mapped to primitive typed attribute columns and class valued attributes are represented by foreign keys into entity attribute tables. Derived attributes are represented by joins of the parent and child entity records.

The features of the invention believed to be novel are set forth with particularity in the appended claims. The invention itself however, both as to organization and method of operation, together with further objects and advantages thereof, may be best understood by reference to the following description taken in conjunction with the accompanying drawings and examples.

BRIEF DESCRIPTION OF THE DRAWING

FIGS. 18A and 18B, is a flow chart of step 264 of FIG. 13.

FIG. 21, which is divided into

FIG. 23, which is divided into

FIG. 29, which is divided into

DETAILED DESCRIPTION OF THE INVENTION

Figure 1:
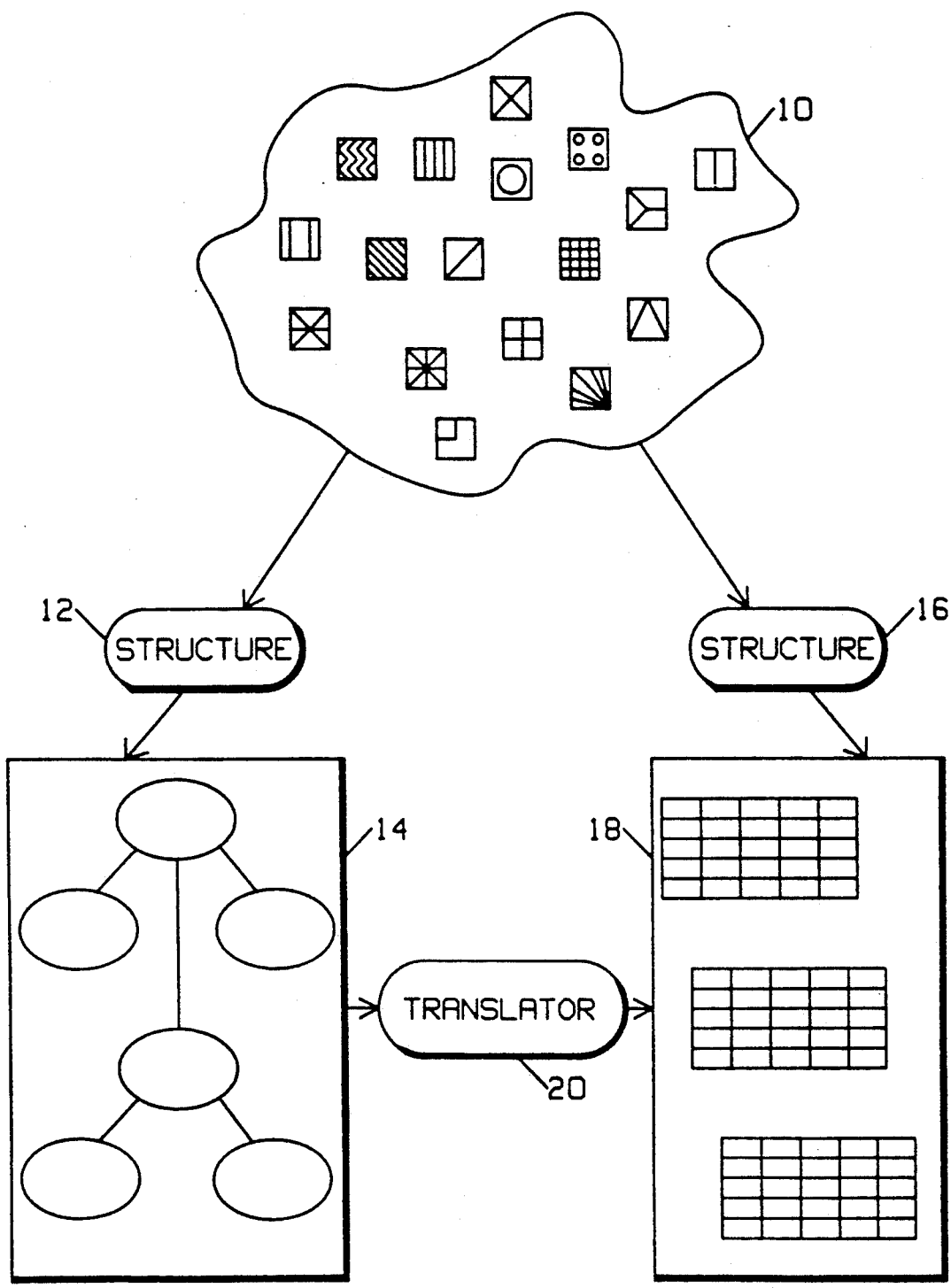
FIG. 1 illustrates the concept of the translator of the present invention.

The preferred embodiment of the present invention is implemented in the form of a translator which converts object-oriented representations of data into relational tables. This concept is illustrated in FIG. 1 which shows unstructured data 10 upon which structure may be imposed in either of two ways. When structure is imposed by process 12, an object class hierarchy organization 14 of the data results. When structure is imposed by process 14, a relational schema organization 18 results. The present invention bridges these two structured representations of data by providing a translator from a class hierarchy organization such as 14 to a relational schema organization such as 18 providing a mechanism for persistent storage of data using known relational database techniques.

The technique of the preferred embodiment of the present invention will be illustrated in examples with source constructs in C++, interfaced with relational database requests issued in standard SQL. However, this is not restrictive, as this technique can be used with any language supporting object orientation with any appropriate relational database. The C++ programming language is described, for example, in *C++ Primer*, by Stanley B. Lippman, Addison-Wesley Publishing Company, 1990. Standard SQL is described, for example, in *A Guide to the SQL Standard*, by C. J. Date, 2nd Ed., Addison Wesley, 1989.

The present invention will be described with the help of flow charts to describe the actual process, followed by C++ and SQL examples. All examples are from the realm of object modeling in a communications network. With the exception of occasional simplifications for conceptual clarity, all examples conform to object modeling guidelines proposed by various standards bodies. A basic familiarity with C++ is assumed.

Before proceeding with a discussion of the invention itself, it may be helpful to provide a brief discussion of the physical environment associated with the sample code, that is a communication network. Such a communication network may be made up of many physical devices such as modems, digital service units (DSU's), terminals, computers, multiplexers and such equipment coupled together via, for example, telephone lines, fiber optic channels, satellite links, etc. A typical example of such a network is an airline reservation system where numerous terminals (at airports, travel agencies, airline reservation offices, etc.) communicate with a central computer to access reservation information, flight schedules, seat assignments, etc. In such networks, there is typically a network management function which is used to monitor the network and determine the cause of any malfunction. In these environments, it is often critical to operation of the business to have the system fully operational nearly 100% of the time. Network management functions are used to quickly isolate problems and possibly reroute data traffic to circumvent problems.

As part of the data communication network management system, a database containing various attributes of all physical objects (e.g. modems, DSU's, multiplexers, etc.) is usually maintained to facilitate the above functions. In order to utilize OOP techniques in the network management function, it is desirable to be able to provide persistent storage of the attributes of these objects managed by the network management system. With this background on the physical characteristics of the environment used for the examples, we can proceed with a discussion of the invention itself.

Figure 2:
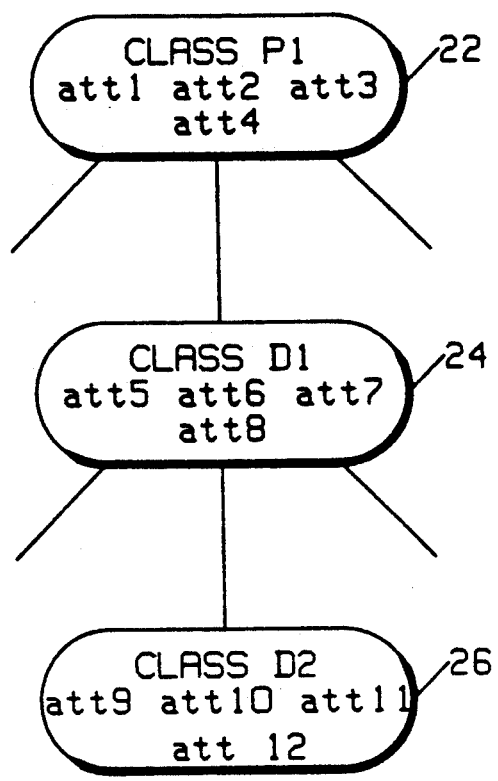
FIG. 2 shows a class hierarchy structure which is translated into the relational table structure of FIG. 3.

In C++, as well as other implementations of OOP, objects are represented using the class construct. A simple graphic example is shown in FIG. 2. A parent class 22 (designated P1) may have several attributes associated with it, for example attributes shown as att1, att2, att3 and att4. Such attributes might represent any physical attribute being manipulated by the program (e.g. temperature, color, size, manufacturer, modem speed, service contract number, etc. etc.). A derived class 24 (designated D1) inherits the attributes of parent class 22 and, in addition, derived class 24 has its own attributes designated att5, att6, att7 and att8. Similarly, derived class 26 (designated D2) inherits attributes att1 through att8 from derived class 24 and parent class 22 and contributes its own attributes att9, att10, att11 and att12. An instance of derived class 26, therefore, includes all attributes att1 through att12 which fully define the object instance for purposes of the system at hand. This graphic example can be constructed using OOP languages such as C++ to define the hierarchical relationship shown in FIG. 2.

Figure 3:
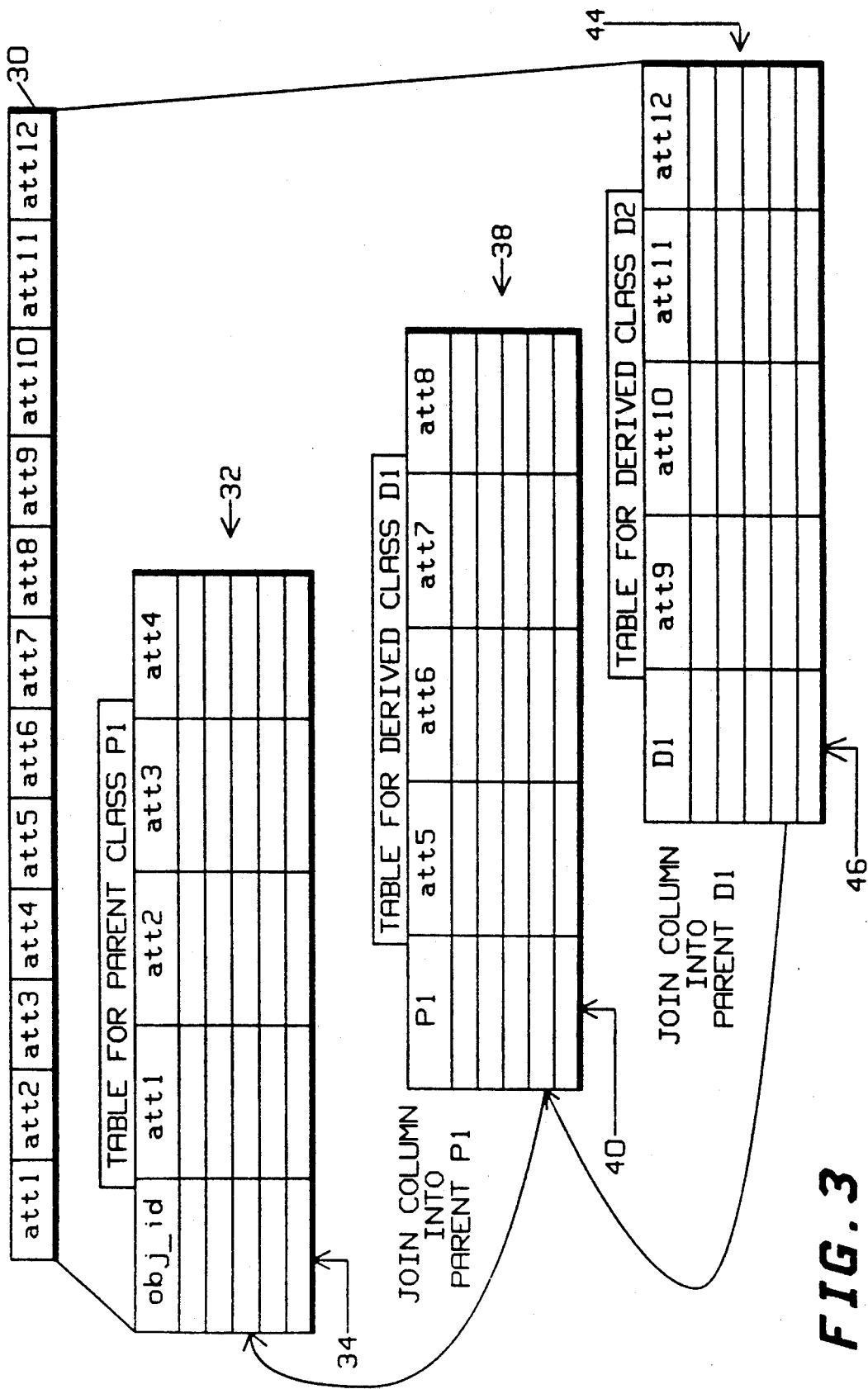
FIG. 3 shows a relational table structure representing the simple class hierarchy structure of FIG. 2.

The present invention provides a mechanism for mapping this hierarchical schema into a relational table schema. Consider, for example, FIG. 3 in which an instance of derived class 26 is represented as a list of attributes 30. This list of attributes represents the form of information that a user of the system is interested in as a characterization of the instance of an object in class 26. Parent class 22 is mapped to a table 32 which is named after the class name (P1) and which has four field columns defined for attributes att1 through att4. A fifth column 34 is defined to carry an object identifier (obj_id) which may be generated by the translator 20. Records of this table (rows) are used to carry instances of all objects of class 22.

In a similar manner, a table 38 is constructed representing derived class 24. Table 38 is named D1 after the class 24 and includes field columns for attributes att5 through att8. In addition, a field column 40 is named P1 after the parent class above class 24 in the hierarchy. In the preferred embodiment, this field contains the same object identifier (obj_id) as that used in table 32.

A third table 44 is constructed to represent derived class 26. Table 44 is named D2 after the name of class 26 and has four field columns representing attributes att9 through att12. A fifth column is named after the parent table or class as D1 and carries the same object identifier as those carried by tables 32 and 38 in the preferred embodiment. The three tables can be queried to extract a particular instance of class 26 by using, for example, a "JOIN" operator from SQL to find all attributes in records having the same object identifier in fields obj_id of table P1, field P1 of table D1 and field D1 of table D2.

Figure 4:
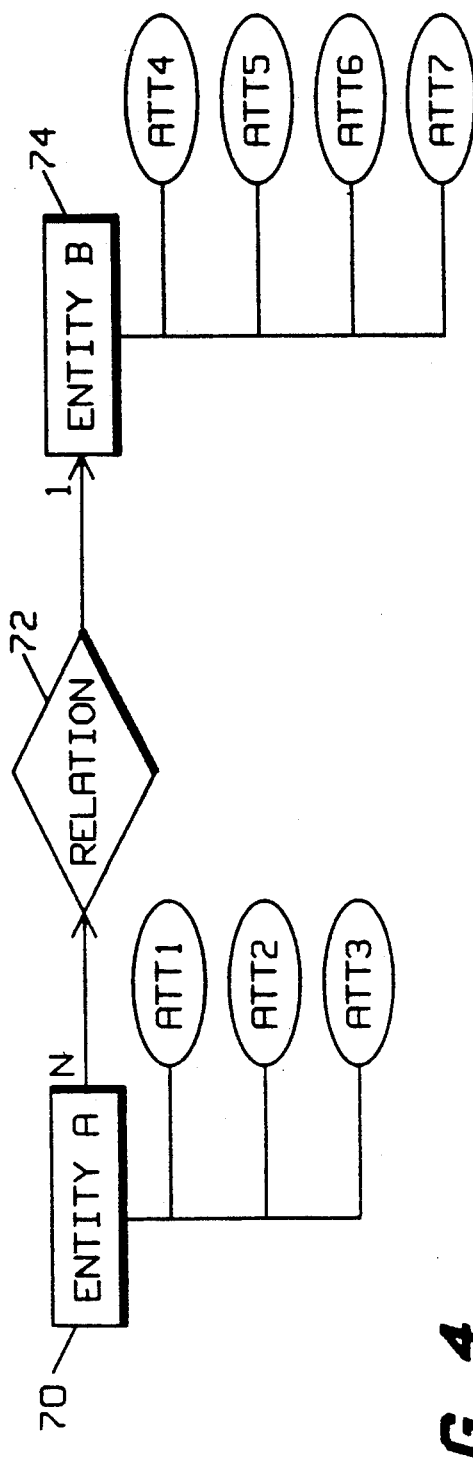
FIG. 4 shows an entity relationship diagram for an inter-class relationship.
Figure 5:
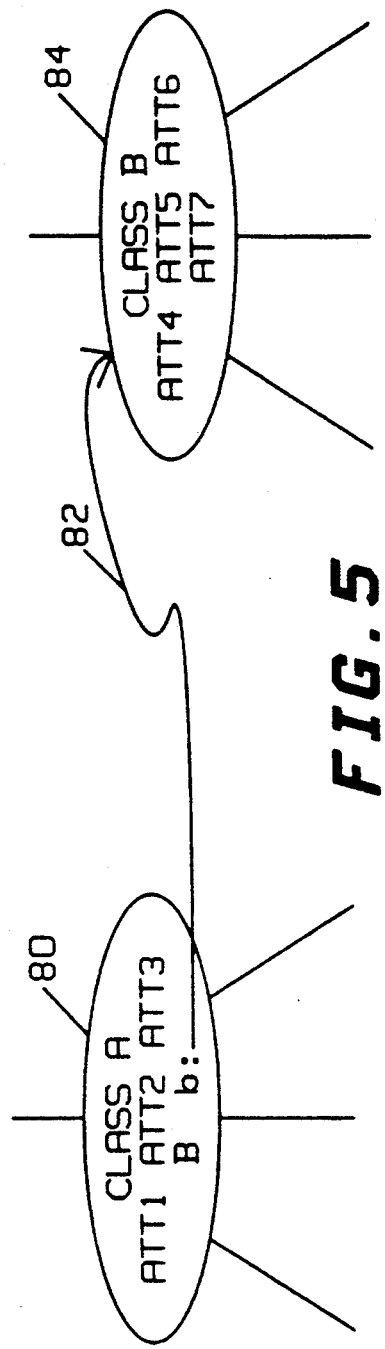
FIG. 5 shows a class schema for the inter-class relationship of FIG. 4.

In order to properly model some real life relationships in a class hierarchy, it is sometimes impossible to impose a strict hierarchical relationship upon the information. Consider for example the entity relationship shown in the entity relationship model of FIG. 4. (Entity relationship models are described, for example, in *Database Modeling and Design: The Entity—Relationship Approach* by Toby J. Teorey (University of Michigan Press, 1990) which is incorporated by reference herein.) In this example, an entity 70 has three attributes attr1 through attr3 and is linked through a relation 72 to entity 74 which has four attributes attr4, attr5, attr6 and attr7. Many other entities may also be linked to entity 74 through similar relationships. Thus, this is considered a many to one (or N to 1) relationship as designated by the N and the 1 adjacent the arrows. This relationship can be represented by the class schema of FIG. 5 wherein class 80 is linked via a relationship 82 to class 84.

For Example: Entity B could be an instance of a PBX object having a "CONNECTED TO" relationship with, say, several different instances of T1 Multiplexer objects. This connectivity relationship is not hierarchical in the object-oriented sense, since a T1 multiplexer does not inherit attributes from a PBX, or vice versa. However, it does need to be modeled. Since this is a many-to-one relationship, it can be modeled by having, for example, a "next-neighbor" attribute in class A (i.e. "T1 Multiplexer") whose value is set to the instance of the PBX (i.e. instance of Class B) which it is connected to.

Figure 6:
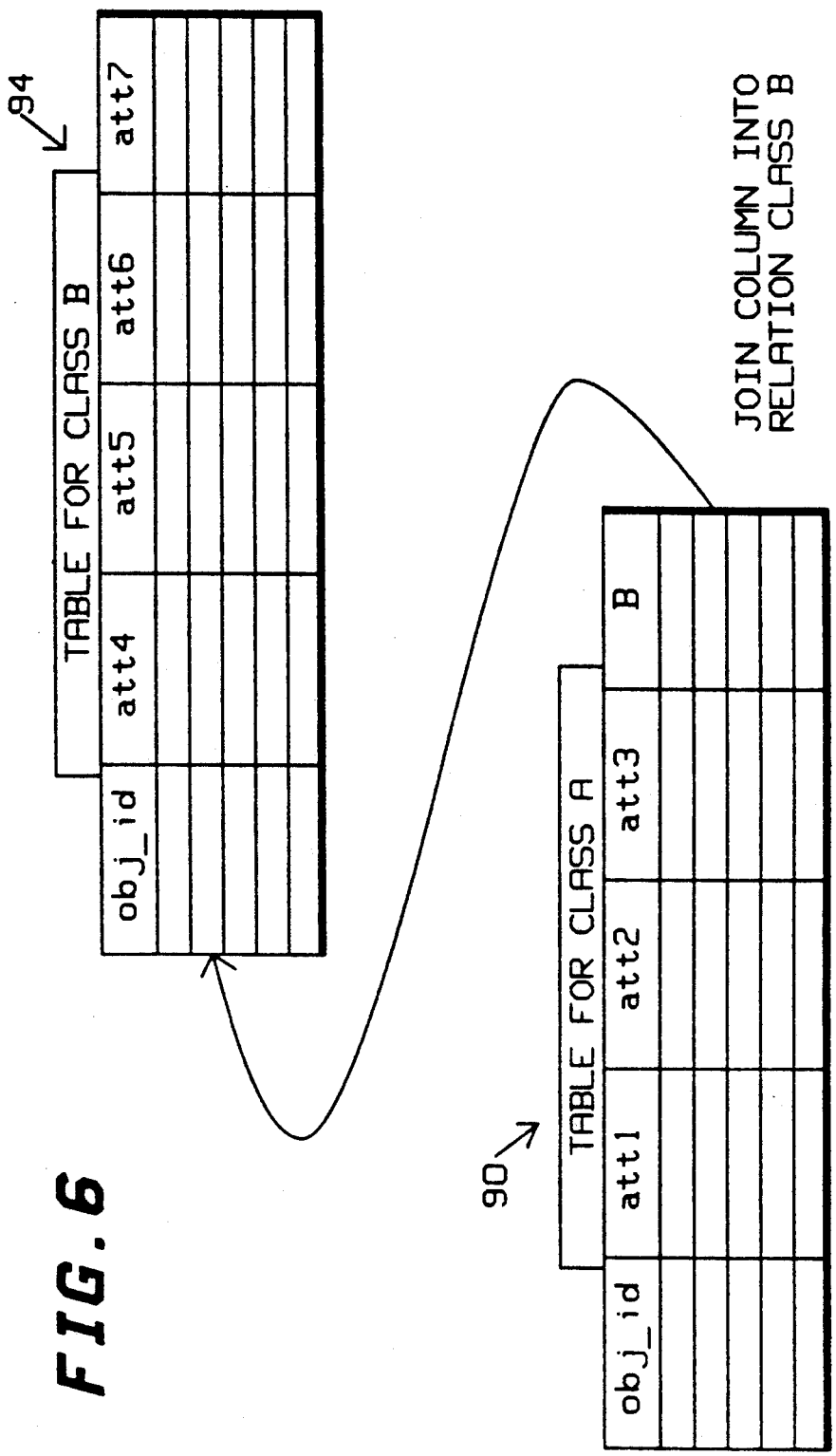
FIG. 6 shows a mapping of the class schema of FIG. 5 to a relational table schema.

This class hierarchy schema can be mapped to a pair of tables as shown in FIG. 6. In this example, class 80 maps to a table 90 and class 84 maps to a table 94 in a manner similar to that described above. In this case, both tables also include a field column for an object identifier obj_id. In addition, table 90 also includes a field column B which is used to relate the values in table 90 with the records in table 94.

Figure 7:
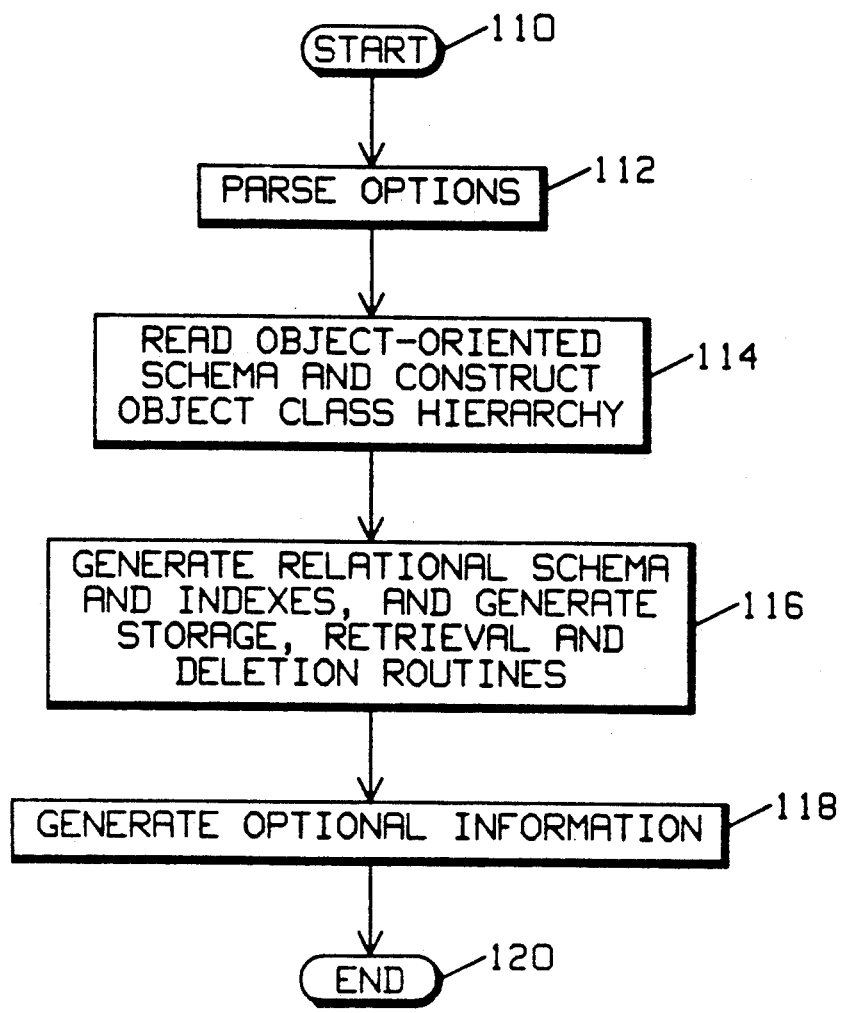
FIG. 7 shows a flow chart of the overall operation of the present translator.

FIG. 7 shows a high level flow chart of the overall translation process implemented by the present invention according to the preferred embodiment starting at step 110. In this embodiment, the translator can operate in a number of ways as determined by user selection of various user options shown as step 112 and described more fully in connection with FIG. 8. Step 112 parses the user options and next the translator reads the object-oriented schema and constructs an object class hierarchy at step 114. Next, the translator generates relational schema and indexes, and also generates the SQL storage, retrieval and deletion routines used to maintain the tables. Optional information is then generated at step 118 and the translator terminates operation at 120. The flow charts to follow provide greater detail of the operation of the process of the preferred embodiment.

Figure 8:
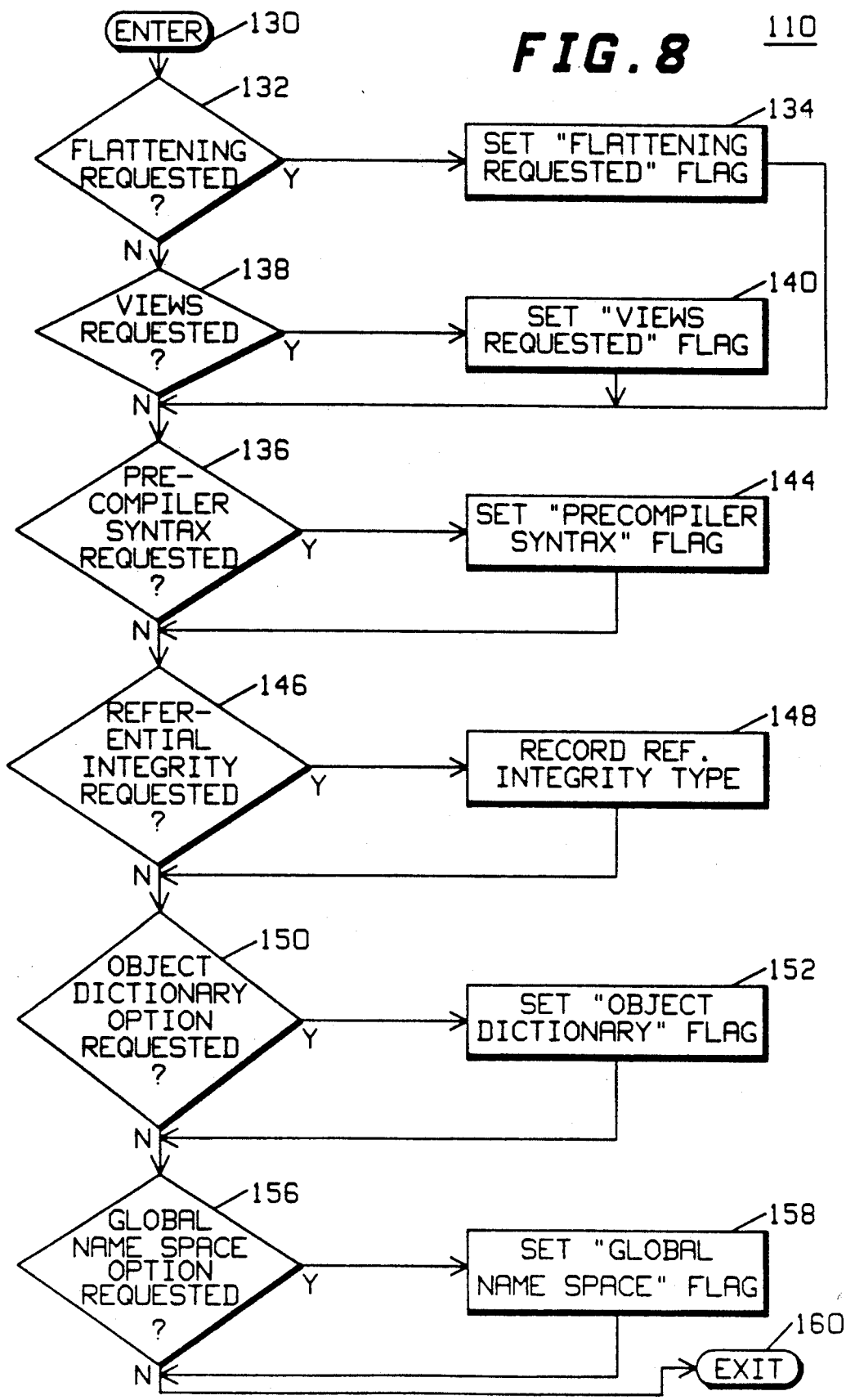
FIG. 8 is a flow chart of the process of parsing options selectable by the user in step 110 of FIG. 7.

Referring now to FIG. 8, the options selectable by the user in step 112 are described in more detail beginning with entry into routine at step 130. At step 132 it is determined whether the user has requested that the tables be flattened. Flattening of the tables can only be accomplished if all instances of the objects are on the leaf level. Otherwise, problems may be encountered at run time.

If flattening has been requested at step 132, the "flattening requested" flag is set at step 134. Control then passes from step 134 to 136. If flattening is not requested at step 132, control passes to step 138 where the translator determines whether or not views have been requested. With the views option, tables appear to be flattened to the user. If views have been requested at 138, the "views requested" flag is set at step 140 and control also passes to step 136.

When the SQL routines are generated to store, retrieve and delete object instances, there are two possible ways of embedding the SQL syntax. The first technique is use of the precompiler syntax option which the translator examines at step 136. In this option, the generated SQL code is embedded directly within the host language, delimited by special tokens. This source code is passed through a special SQL precompiler which translates the SQL sections into function calls native to the host language, thus allowing the entire source to be compiled by the host language compiler. The second technique is the function call technique which will be selected by default if the user does not select the precompiler syntax option at step 136. In function call syntax, the generated SQL code is embedded within character strings which are passed as arguments to function calls in the native host language, thus avoiding the need for a SQL Precompiler. If the precompiler syntax option is selected at 136, the "precompiler syntax" flag is set at 144. In either event control then passes to step 146.

Step 146 determines which type of referential integrity checking is desired by the user (weak, strong or none). If referential integrity is requested at 146, it is determined at step 148 whether weak or strong is desired and control then passes to 150. If no referential integrity is requested at 146, this is recorded and control passes to step 150.

At step 150 the translator determines whether or not the object dictionary option has been requested. In this option a set of tables which describe the schema itself are generated. If so, the "object dictionary" flag is set at step 152 and control then passes to step 156, whether or not object dictionary option has been requested. Step 156 determines whether or not the user intends that object identifiers are to be considered globally unique or locally unique. If they are to be considered globally unique, the "global name space" flag is set at step 158 and in either event control passes to step 160 which exits the parse options routine 112.

Figure 9:
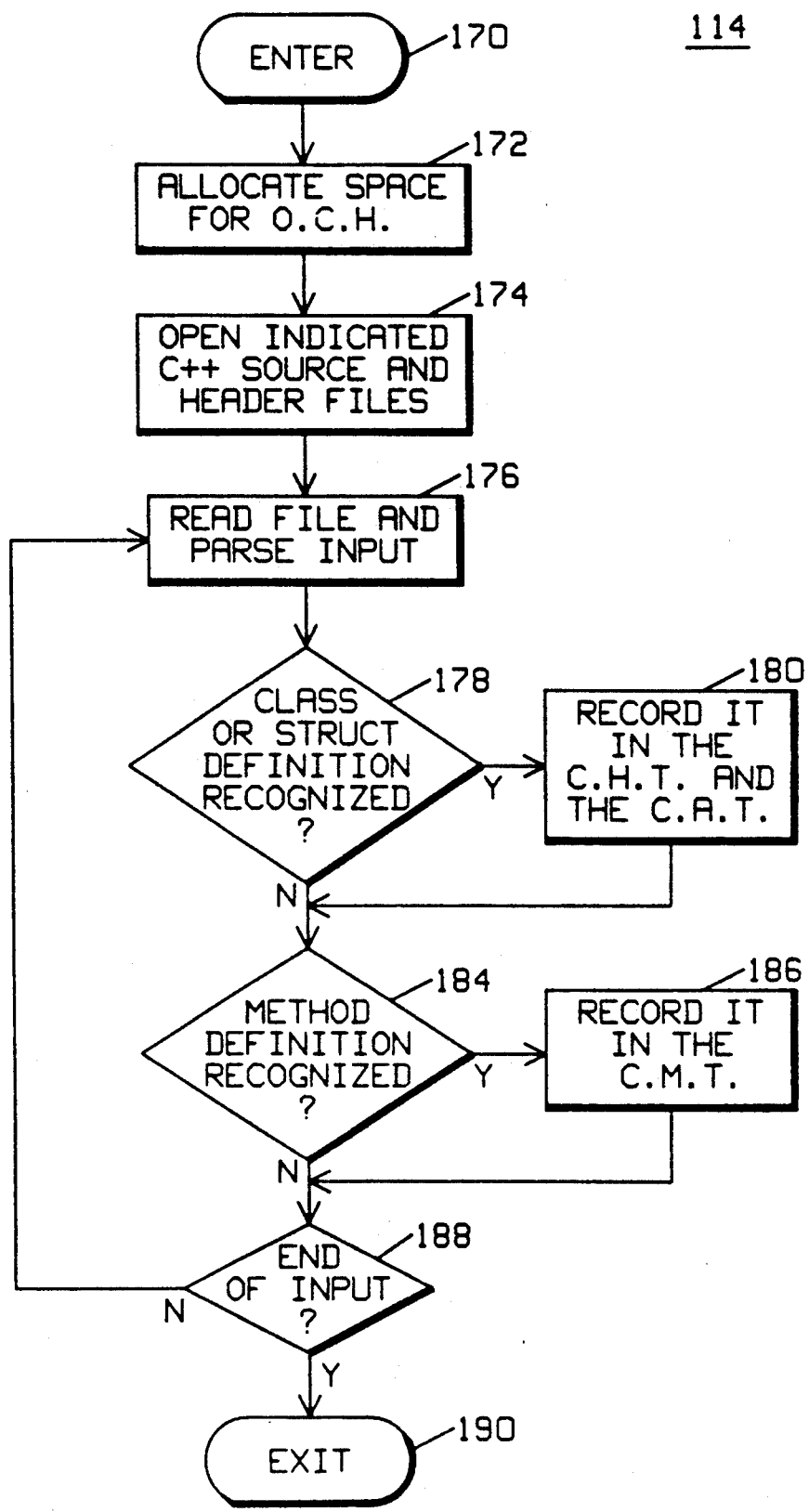
FIG. 9 is a flow chart of step 114 of FIG. 7.

Step 114 of FIG. 7 is described in greater detail in FIG. 9 starting at step 170 after which space is allocated for the object class hierarchy (O.C.H.) at step 172. Step 172 can allocate space for the object class hierarchy either on disk, in memory or a combination of both.

Next, at step 174, the indicated C++ source and header files are opened. At step 176 the input from the files are read and control passes to step 178 where it is determined whether or not a class or a struct definition is recognized. If either of these is recognized, the struct or the class is recorded in the class hierarchy table (C.H.T.) and the class attribute table (C.A.T.). Control then passes to step 184. If not, control passes to step 184 bypassing step 180.

At step 184 it is determined whether or not a method definition has been recognized. If so, the method definition is recorded in the class method table (C.M.T.) and control passes to step 188. If no method definition has been recognized at step 184, control passes directly to step 188 bypassing step 186. Step 188 determines whether or not the end of the input has been reached. If not, control passes back to step 176 where the next file is read. If so, control passes to step 190 which exits the routine.

Figure 10:
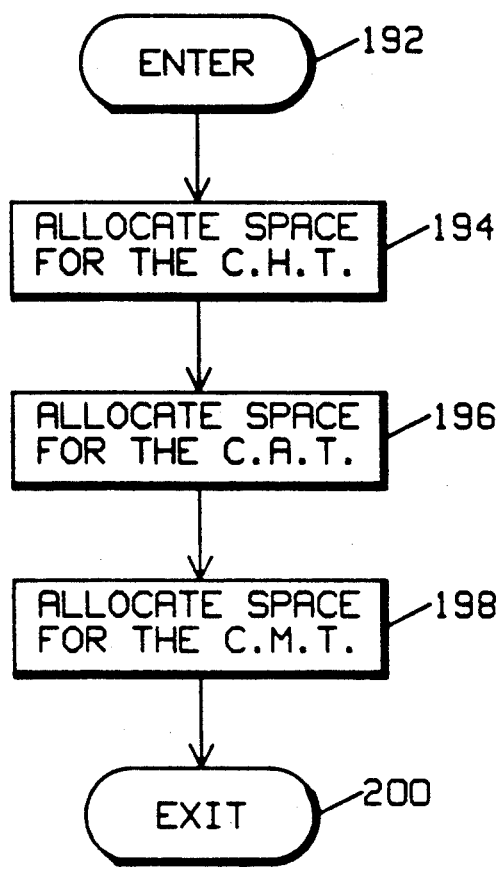
FIG. 10 is a flow chart of the step of allocating space for the object class hierarchy of step 172 of FIG. 9.

Referring to FIG. 10, the step of allocating space for the object class hierarchy of step 172 of FIG. 9 is described in more detail. The routine is entered at step 192 after which space is allocated for the class hierarchy table at step 194. Next space is allocated for the class attribute table at step 196 followed by allocation of space for the class method table at step 198. The routine then exits at step 200. The steps of FIG. 10 can be executed in any order desired or convenient using any suitable known storage allocation technology without departing from the present invention.

Figure 11:
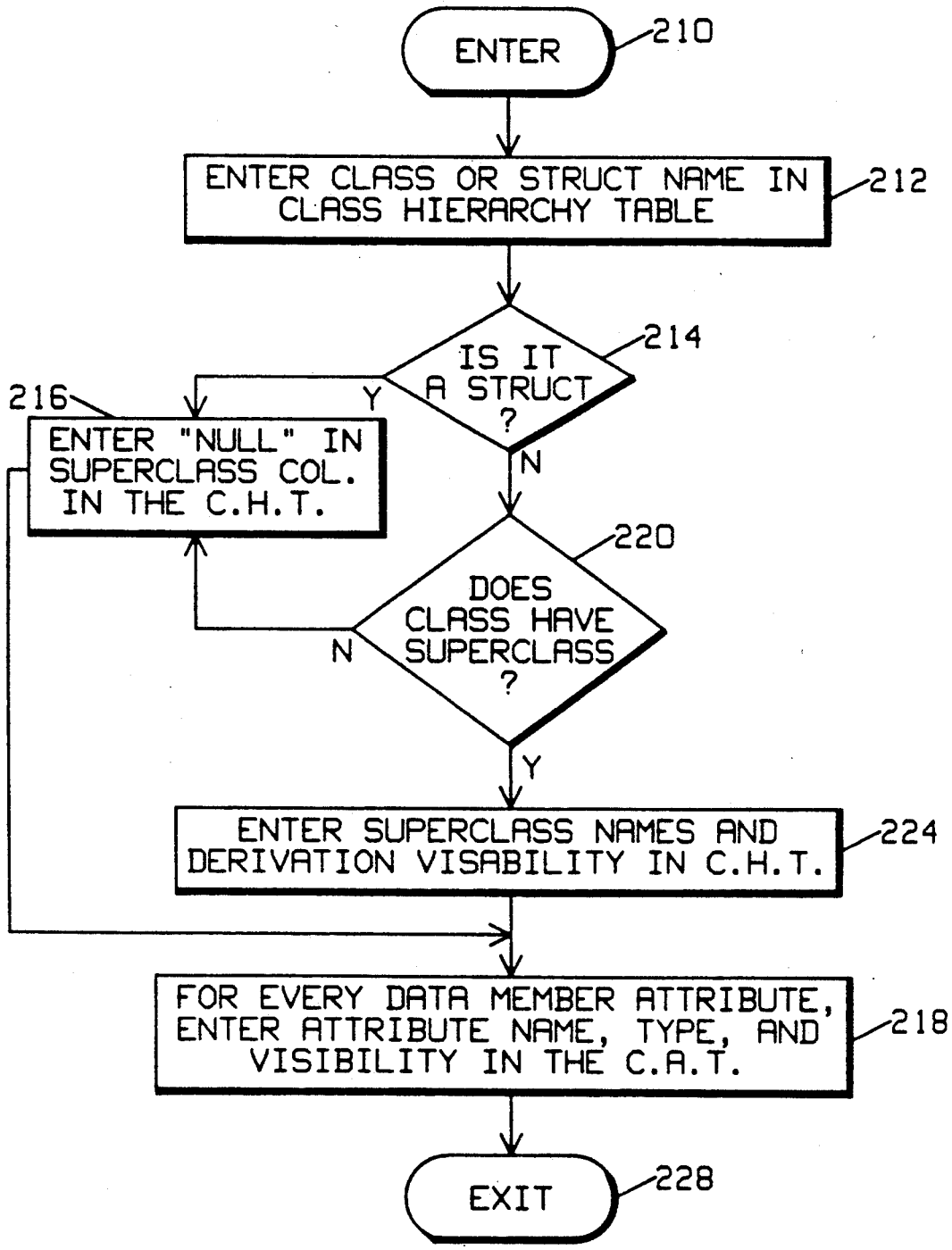
FIG. 11 is a flow chart of step 180 of FIG. 9.

Step 180 of FIG. 9 is described in more detail in conjunction with the description of FIG. 11. Since a struct is not part of the hierarchy, it does not have a superclass or derived classes. However, it is recorded in the tables in a manner similar to that of a class. This routine begins at step 210 after which the class or struct name is entered in the class hierarchy table at step 212. At step 214 it is determined whether or not the current template is a struct. If it is, control passes to step 216 where "NULL" is entered in the superclass column in the class hierarchy table. Control then passes to step 218 from step 216. If it is not a struct, control passes from step 214 to step 220 where it is determined whether or not the struct has a superclass. If not, control similarly passes to step 216. If so, the superclass names and derivation visibility are entered into the class hierarchy table at step 224. Control then passes from step 224 to step 218. At step 218 for each member attribute the attributes name, type and visibility are entered into the class attribute table after which the routine exits at step 228.

Figure 12:
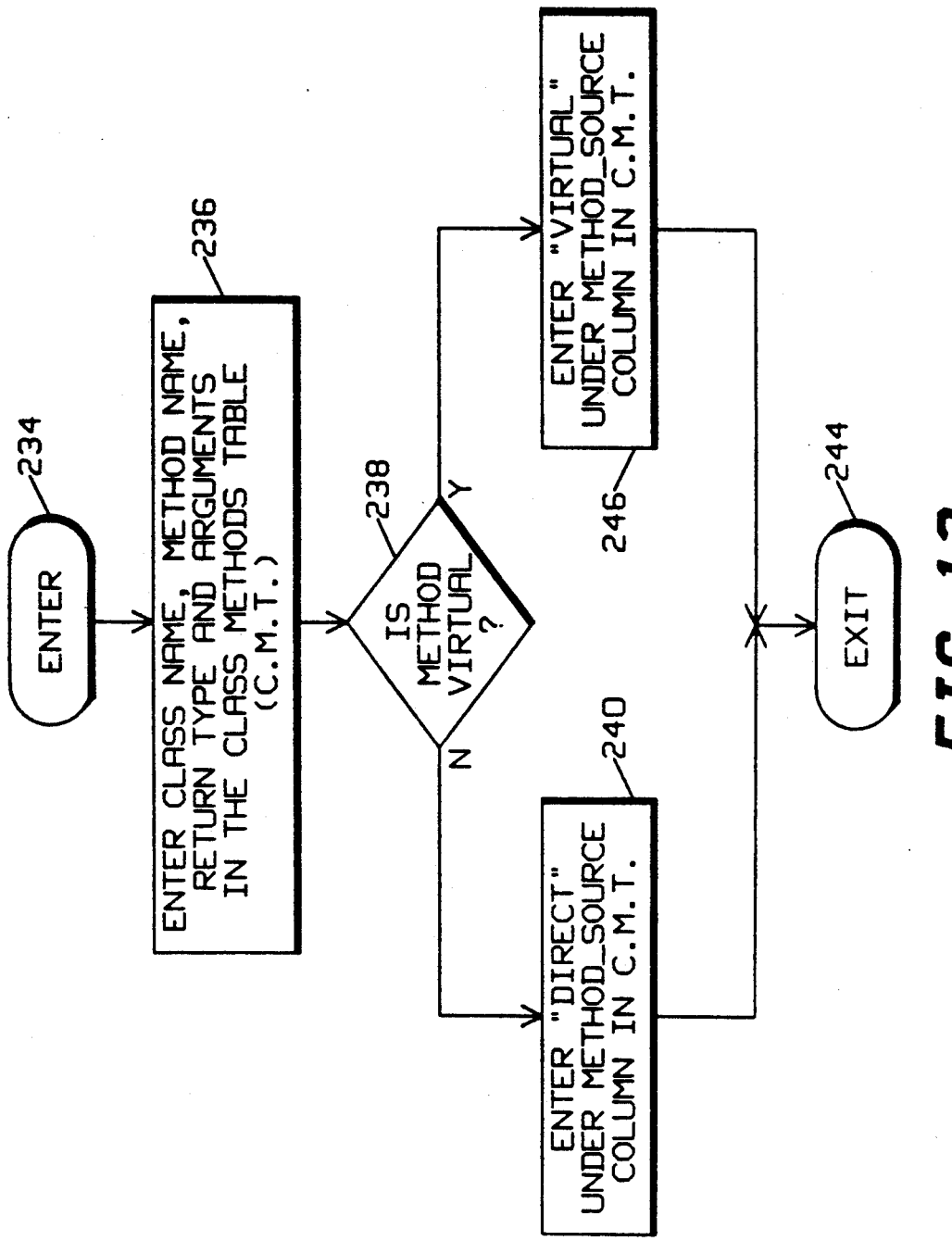
FIG. 12 is a flow chart of step 186 of FIG. 9.

The process used by step 186 of FIG. 9 is described in greater detail in connection with FIG. 12. The routine is entered at step 234 followed by entry of class name, method name, return type and arguments in the class methods table at step 236. Control then passes to step 238 where it is determined whether or not the method is virtual. A virtual method is a method that gets redefined later by a derived class. If the method is not virtual the value "direct" is entered under the method source column in the class method table at step 240. The routine is then exited at step 244. If the method is virtual at step 238, control passes to 246 where "virtual" is entered under the method_source column in the class method table. The routine is then exited at step 244.

At this point the object class hierarchy has been recorded in the desired format and the translational phase is ready to proceed to generate the relational schema.

Figure 13:
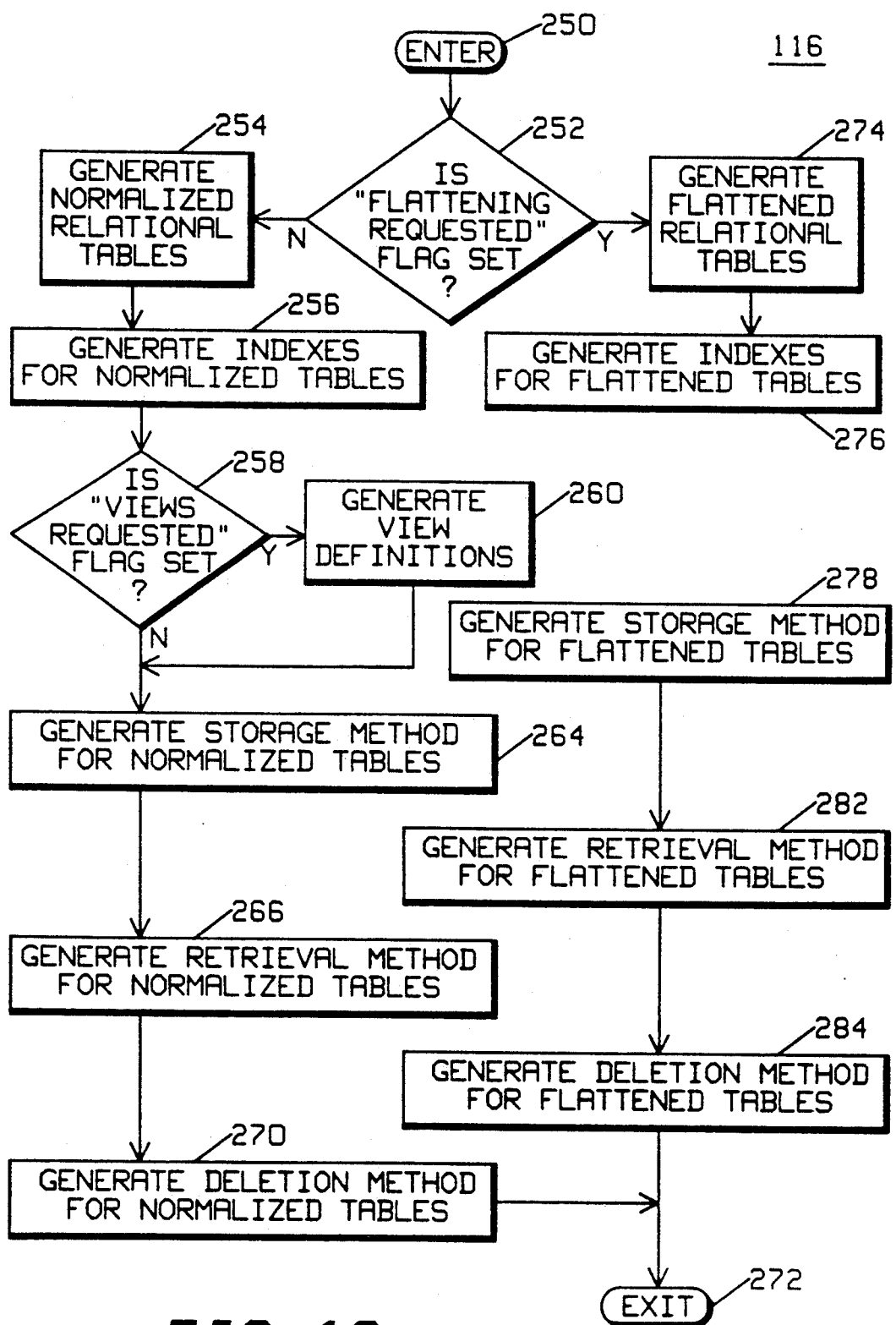
FIG. 13 is a flow chart of the overall operation of step 116 of FIG. 7.

Consider now FIG. 13 which describes the overall operation of the translation phase of step 116 of FIG. 7 beginning at entry of the routine at step 250. At step 252 the translator determines whether or not the "flatting requested" flag is set. If not, the normalized relational tables are generated at step 254 followed by generation of indexes for normalized tables at step 256. At step 258 the translator determines whether or not the "views requested" flag is set. If so, control passes to step 260 which generates the view definitions.

Control then passes to step 264 whether or not the "views requested" flag is set. At step 264 the methods used for storing instances in normalized tables are generated followed by generation of the methods for retrieval of object instances from the normalized tables at step 266. Next the translator generates methods for deletion of object instances from the normalized tables at step 270 and the routines exits at step 272. The order of operation of steps 264, 266 and 270 is not important to the operation of the present invention.

If the "flattening requested" flag is set at step 252, flattened relational tables are generated at step 274 followed by generation of indexes for flattened tables at step 276. Control then passes to step 278 where storage methods are generated for flattened tables. Next retrieval methods are generated for flattened tables at step 282 and deletion methods are generated for flattened tables at step 284 followed by exiting the routine at step 272 as with normalized tables, the order of the methods outlined in steps 278, 282 and 284 is unimportant to the present invention.

Step 116 and its associated expanded process as described in FIG. 13 is at the heart of the actual translation of the present invention. The major steps of FIG. 13 are described in greater detail in the following figures.

Figure 14:
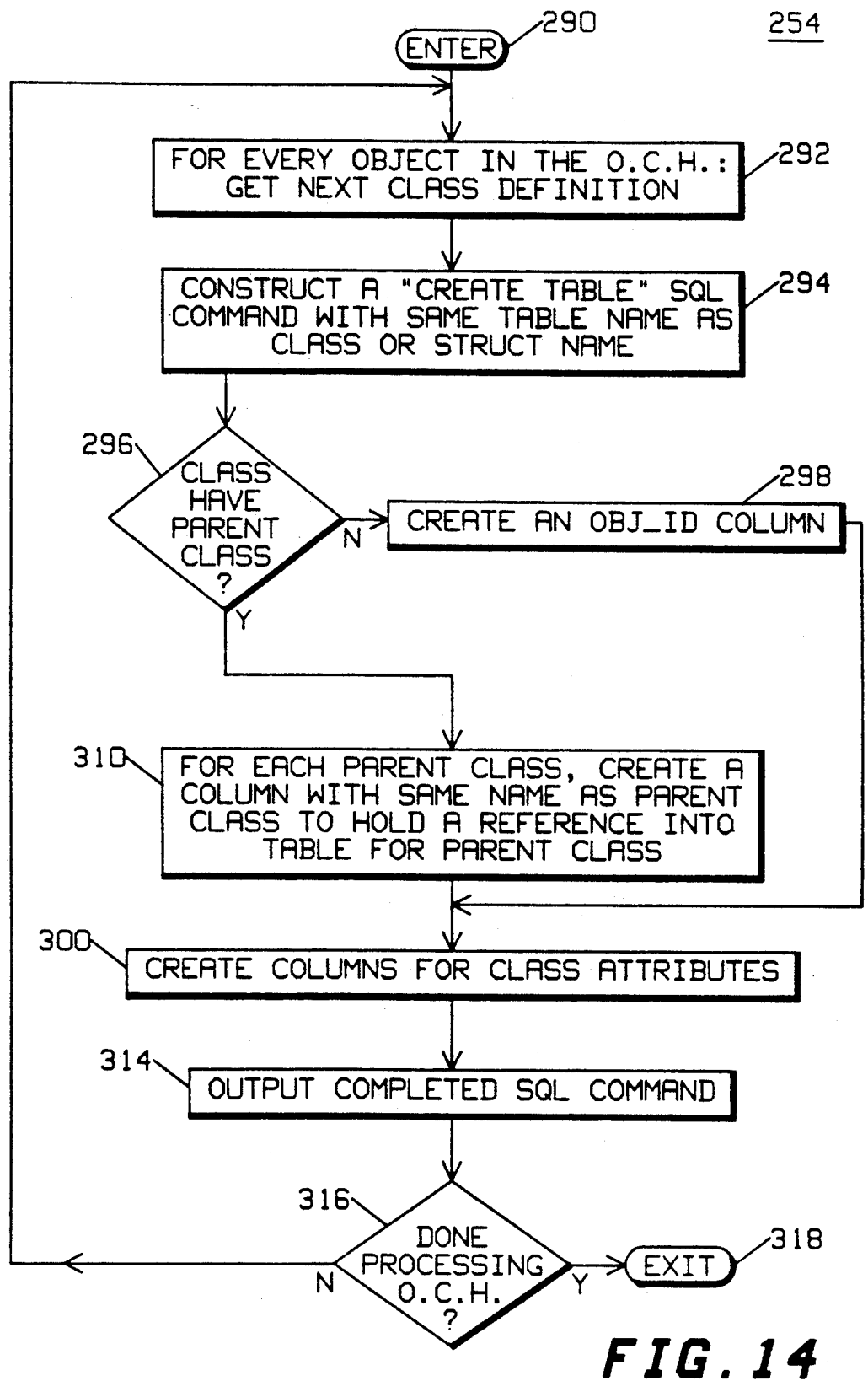
FIG. 14 is a flow chart of step 254 of FIG. 13 for generating normalized relational tables.

Referring now to FIG. 14, step 254 of generating normalized relational tables of FIG. 13 is described in greater detail. The step is entered at 290 after which each object in the hierarchy is processed by a loop beginning at step 292 which selects every class definition in the object class hierarchy. Each class definition is retrieved at step 292. Control then passes to step 294 where a "CREATE TABLE" SQL command is constructed with the same table name (tablename) as the name of the class at step 294. Control then passes to 296 where the translator determines whether or not the current class has a parent class associated with it. If not, an object identifier column is generated at step 298. Control then passes from step 298 to step 300. If the current class has at least one parent class at step 296, control passes to step 310 where for every parent class a column is created is the table for the current class with the same name as the name of the parent class. The purpose of this column is to hold a reference into the table for the parent class.

Control then passes from step 310 to step 300 where columns are created for the class attributes for the current class. Control then passes to step 314 where a completed SQL command having all of the SQL constructs necessary to make the syntax correct is generated. Control then passes to step 316 which determines whether or not more objects are present for processing. If more objects are present control passes back to step 292 from step 316. Otherwise the routine exits at step 318.

Figure 15:
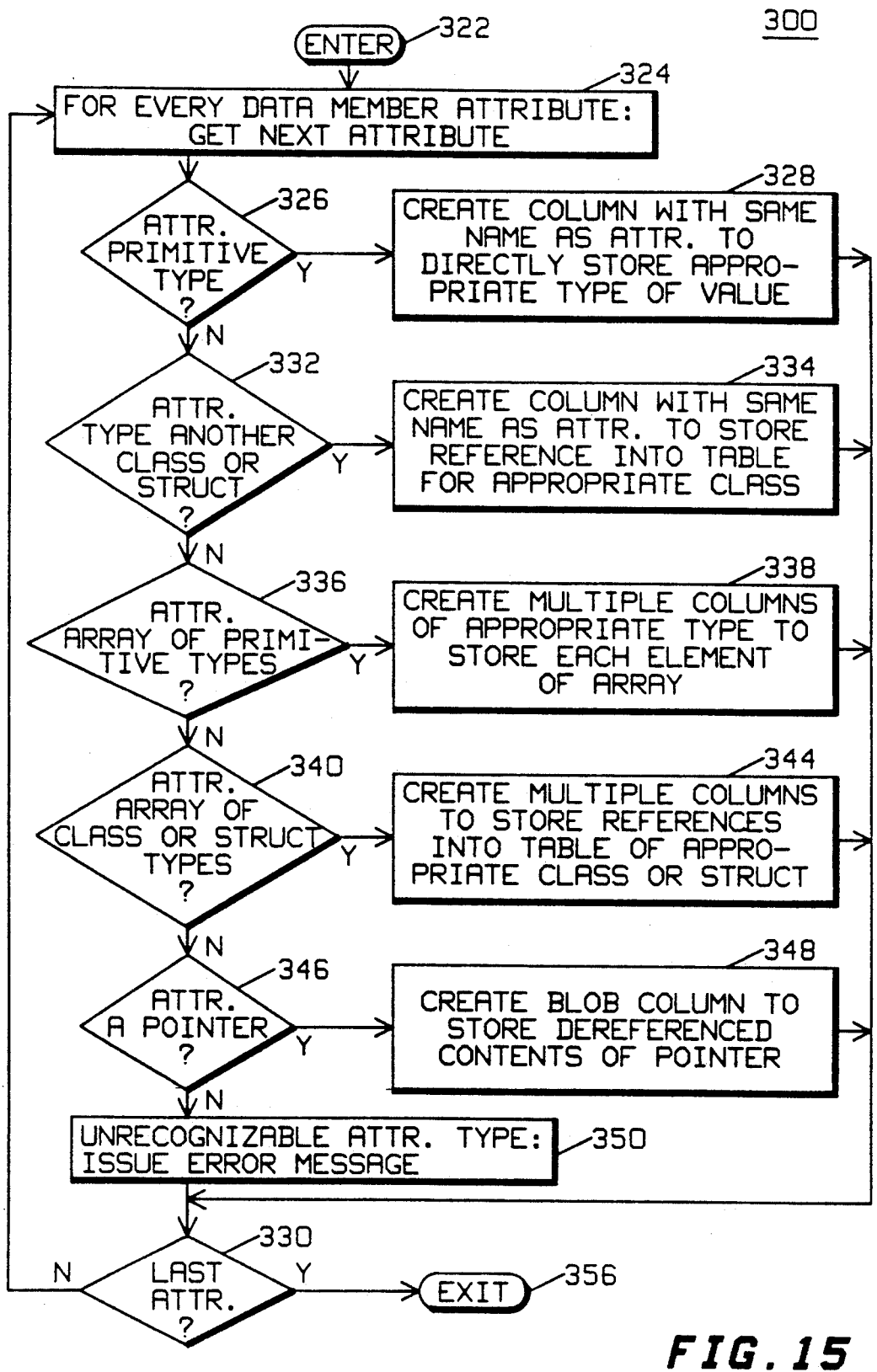
FIG. 15 is a flow chart of the process of step 300 of FIG. 14 for creating columns for class attributes.

Referring to FIG. 15, the step of creating columns for the attributes of each class described in step 300 of FIG. 14 is explained in greater detail. This routine determines what the type of each attribute is and creates appropriate columns for the attribute. The order of the processing carried out in FIG. 15 can be rearranged in many ways without departing from the present invention. The routine is entered at step 322 after which each data member attribute is processed beginning at step 324. It should also be noted that the sequence of the processing of attributes is not important to the present invention. Control passes from step 324 to step 326 where it is determined whether or not the attribute is of a primitive type such as integer, floating point, character string, Boolean, etc. If so, a column is created with the same name as the attribute at step 328. This column is used to directly store the appropriate type of value. Control then passes to step 330 where it is determined whether or not the last attribute has been processed. If the attribute type is not primitive at 326, control passes to step 332 where it is determined whether or not the attribute type is another class or struct. If so, a column is created with the same name as the attribute to store a reference into the table for the appropriate class in step 334. Control then passes from step 334 to step 330.

If the attribute type was not another class or struct at 332, step 336 examines the attribute to determine if it is an array of primitive types at step 336. If so, step 338 creates multiple columns of appropriate type to store each element of the array and then passes control to step 330. If the attribute is not an array of primitive types at step 336, the translator determines at step 340 whether or not the attribute is an array of class or struct types at step 340. If so, multiple columns are created to store references into the table of the appropriate class or struct. At step 344 control then passes to step 330.

If at step 340 the attribute is not an array of class or struct types, control passes to 346 where it is determined whether or not the attribute is a pointer. If the attribute is a pointer at 346, a binary large object (BLOB) column is created at 348 to store the de-referenced contents of the pointer at step 348. Control then passes to step 330. If the attribute is not a pointer at step 346, then it is concluded that the attribute must be of an unrecognizable type at step 350 and an error message is issued. Control then passes to 330 where it is determined whether or not the last attribute is processed. If not control returns to 334. If so the routine exits at step 356.

Figure 16:
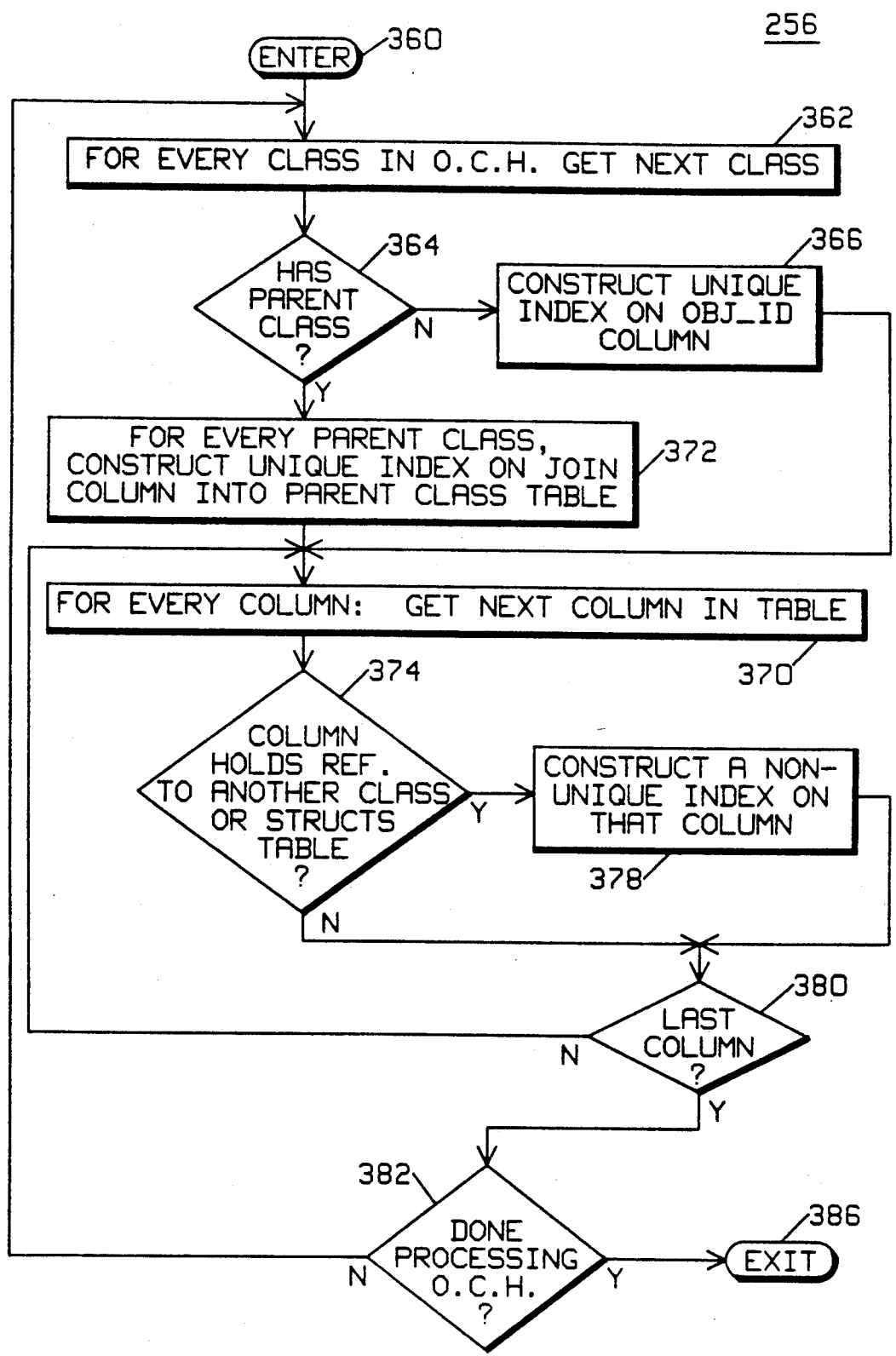
FIG. 16 is a flow chart of the routine for generating indexes for normalized tables of step 256 of FIG. 13.

Referring now to FIG. 16, the process of step 256 of FIG. 13 is described in greater detail. This routine is implemented as a pair of nested loops in which the outer loop processes each object in the object class hierarchy and the inner loop processes every column in the corresponding table for each object class. The routine is entered at step 360 after which each class is retrieved at step 362 for processing by the remainder of the routine. Control then passes to step 364 where it is determined whether or not the class has a parent class. If not, control passes to step 366 where a unique index is constructed on the object identifier column. Control then passes to 370.

If the current class does have a parent class at 364, the unique index on the join column into the parent class table is constructed for each parent class at step 372. Control then goes from step 372 to step 370 where each column in the table is retrieved. From step 370, step 374 determines whether the column holds a references to another class or struct table. If so, a non-unique index is constructed on that column at step 378 and control flows to step 380. If the column does not hold a reference to another class or struct table at step 374, control similarly passes to step 380 bypassing step 378. Step 380 determines whether or not the last column is being processed. If not, control passes back to 370 and if so, control passed to step 382. At step 382 it is determined whether or not the object class hierarchy has been completely processed. If not, control goes to step 386 where the routine is exited.

Figure 17:
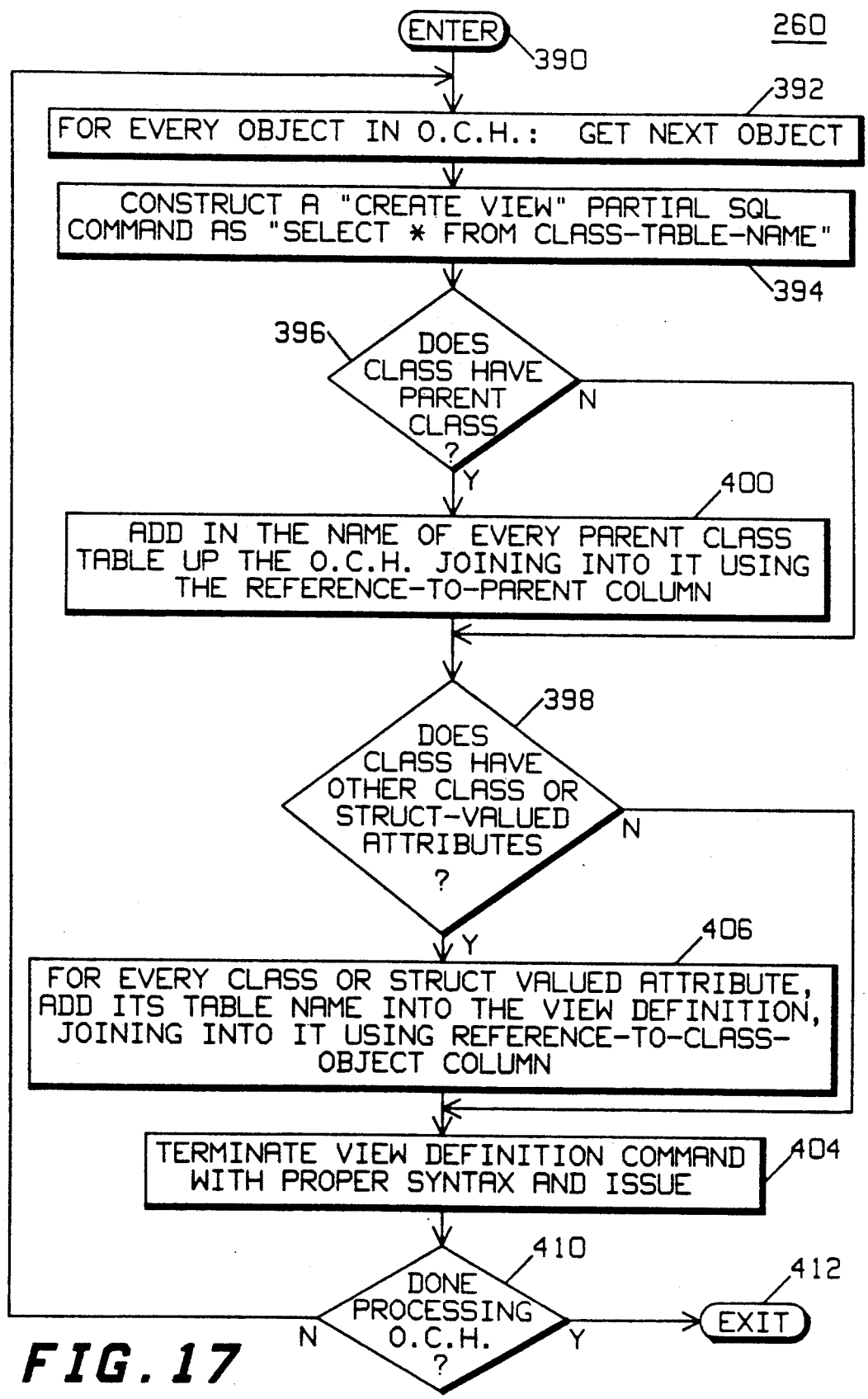
FIG. 17 is a flow chart of the routine for generating view definitions of step 260 of FIG. 13.

Referring now to FIG. 17 the process of step 260 of FIG. 13 is described in greater detail beginning with entry into the routine at step 390 if the "views requested" flag is set at step 258 in FIG. 13. At step 392 each object in the object class hierarchy is retrieved for processing by the remainder of the routine. At step 394 a view definition is generation by constructing a "CREATE VIEW" partial SQL command as "select from class-table-name". At this point the view definition is not complete. The view definition will be completed when we have recognized the position of the class in the hierarchy and the nature of its columns. At step 396 it is determined whether or not the current class has a parent class. If not, control passes to step 398. If so, control passes to step 400 where the name of every parent class table in the object class hierarchy is added in to the view definition joining into it using the reference-to-parent column.

Control then passes to step 398 where it is determined whether or not the class has other class or struct valued attributes. If not, control passes to step 404. If so, control passes to step 406 where for every class or struct valued attribute, the corresponding table name is added into the view definition joining into it using the reference-to-class-object column. Control then passes to step 404 where the view definition command is terminated with the proper syntax and the command is issued. Control then passes to step 410 which determines whether or not the object class hierarchy has been completely processed. If not control returns to step 392. If so the routine is exited at step 412.

Figure 18A:
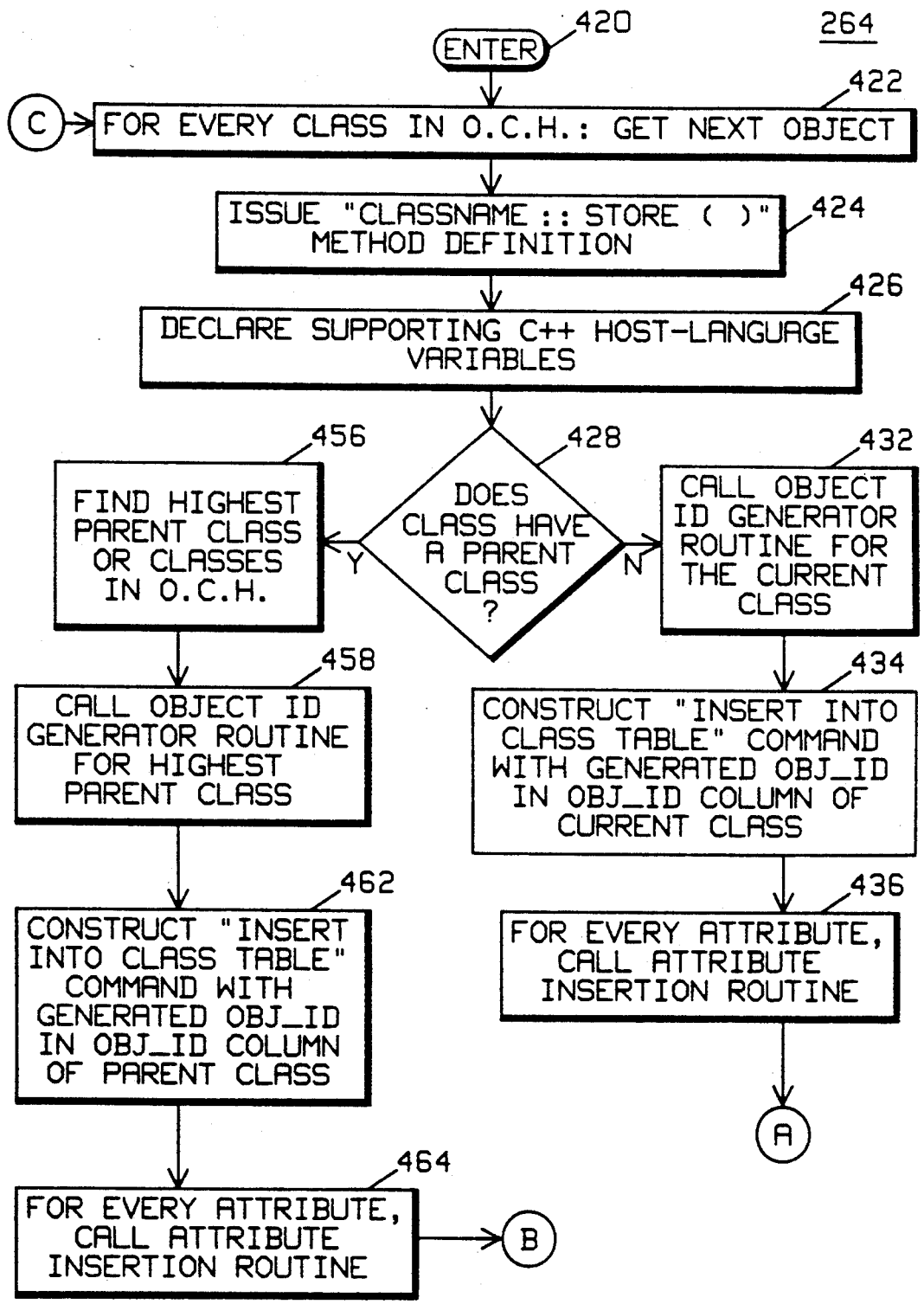
FIGS. 18A and 18B, which is divided into
Figure 18B:
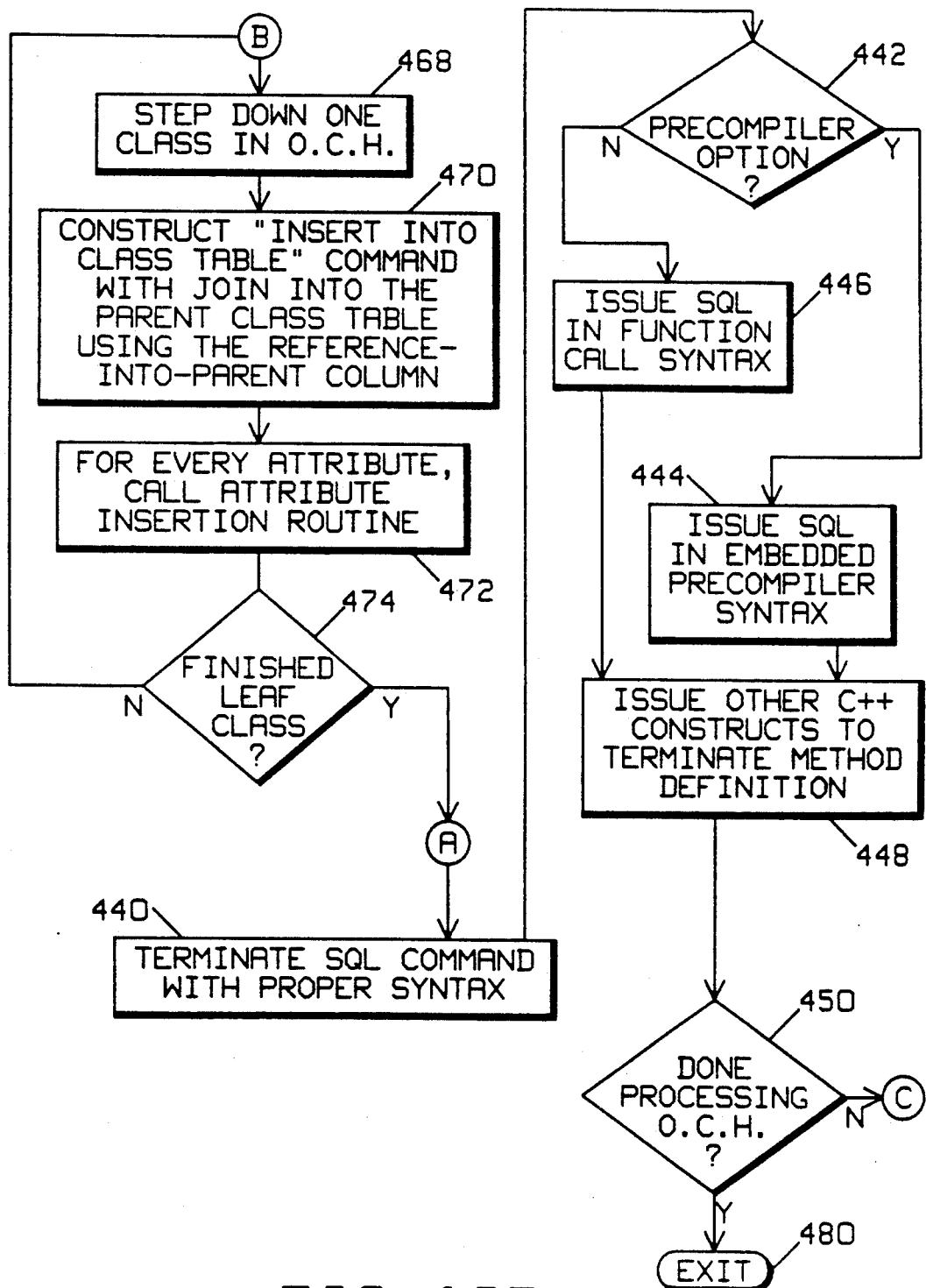

Referring now to FIG. 18, shown divided into FIGS. 18A and 18B, step 264 of FIG. 13 is explained in greater detail beginning at entry of the routine at step 420. At step 422 each class in the object class is retrieved for processing by the remainder of the routine. Next, at step 424, the "class_name :: store( )" syntax, to start the method definition, is issued. Next, at step 426 the supporting C++ host language variables are declared. Step 428 then determines whether or not the current class has a parent class. If not, control passed to step 432 which issues the command to call the object identifier generator routines for the current class at 432. Next, at 434 the translator constructs "INSERT INTO class_table" command with the insertion of the object identifier that will be generated, into the object identifier column of the current class in order to insert an actual instance of the current class into the table.

At this point the command to generate an object identifier has been issued for the current instance, and the process of constructing an SQL command for inserting the object identifier and the attributes for that particular object instance into the table is proceeding. Control then passes to step 436 where for every attribute of that instance an attribute insertion routine is called. Control then passes to 440 where the SQL command is terminated with the proper Syntax. It is then determined at step 442 whether or not the precompiler option has been selected by the user. If so, the SQL command is issued in the embedded precompiler syntax at step 444. If not, the SQL command is issued in function call syntax at step 446. In either case of step 444 or 446 control passes to step 448 where the proper C++ constructs are issued to terminate the method definition. Control then passes to step 450 where it is determined whether or not processing has been completed on the object class hierarchy.

If, at step 428, it is determined that the class has at least one parent class, step 456 finds the highest parent class or classes in the object class hierarchy and passes control to step 458. Step 458 calls the object identifier generator routine for the highest parent class. Next, at step 462, the translator constructs an "INSERT INTO class_table" command with the generated object identifier in the object identifier column of the parent class. Control then passes to 464 where an attribute insertion routine is called for each attribute. Next control passes to step 468 where the translator steps down one class in the object class hierarchy in order to work back down to the final leaf class. At step 470 an "INSERT INTO class_table" command is generated with a join into the parent class table using a reference-into-parent column. Control then passes to step 472 where an attribute insertion routine is called for every attribute in the current class.

Step 474 next determines if the final leaf class has been reached. If not, control returns to step 468 where the next leaf class is processed. If so, control passes to step 440. When processing has been completed at step 450, the routine exits at exit step 480.

Figure 19:
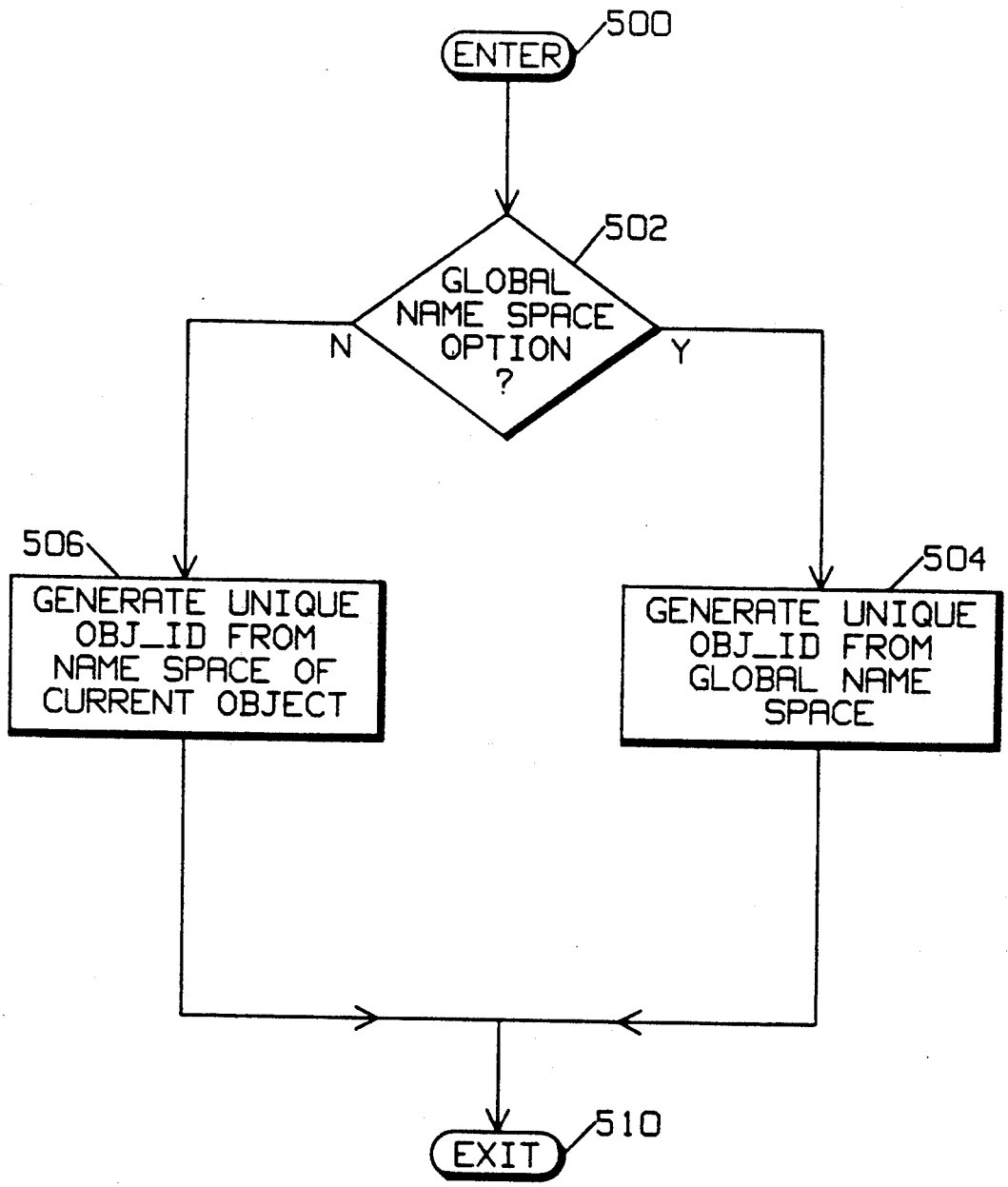
FIG. 19 is a flow chart of the object identifier generator routine called in steps 432 and 458 of FIG. 18.

The object identifier generator routine called in steps 432 and 458 of FIG. 18 is described in greater detail in FIG. 19 beginning at step 500 after which step 502 determines if the global name space option has been selected by the user in step 112. If so, the translator generates a unique object identifier from the global name space at step 504. If not, the translator generates a unique object identifier from the name space of the current object at step 506. In either event, the routine exits at step 510.

Figure 20:
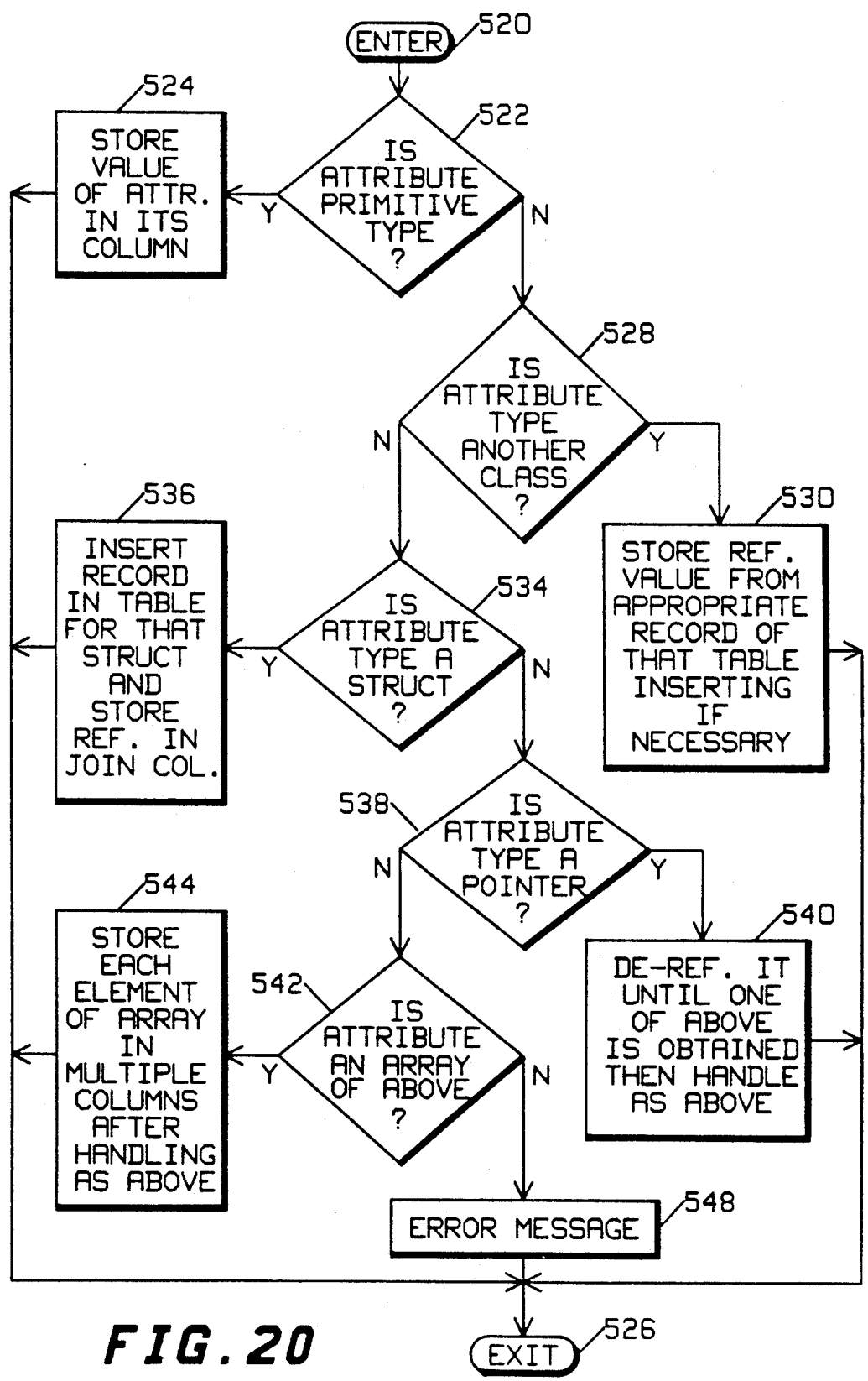
FIG. 20 is a flow chart of the attribute insertion routine called in steps 464 and 472 and 436 of FIG. 18.

Referring to FIG. 20, the attribute insertion routine called in steps 464 and 472 and 436 of FIG. 18 is described in greater detail. The routine begins at step 520 after which step 522 determines if the attribute is a primitive type. If so, the attribute is stored in its column in step 524 and the routine exits at 526. If the attribute is not a primitive type at 522, the routine examines the attribute to determine if its type is another class at step 528. If so, at 530 the reference value from the appropriate record of the table for that class is inserted. It may be necessary to insert a record into its own table if this particular instance of the referenced class does not exist. After step 530 the routine exits at step 526.

If the attribute type is not another class at step 528, control passes to 534 where the routine determines if the attribute is a struct. If so, control passes to 536 where a record is inserted into the table for that struct and its reference is stored in the join column in the table for the current class. Control then passes to 526.

If at step 534 the attribute type is not a struct, control passes to 538 where the routine determines whether or not the attribute type is a pointer. If so, the pointer is de-referenced a sufficient number of times until either a primitive type, a class or a struct is obtained. When one of these three types is obtained, it is handled as in the appropriate one of steps 524, 530 or 536. Control then passes to 526. If the attribute is not of a type pointer at step 538, control passes to step 542 where the routine determines if the attribute is an array of any of the above types. That is, the attribute is an array of primitive types, classes, structs or pointers. If so, control passes to step 544 where each element of the array is stored in multiple columns after it is handled as in steps 524, 530, 536 or 540, which ever is appropriate. Control then passes to step 526. If at step 542 the attribute is determined not to be an array of any of the other types of attributes then the routine determines that an error has occurred and an error message is issued in step 548 since the attribute is unrecognizable. The routine then terminates at step 526.

Figure 21A:
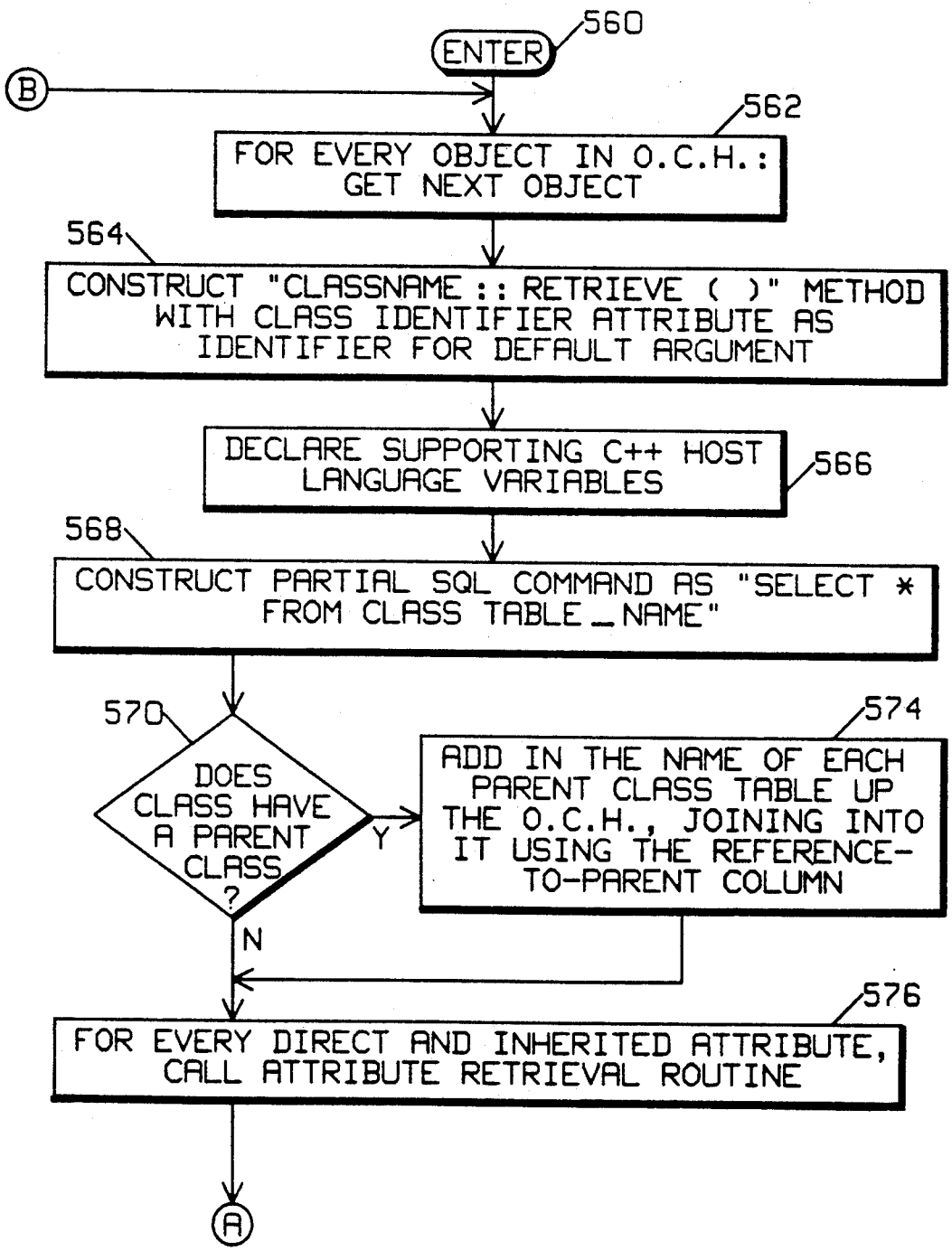
FIGS. 21A and 21B, is a flow chart of the process of generating the retrieval method of step 266 of FIG. 13.
Figure 21B:
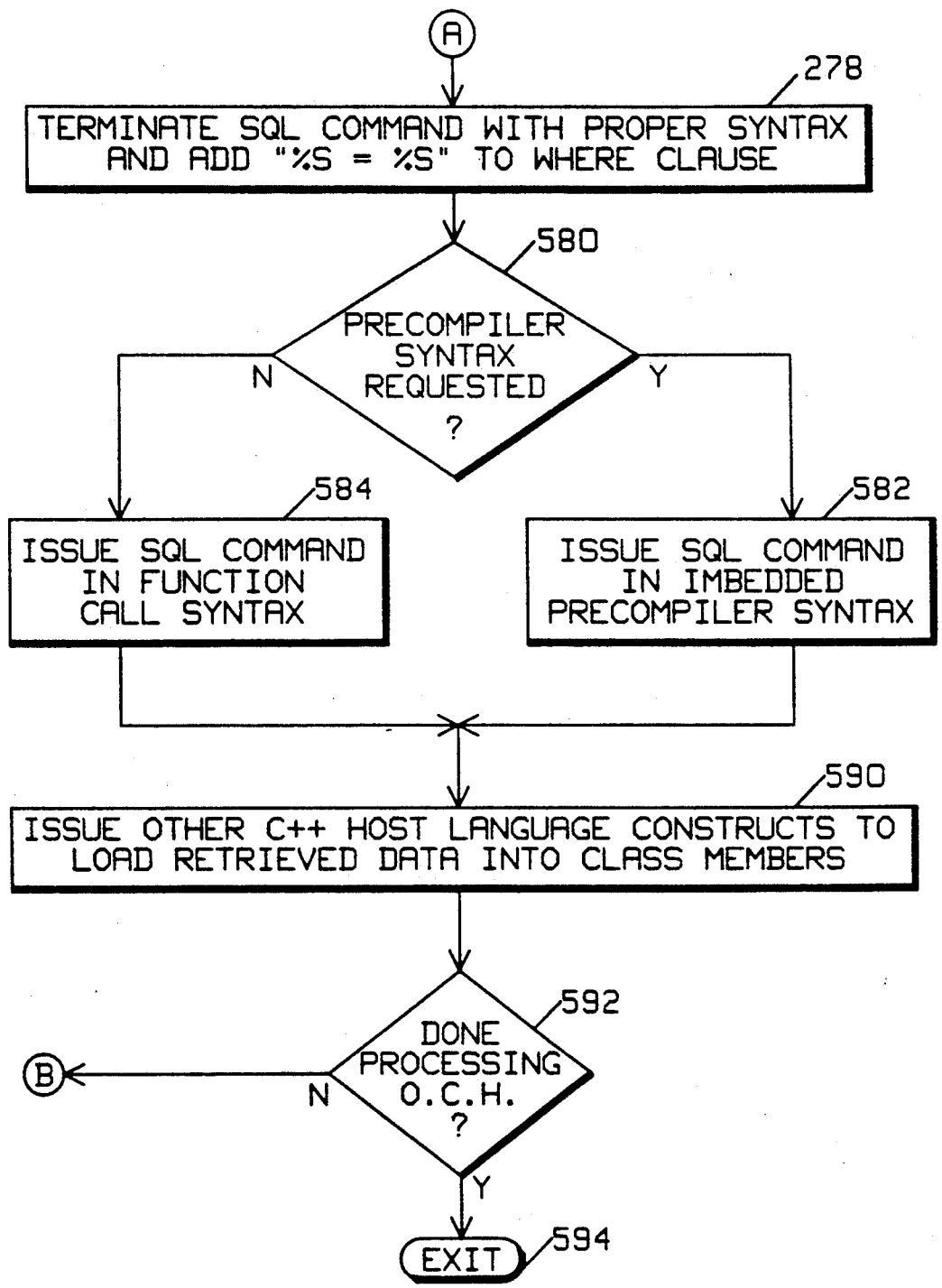

Turning now to FIG. 21, the process for generating a retrieval method for normalized tables as in step 266 of FIG. 13 is shown in greater detail. This routine is entered at step 560. In step 562, each object in the object class hierarchy is retrieved for processing by the remainder of the routine. At step 564 the routine constructs the "classname :: retrieve( )" method using the class identifier attribute as the identifier for the default argument. By convention, according to the preferred embodiment, the class identifier attribute is the first attribute listed in the class definition, but this is not to be limiting as other variations will occur to those skilled in the art.

Control then passes to step 566 where the supporting C++ host language variables are declared. At step 568, a partial SQL command is constructed as a "SELECT FROM class_table_name". Control then passes to step 570 where the routine determines whether or not the class has a parent class. If so, the name of every parent class table up the object class hierarchy is added in to the partial SQL command joining into it using the reference-to-parent column at 574. Control then passes to step 576 where for each direct and inherited attribute, the attribute retrieval routine is called. Control also passes from step 570 directly from step 576 bypassing step 574 in the event the current class does not have a parent class.

The SQL command is then terminated with the proper syntax at step 578 and "%s=%s" is added to the "WHERE" clause. Control then passes to step 580 where the routine determines whether or not the precompiler syntax option has been requested by the user at step 112. If so, the routine issues an SQL command in embedded precompiler syntax at step 582. If not, the routine issues the command in function call syntax at step 584. In either event control passes to step 590 where other C++ host language constructs are issued to load the retrieved data into class members. Control then passes to step 592 where the routine determines whether or not it has completed processing the object class hierarchy. If not, control returns to 562. If so, the routine exits at step 594.

Figure 22:
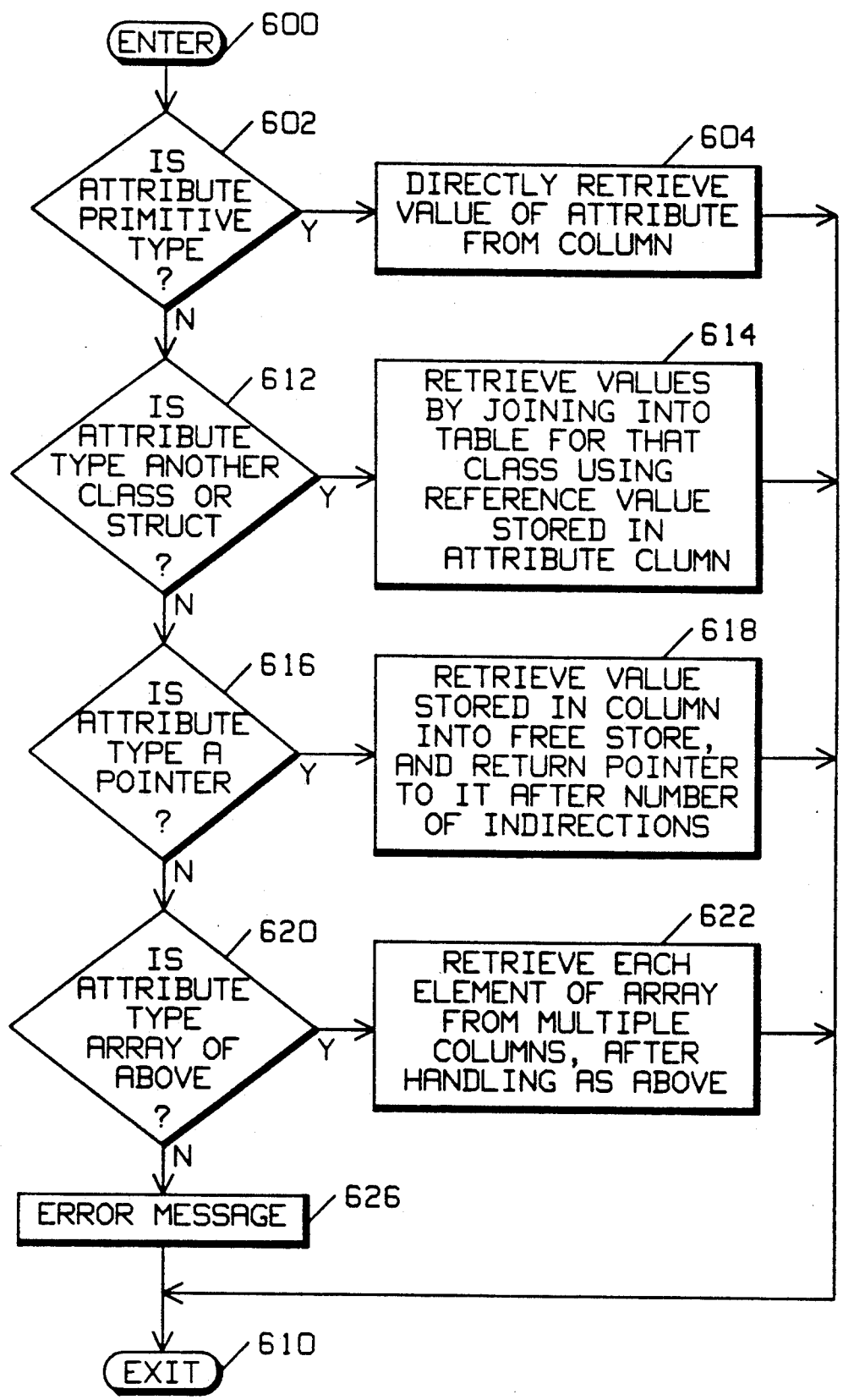
FIG. 22 is a flow chart of the attribute retrieval routine as called in step 576 of FIG. 21.

Turning now to FIG. 22, the attribute retrieval routine as called in step 576 of FIG. 21 is shown in greater detail. This routine is entered at step 600 after which step 602 determines if the attribute is a primitive type. If so, control passes to 604 where the value of the attribute is retrieved directly from a column. The routine then exits at step 610. If the attribute is not a primitive type at step 602, control passes to 612 where the routine determines if the attribute type is another class or struct. If so, control passes to 614 where the values of the class or struct are retrieved by joining into the table for that class using the reference value stored in the attribute column in steps 614. Control then passes from 614 to 610. If the attribute type is not another class or struct at 612, control passes to 616 where the routine determines if the attribute type is a pointer. If so, the routine retrieves the value stored in the column into main memory (free storage) and returns a pointer to it after the required number of indirections at step 618. Control then passes to 610 where the routine is exited. If the attribute type is not a pointer at step 616, control passes to step 620 where the routine determines if the attribute is an array of any of the above types (primitive type, class, struct or pointer). If so, control passes to step 622 where each element of the array is retrieved from multiple columns after the attribute is handled as in step 604, 614 or 618 as appropriate. Control then passes to 610 where the routine exits. If the attribute is not an array of any of the above types at step 620, the routine determines that it is an unrecognizable attribute type and issues an error message at 626 after which the routine exits at 610.

Figure 23A:
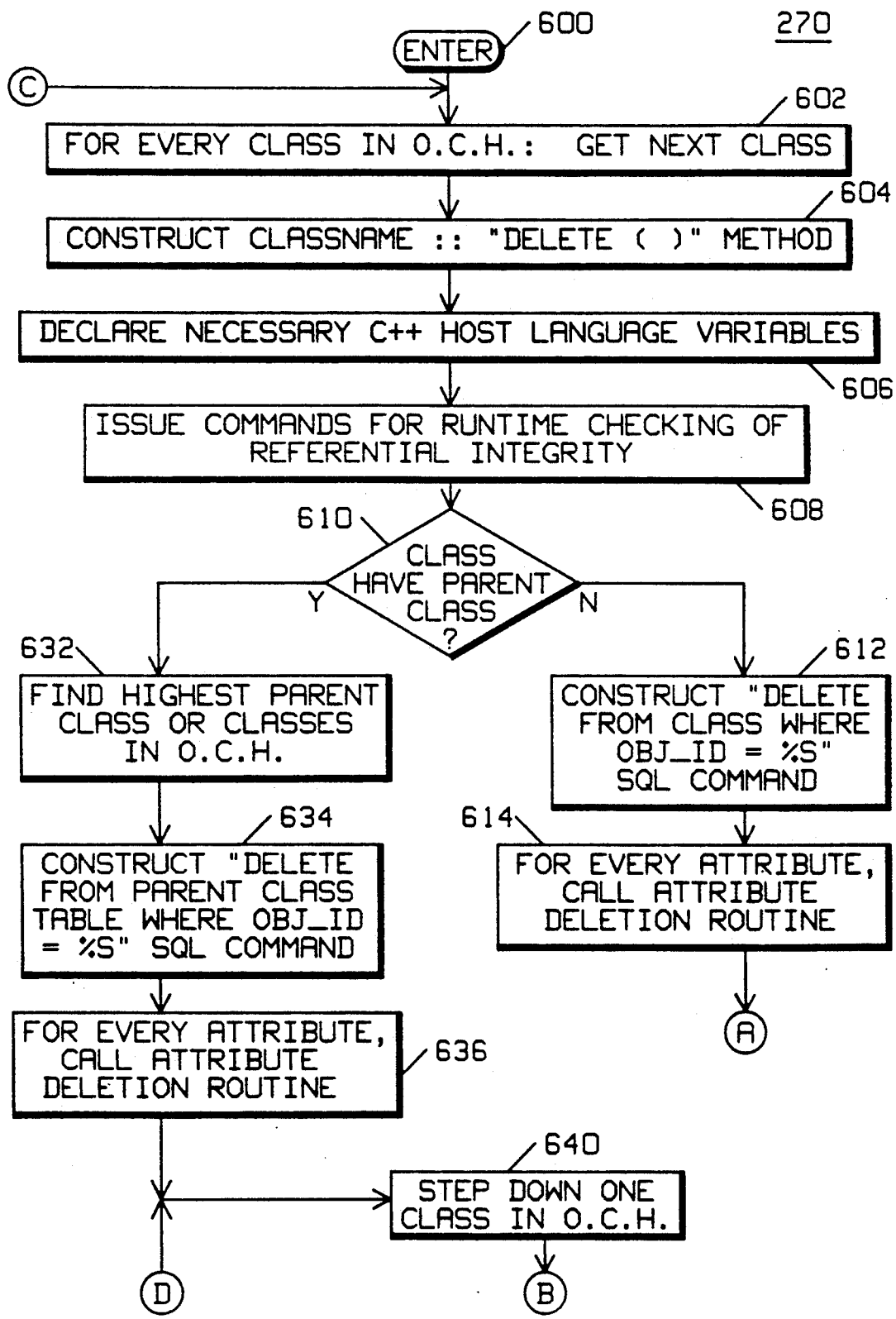
FIGS. 23A and 23B, is a flow chart of the routine for generation of a deletion method for normalized tables of step 270 of FIG. 13.
Figure 23B:
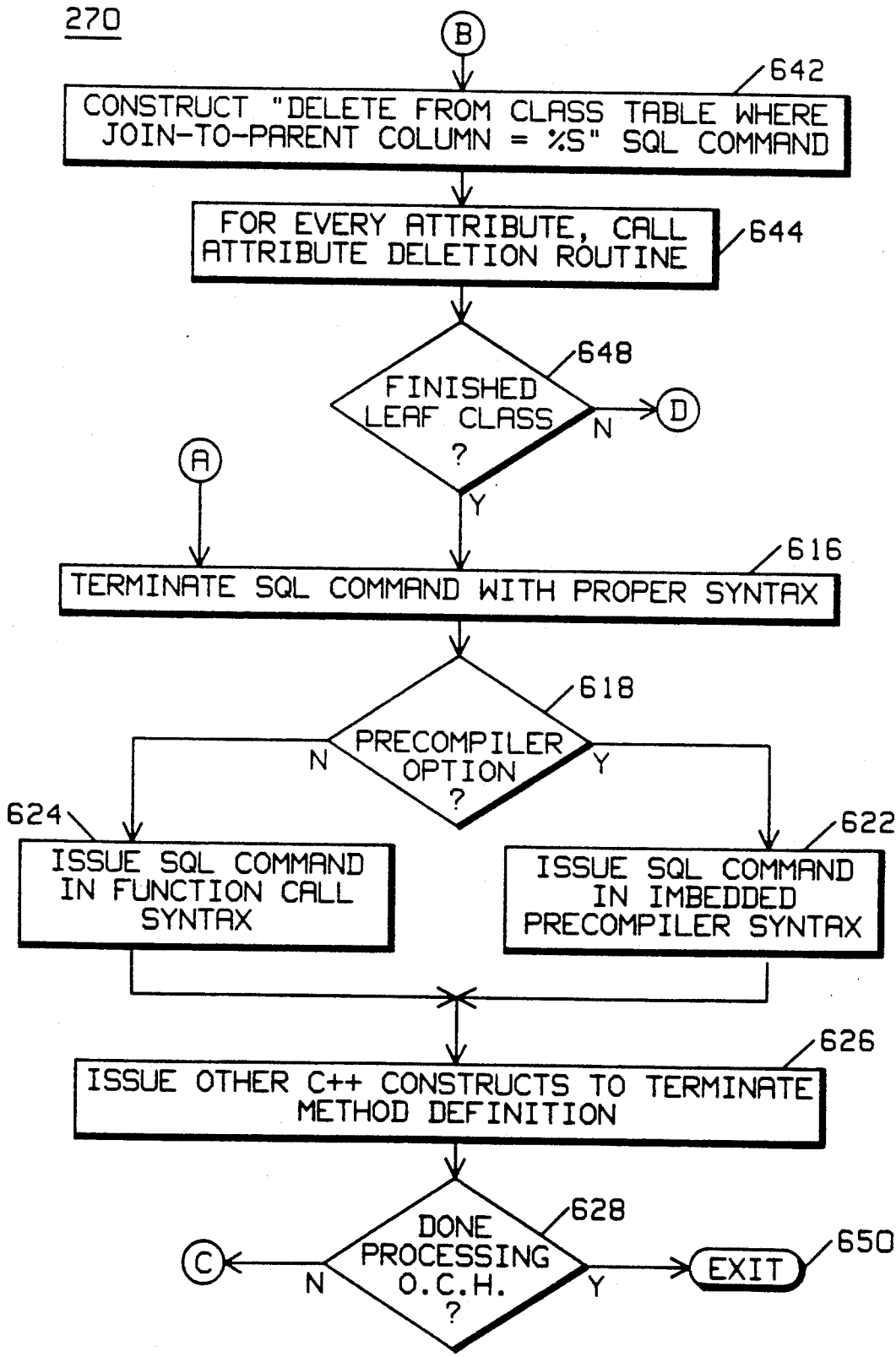

Referring now to FIG. 23, step 270 of FIG. 13 is described in greater detail. The routine is entered at step 600 after which each class, at 602, in the object class hierarchy is processed by the remainder of the routine. Control passes to step 604 where the current class name is used to construct "classname :: delete( )" method. Control then passes to step 606 where the necessary C++ language variables are declared. Next, control passes to step 608 where commands for run time checking for referential integrity are issued. Following step 608 the routine determines at step 610 whether or not the class has a parent class. If not, processing continues at step 612 which constructs a "DELETE FROM class WHERE obj_id=%s" SQL command. Control then passes to step 614 where for each attribute in the current class the attribute deletion routine is called.

Next the SQL command is terminated with the proper syntax at step 616 and control passes to step 618. Step 618 determines if the precompiler option has been selected by the user in step 112. If so, control passes to step 622 where the SQL commands are issued in embedded precompiler syntax. If not, the SQL commands are issued in function call syntax 624. In either event, control passes to step 626 where the other C++ constructs to terminate the method definition are issued. Control then passes to step 628 where the routine determines whether or not processing has been completed on the object class hierarchy. If not, control returns back to step 602.

If at step 610 the current class does have a parent class, control passes to step 632 where the highest parent class or classes in the object class hierarchy are located. Control then passes to 634 where a "DELETE FROM parent-class table WHERE obj_id=%s" SQL command is constructed. Control then passes to step 636 where for each attribute the attribute deletion routine is called. Next, at step 640, we step down one class in the object class hierarchy and control passes to 642. At 642 the routine constructs a "DELETE FROM class_table WHERE join_to_parent_column=%s" SQL command. Next, at step 644, for every attribute deletion routine is called and control passes to 648. Step 648 determines whether or not the routine has completed processing the leaf class. If not, control returns to 640. If so, control passes to step 616. At step 628, if the object class hierarchy is fully processed, control passes to 650 where the routine exits.

Figure 24:
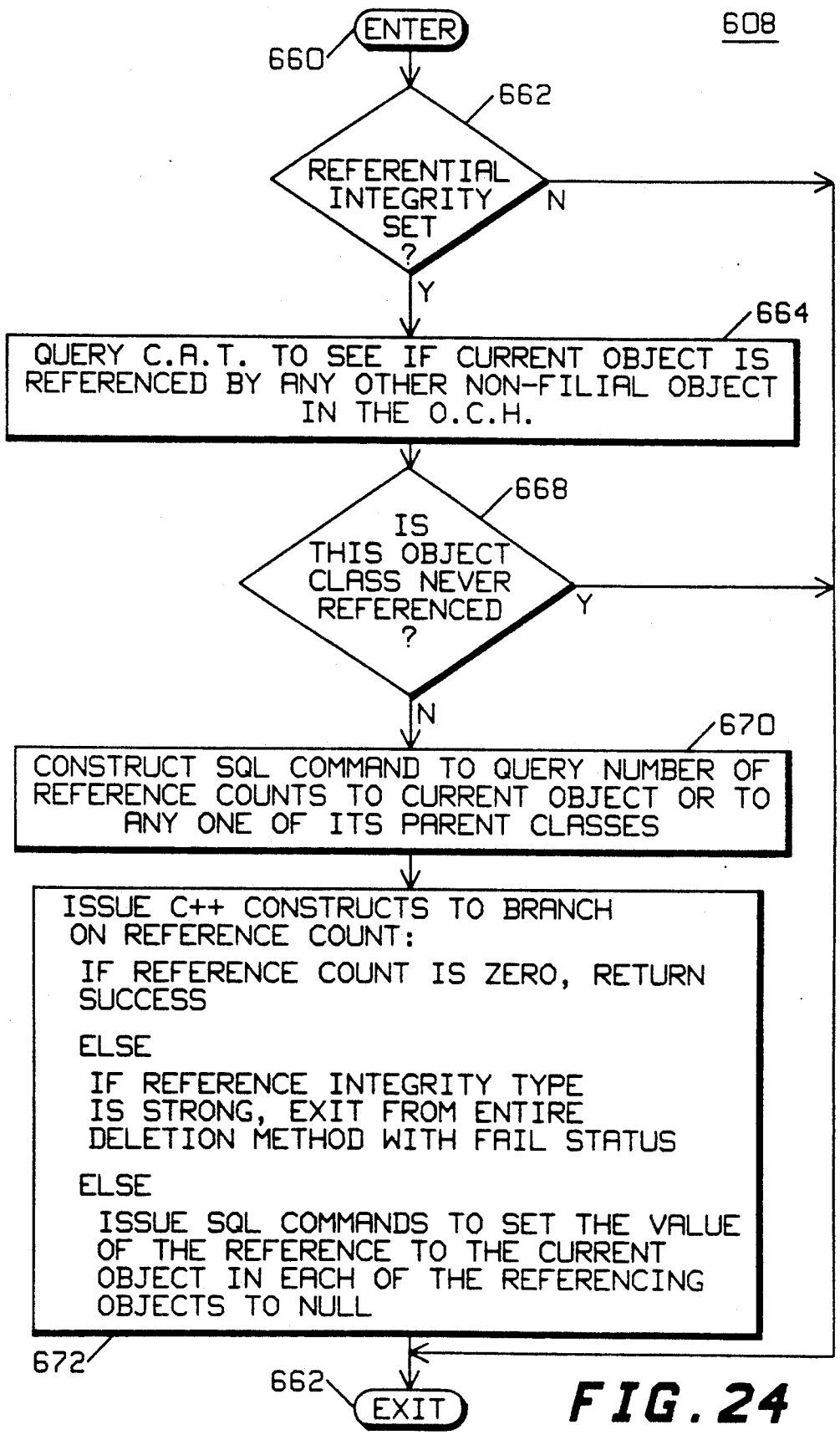
FIG. 24 is a flow chart of the process of issuing commands for runtime checking of referential integrity of step 608 of FIG. 23.

Turning now to FIG. 24, the referential integrity check routine of step 608 of FIG. 23 is shown in greater detail beginning at step 660. Control then passes to step 662 where the routine determines whether or not the referential integrity option has been set by the user in step 112. If not, this routine exits at step 662 without further processing. If so, control passes to 664 where the routine queries the class attribute table to see if the current object is non-filially referenced by any other object in the object class hierarchy.

Control then passes to step 668 which determines if the object class is never referenced. If it is never referenced, the routine exits at 662. If the object class is referenced in at least one place at 668, control passes to 670 where the routine constructs the SQL command to query the number of reference counts to the current object or to any one of its parent classes. Control then passes to step 672 where the routine generates an if-then-else command to be executed at run time by the deletion routine in response to a deletion request. The if-then-else command is intended to determine the processing for referential integrity that needs to be executed at run time. In step 672 the C++ constructs are issued to branch on the value of the reference count generated in 670. The C++ construct will indicate that if the reference count is 0 a success is to be returned. Otherwise, if the referential integrity type is strong, the C++ constructs will cause an exit from the entire deletion method with "FAIL" status. Otherwise, it is assumed that the referential integrity type is weak and the SQL commands are issued to set the value of the reference to the current object in each of the references objects to "NULL". Control then passes to step 662 which exits the routine.

Figure 25:
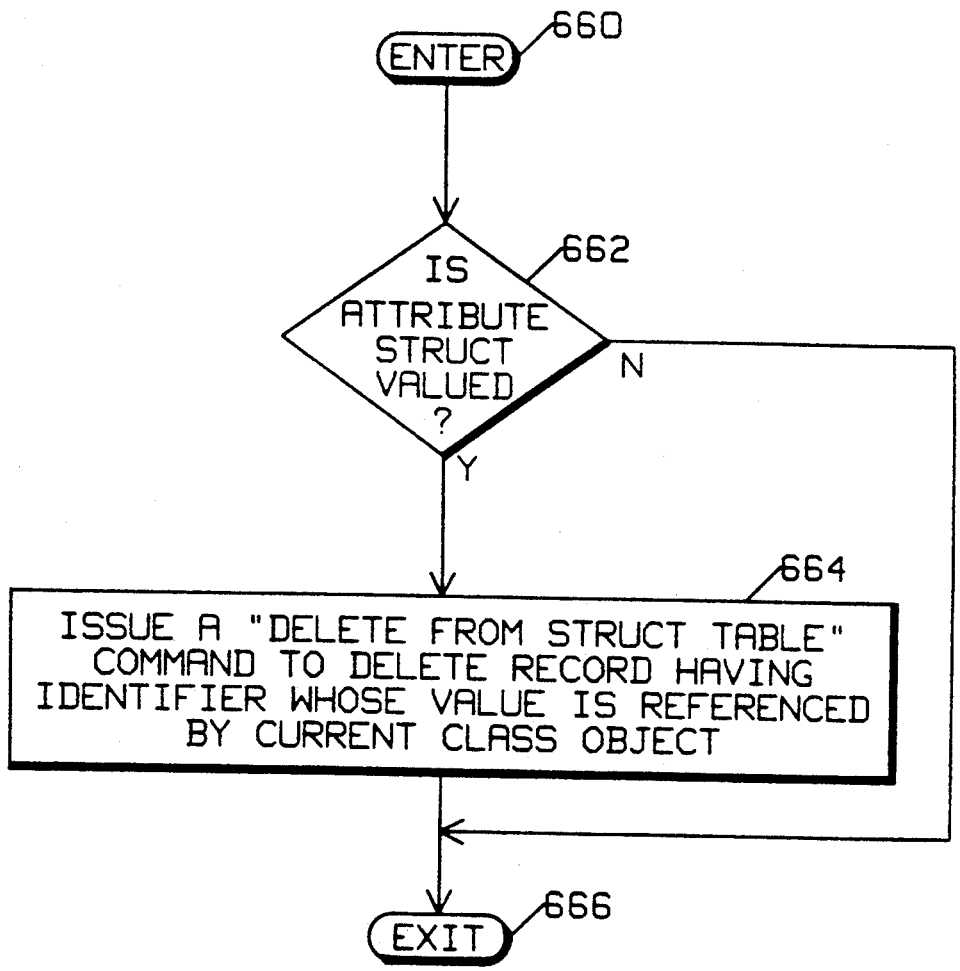
FIG. 25 is a flow chart of the attribute deletion routine referenced in step 636, 644 and 614 of FIG. 23.

Referring now to FIG. 25, the attribute deletion routine referenced in step 636, 644 and 614 of FIG. 23 is shown in greater detail. This routine begins at step 660 after which step 662 determines whether or not the attribute type is a struct. If so, step 644 issues a delete from struct table command to delete the record having the identifier whose value is referenced by the current class object "DELETE FROM struct table". The routine then exits at step 666. If the attribute type in step 662 is not a struct, the routine exits directly from that point to step 666.

Figure 26:
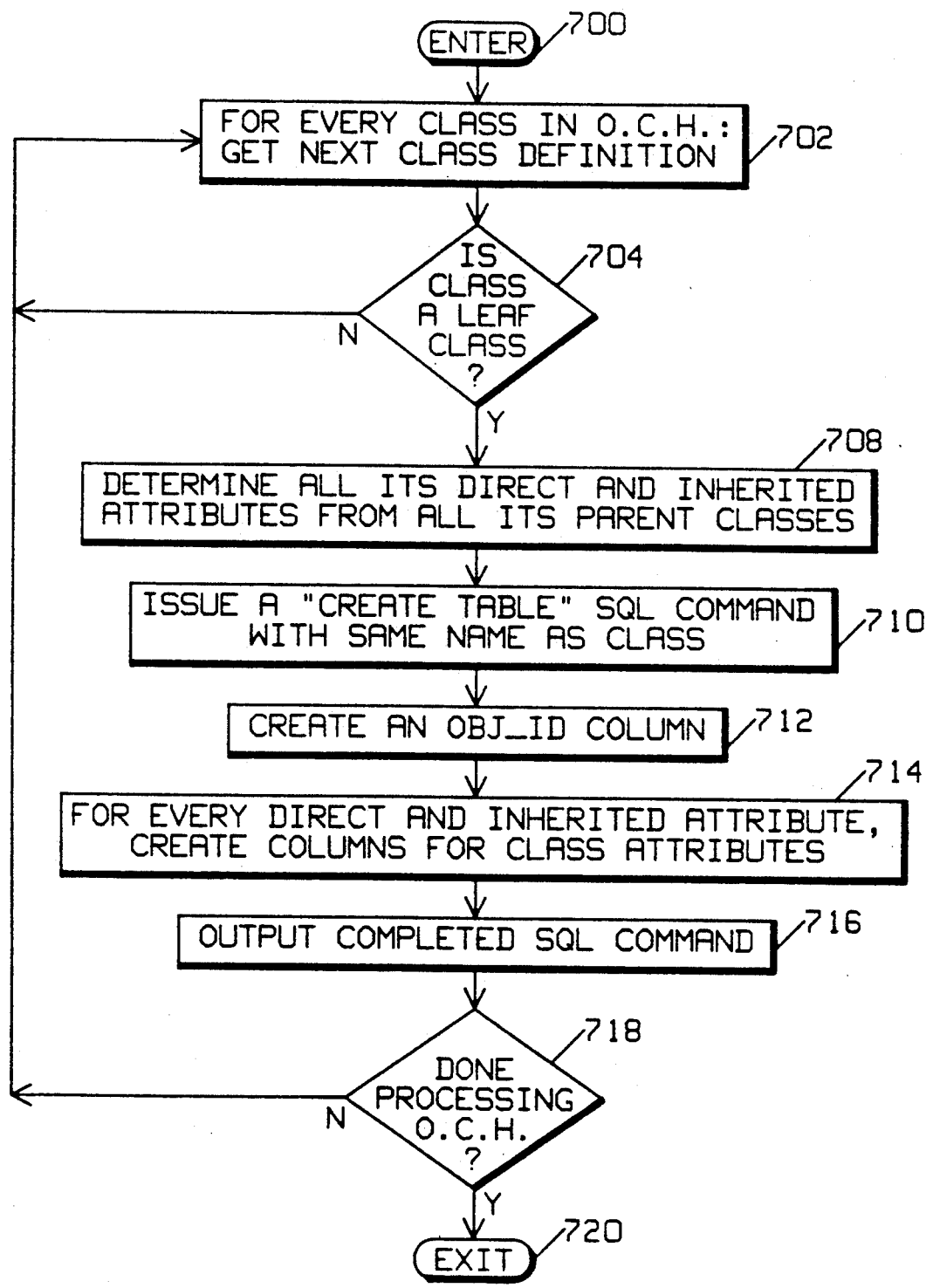
FIG. 26 is a flow chart of the process of generating flattened relational tables of step 274 of FIG. 13.

Referring now to FIG. 26, the process of generating flattened relational tables as described in step 274 of FIG. 13 is explained in greater detail. This routine begins at step 700 after which each class in the object class hierarchy is retrieved at step 702. For each class, at step 704, the routine determines if the class is a leaf class. If not, control returns to step 702 which retrieves the next class. This is because the routine of FIG. 26 only processes leaf classes. At step 704 if the routine determines that the current class is a leaf class, control passes to 708 where the routine determines all of its direct and inherited attributes from all of its parent classes. Control then passes to step 710 where the routine issues a "CREATE TABLE" SQL command with the same name as the class. Next, at step 712, an obj_id column is created to store the object identifier. Next, columns are created for class attributes for every direct and inherited attribute at step 714. This is explained in FIG. 15. Next, at step 716, the completed SQL command is issued. Finally, step 718 determines whether or not the object class hierarchy has been completely processed. If not, control returns to step 702. If so, the routine exits at step 720.

Figure 27:
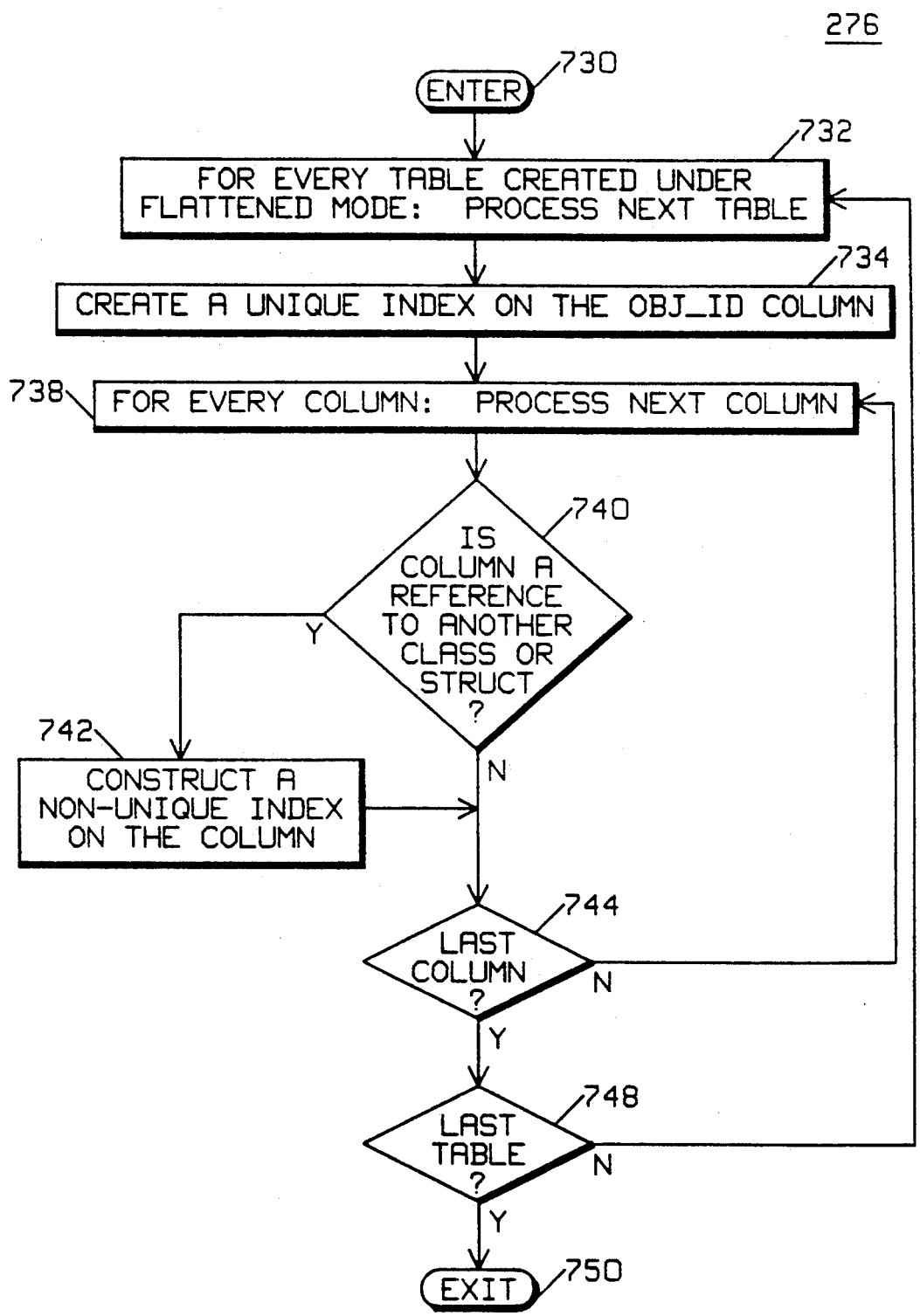
FIG. 27 is a flow chart of the step of generating indexes for flattened tables of step 276 of FIG. 13.

The step of generating indices for flatted table 276 of FIG. 13 is explained in greater detail in FIG. 27. This routine begins at step 730. After which each table which was generated at step 274 of FIG. 13 is individually processed. FIG. 27 describes a pair of nested loops, the outer loop of which processes each table created and the inner loop which processes each column in the tables. Step 732 retrieves the table for processing and passes control to step 734 which creates a unique index in the obj_id column of the table. Next, at step 738 each column in the table is retrieved.

Control then passes to 740 where the routine determines if the column is a reference to another class or struct. If so, control passes to 742 where a non-unique index is constructed for the column. Control then passes to 744 which determines whether or not the current column is the last column. Control also passes directed to 744 from step 740 if the current column is not a reference to another class or struct. If step 744 determines that the current column is not the last column in the table, control returns to step 738. Otherwise, control passes to step 748 which determines if the last table has been processed. If not, control returns to step 732. If so, the routine exits at step 750.

Figure 28:
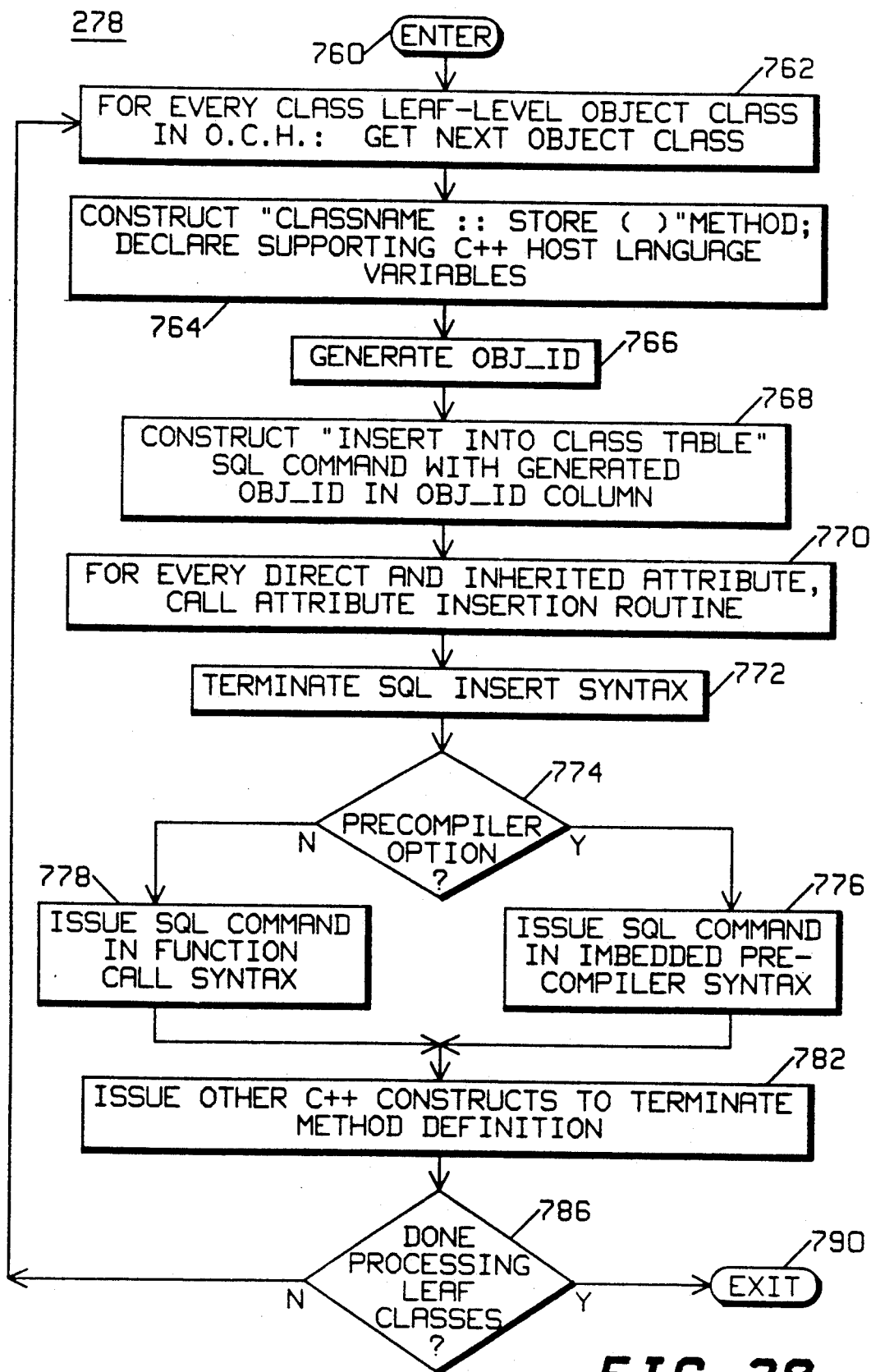
FIG. 28 is a flow chart of the routine for generating a storage method for flattened tables called in step 278 of FIG. 13.

FIG. 28 describes step 278 of FIG. 13 in greater detail. This routine begins at step 760 after which step 762 retrieves every leaf level object class in the object class hierarchy. Control then passes to step 764 which constructs a "class_name :: store ( )" method and declares supporting C++ host language variables. Control then passes to step 766 which generates the obj_id (object identifier) as described in conjunction with FIG. 19. Next, at step 768, the routine construct "INSERT INTO class table" SQL command with the generated object identifier in the obj_id column of the table.

Control then passes to 770 where for every direct and inherited attribute of the object class, the attribute insertion routine as described in conjunction with FIG. 20 is called. Next the SQL "INSERT" syntax is terminated at step 772. Control then passes to 774 where the routine determines if the precompiler option has been selected by the user in step 112. If so, the SQL command is issued in embedded precompiler syntax at step 776. If not, the SQL command is issued in function call syntax at step 778. In either event control passes to 782 which issues other C++ constructs to terminate the method definition. Control then passes to 786 which determines whether or not all leaf classes have been processed. If not control returns to step 762 to retrieve the next leaf class. If so, the routine exits at step 790.

Figure 29A:
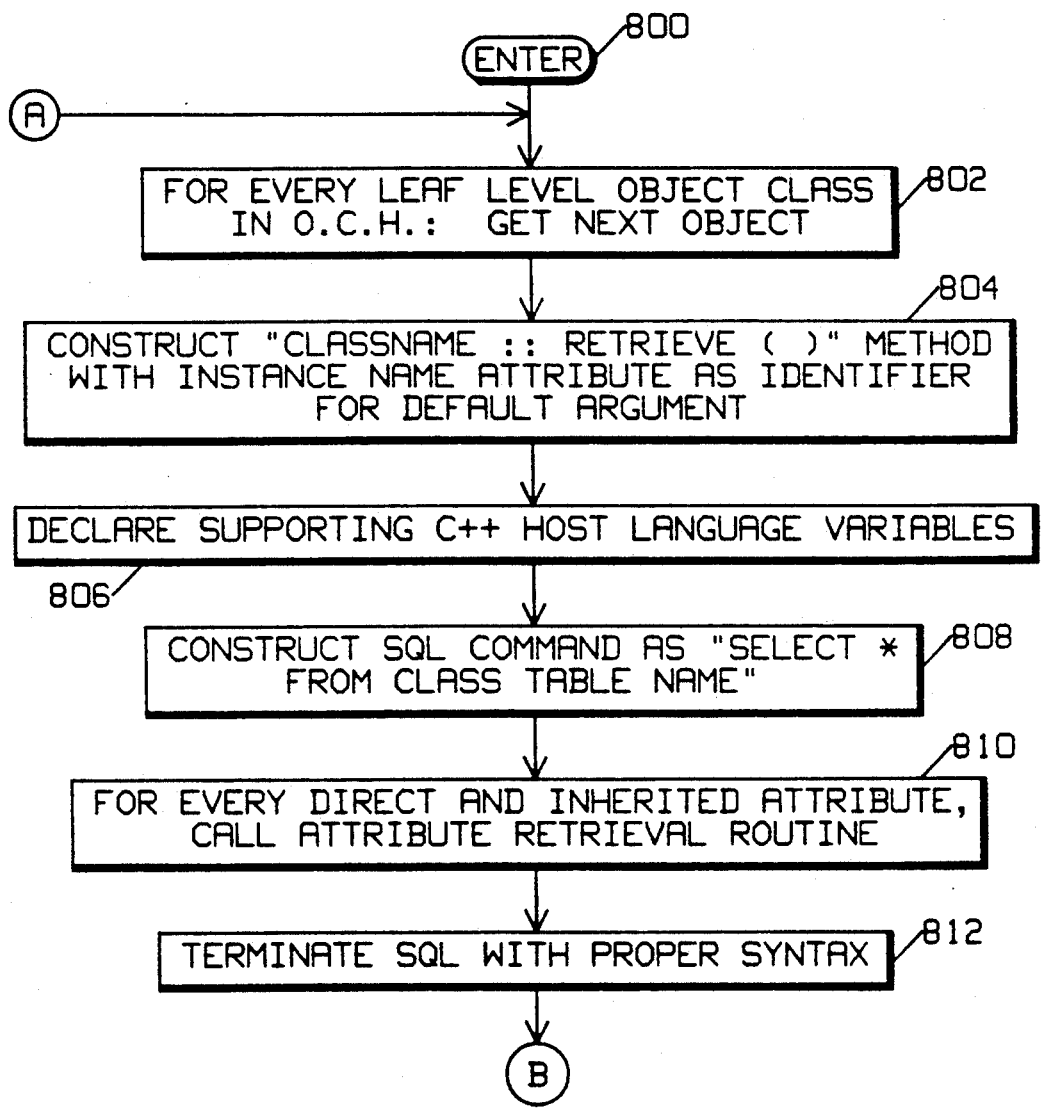
FIGS. 29A and 29B, is a flow chart of the routine for generating a retrieval method for flattened tables of step 282 of FIG. 13.
Figure 29B:
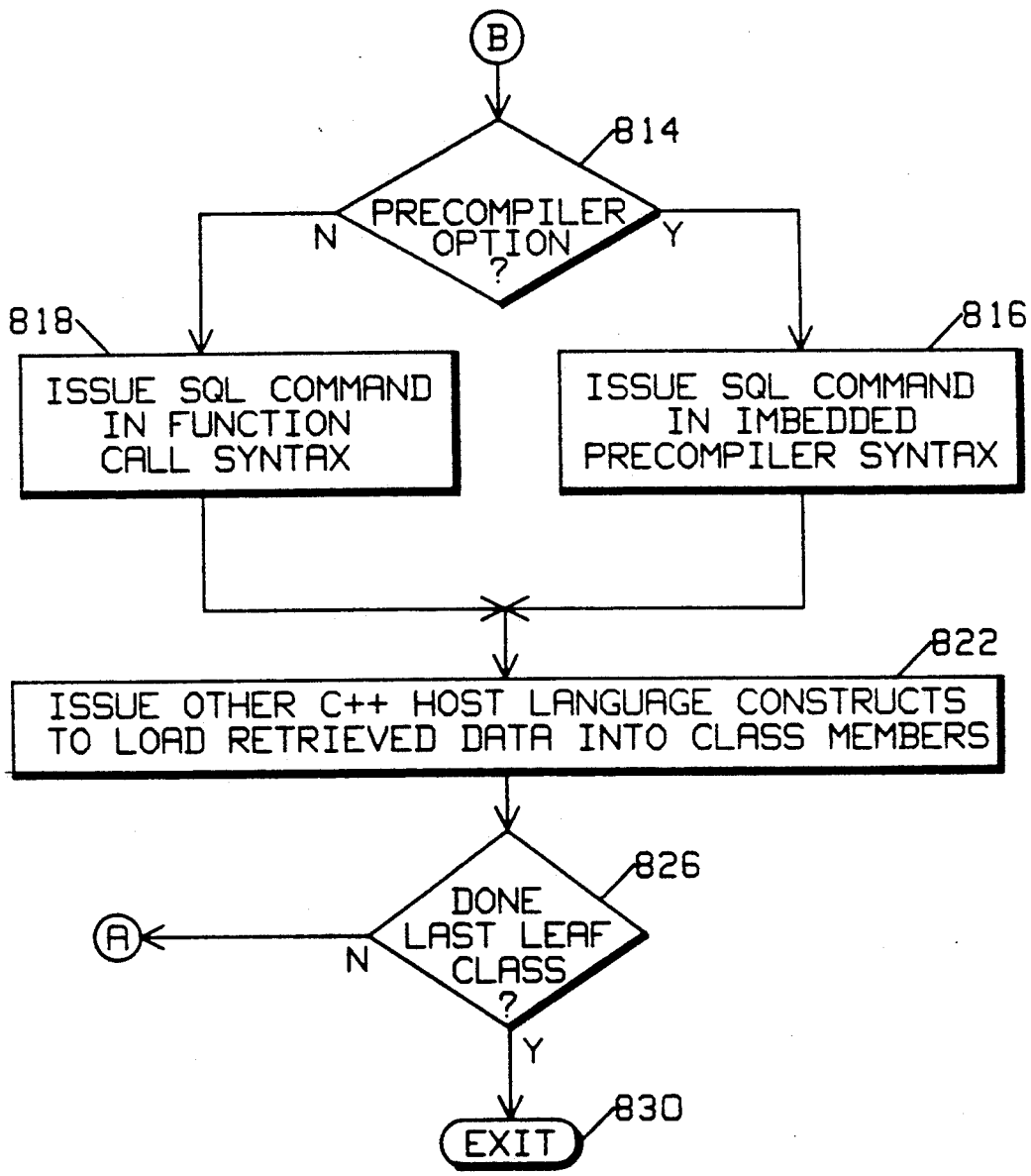

Referring now to FIG. 29, the process of step 282 of FIG. 13 is described in greater detail. This routine begins at step 800 after which each leaf level object class in the object class hierarchy is retrieved at step 802. Step 804 then constructs "class name :: retrieve ( )" method with the instance name attribute as the identifier for the default argument. By convention established by the preferred embodiment, this is the first member of the class structure. Next, at step 806, the supporting C++ host language variables are declared and control passes to step 808. Step 808 constructs the SQL command as "SELECT * FROM class table name". Control then passes to step 810 which calls the attribute retrieval routine for every direct and inherited attribute as described in conjunction with FIG. 22. The SQL command is terminated with proper syntax at step 812 and control passes to 814. Step 814 determines whether or not the user has selected the precompiler option at step 112. If so, the SQL command is issued and embedded precompiler syntax at step 816. If not, the SQL command is issued in function call syntax at step 818. In either event, control passes to step 822. At step 822 the remaining C++ host language constructs are issued to load the retrieved data into class members. Control then passes to 826 which determines if the last leaf class has been processed. If not, control returns to step 802 for processing the next leaf level object class. If so, the routine exits at step 830.

Figure 30:
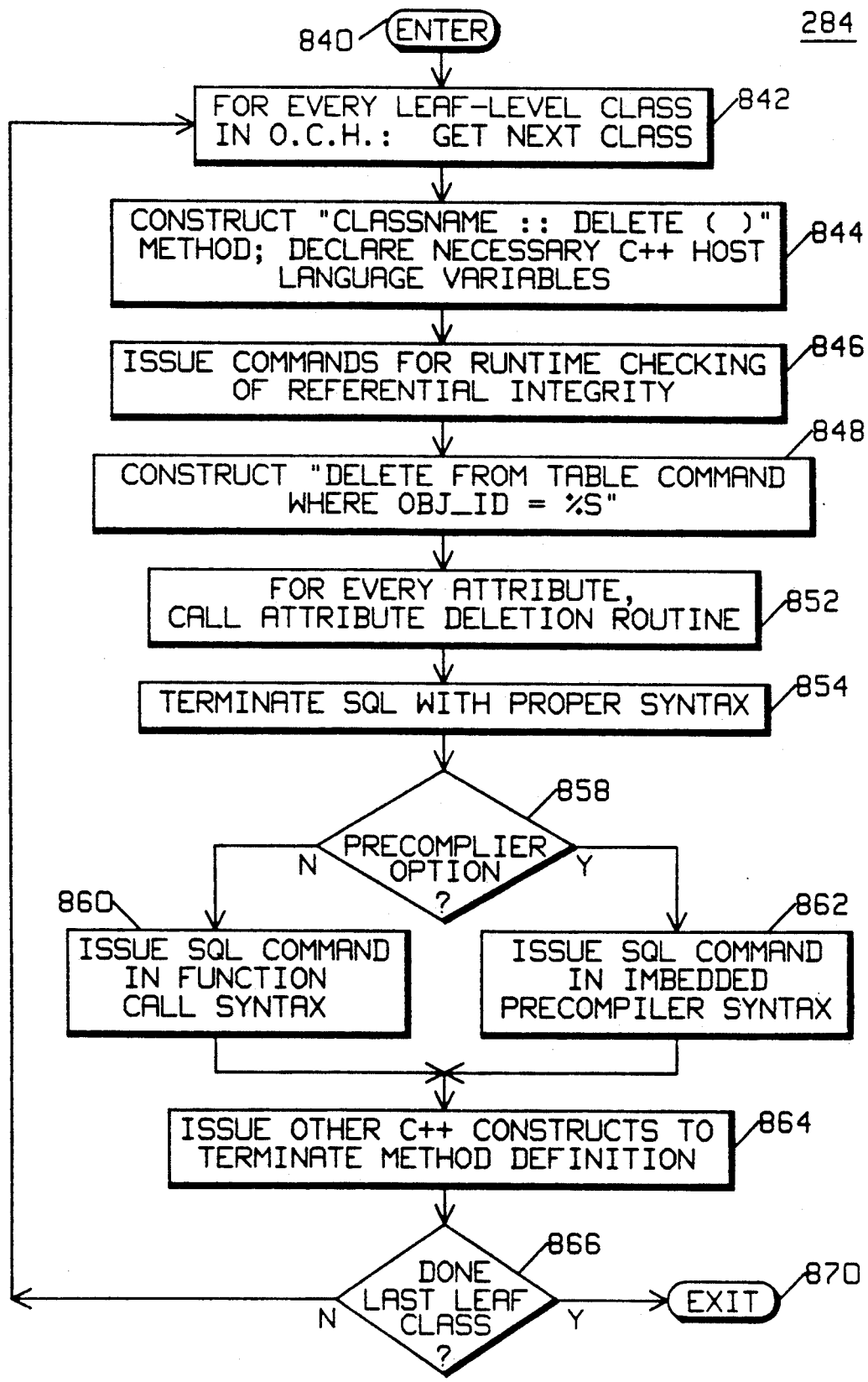
FIG. 30 is a flow chart of the process of generating a deletion method for flattened tables called at step 284 of FIG. 13.

Referring now to FIG. 30 the step 284 of FIG. 13 is described in greater detail beginning at step 840. Step 842 selects every leaf level class in the object class hierarchy for processing by the remainder of the routine. Control then passes to 844 where the routine constructs "class name :: delete ( )" method and the necessary C++ host language variable are declared. Control then passes to step 846 which issues the command for run time checking for referential integrity as described in greater detail in conjunction with FIG. 24. Next, at step 848, the routine constructs "DELETE FROM class_tablename WHERE obj_id=%s" command. Next control goes to step 852 where the attribute deletion routine described in conjunction with FIG. 25 is called for every attribute. Next, the SQL command is terminated with proper syntax at step 854. Control then passes to step 858 where the routine determines whether or not the user has selected the precompiler option at step 112. If not, the SQL command is issued in function call syntax at step 860. If so, the SQL command is issued in embedded precompiler syntax at step 862. In either event control passes to step 864 where other C++ constructs are issued to terminated the method definition. Control then passes to 866 where the routine determines if the last leaf class has been processed. If not, control returns to 842 where the next leaf level class is selected from the object class hierarchy. If so, control passes to 870 where the routine exits.

Figure 31:
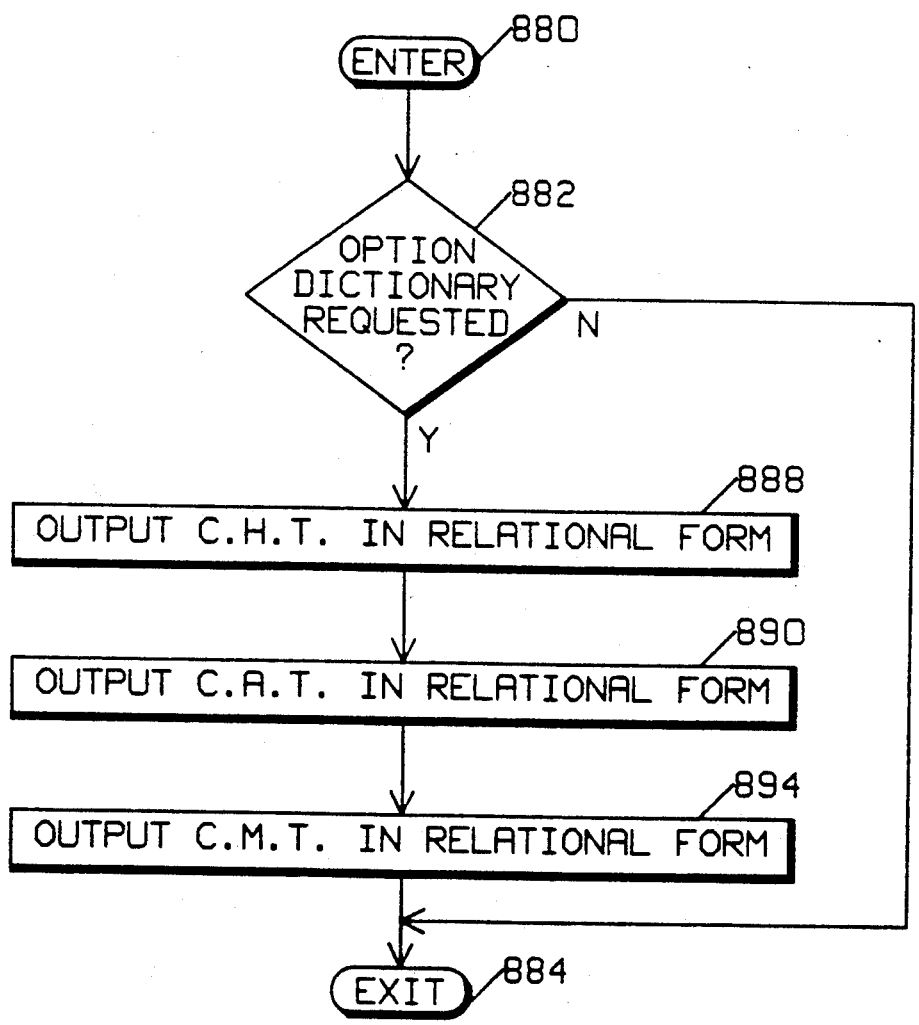
FIG. 31 is a flow chart of the routine for generating optional information of step 118 of FIG. 7.

Turning now to FIG. 31, the generate optional information step 118 of FIG. 7 is described in greater detail. The routine begins at step 880 after which the routine determines if the object dictionary option has been requested by the user at step 112 of FIG. 7. This is accomplished at step 882 and if the object dictionary option has not been requested, control passes directly to step 884 which exits the routine. If the option has been requested, control passes to step 888 where the class hierarchy table is created in relational form and populated with the appropriate records. In the preferred embodiment this takes the form of the object dictionary table entitled "class_hierarchy" shown as table 4 later. Next, control passes to step 890 where the class attribute table is created in relational form and populated with the appropriate records. The preferred embodiment of this table is shown as table 5 entitled "object dictionary table: class_attributes." Control then passes to step 894 where the class methods table is created in relational form and populated with appropriate records. This table is shown later as table 6 entitled "object dictionary table: class_methods". Control then passes to step 884 where the routine exits.

While the above flow charts are helpful in understanding the actual construction of the invention, the theory and operation of the invention are perhaps best understood by considering examples in conjunction with explanation of the theory underlying the treatment of the various types of class hierarchical structures encountered in performing the actual translation process. Accordingly, consider now a C++ example for a the data network example discussed earlier. In this example, the following syntax defines an object (e.g.

modem, multiplexer, switch, etc.) in a managed communication network:

```
class ManagedObject
{
    public:
        char name[32];       // Name of element
        Site site;           // Site attribute
        Vendor vendor;       // Vendor attribute
        short part_no;       // Part Number attribute
        short adm_state;     // Administrative state of object
        short oper_state;    // Operational state of object.
}
```

(In conventional C++ usage, type names beginning with an uppercase character are class declarations, i.e., templates for creating complex object instances, whereas those beginning with a lowercase character are primitive types (e.g. integers, real numbers, character strings, etc).

The above definition of class ManagedObject presumes that prior definitions for class Site and class Vendor are already within scope, since some attributes of the class ManagedObject have values which are instances of those classes. These could have had prior declarations, for example, as follows:

```
class Site
{
    public:
        char name[32];           // Site name
        char address[1024];      // Site address
        char phone_no[20];       // Site phone number
        short site_category;     // Central site or remote site
        char contact_person[32]; // Person to contact at the site
}
class Vendor
{
    public:
        char name[32];           // Vendor name
        char address[1024];      // Vendor address
        char phone_no[20];       // Vendor phone number
        char sales_contact[32];  // Salesman
        char svc_contact[32];    // Service contact
}
```

In this example, both these class definitions are defined only in terms of primitive types, and assume no prior definition of other classes.

The above class definitions can be mapped to a relational database schema in the same manner described above using tabular data structures. For example, the three classes defined above may be mapped to the type of table structures shown as TABLES 1-3 below:

TABLE 1

| TABLENAME: Vendor | | | | | |
|---|---|---|---|---|---|
| obj_id (numeric) | name (char 32) | address (char 1024) | phone_no (char 20) | sales_contract (char 32) | svc_contract (char 32) |

TABLE 1-continued

TABLE 2

| TABLENAME: Site | | | | | |
|---|---|---|---|---|---|
| obj_id (numeric) | name (char 32) | address (char 1024) | phone_no (char 20) | site_category (numeric) | contact_person (char 32) |

TABLE 3

| TABLENAME: ManagedObject | | | | | | |
|---|---|---|---|---|---|---|
| obj_id (numeric) | name (char 32) | site(ref) (numeric) | vendor(ref) (numeric) | part_no (numeric) | adm_state (numeric) | oper_state (numeric) |

With the above definition of relational schema, when actual instances (variables) of type class Site, class Vendor and class ManagedObject are declared, corresponding records can be inserted into each one of the above table structures. As previously mentioned, every declared instance of an object, when stored in the database tables, is stored along with a value of obj_id which is generated internally and automatically by object identifier generator mechanism, which may or may not use underlying routines supported directly within the database management system. The purpose for this is as follows:

When class-values attributes are incorporated within the entity table, a reference is created to the corresponding instance (record) in the table for that particular attribute. For example, when a record is created for a ManagedObject, the attribute values of vendor and site are recorded by storing the reference obj_id to the appropriate pre-declared instances of class Site and class Vendor, which, being defined, should already have records stored in their respective tables.

The above example shows how a class definition may be mapped to a relational schema using primitive and predefined types. Since this procedure is simple and algorithmic, it can be automated using a computer programmed process according to the present invention.

The preferred embodiment of the present invention is designed to operate as a preprocessor, with source C++ as input, but other embodiments can accept other OOP languages such as SmallTalk ™ as input without departing from the invention. The invention includes lexical analysis capability, which "tokenizes" the input stream scanning for constructs of relevance, that is, it looks for class and struct definitions in C++ and then passes them to appropriate action routines. Since the only source constructs of interest to the present invention are class and struct definitions, this lexical analysis capability can be implemented with virtually any standard C++ parser.

Once a C++ class or struct construct is recognized, the translator issues a command in standard SQL to create a relational database schema corresponding to that class or struct construct. The following rules and conventions are used in the preferred embodiment of the present invention in creating the schema:

1. The name of the table is the same as the identifier used for the class or struct name.

2. The name of every column corresponds to the identifier used for the attribute or member name.

3. Attributes having primitive types such as character, integer, etc. are converted to columns of the corresponding type, with appropriate width to store the largest possible value.

4. Attributes having class or struct types are converted to columns which contain a numeric reference to a record into the table for that class or struct, which must already exist in another table.

5. Array-valued or list-valued attributes of complex types, are handled by creating multiple columns—as many as the dimension of the array—with successive elements stored in consecutive columns. This is possible as an array-valued attribute must be declared with an explicit numeric dimension in a class or struct definition. (This does not apply to an array of characters, i.e. a C++ string, which can be directly supported by SQL in a single column as a primitive string type.)

6. A preferably numeric obj_id column is always created, so that other classes which may reference this particular class as an attribute (or as a superclass, as will be explained later) have a "handle" to reference it by.

For example, the following commands are automatically generated as complete definitions of class Site, class Vendor and class ManagedObject are recognized:

```
-- Definition of table structure to hold instances of Site objects
create table Site
(
        obj_id NUMBER(10),
        name CHAR(32),
        address CHAR(1024),
        phone_no CHAR(20),
        site_category NUMBER(6),
        contact_person CHAR(32)
);
-- Definition of table structure to hold instances of Vendor
-- objects
create table Vendor
(
        obj_id NUMBER(10),
        name CHAR(32),
        address CHAR(1024),
        phone_no CHAR(20),
        sales_contact CHAR(32),
        svc_contact CHAR(32)
);
-- Definition of table structure to hold instances of ManagedObject
-- objects
create table ManagedObject
(
        obj_id NUMBER(10),
        name CHAR(32),
        site NUMBER(10),
        vendor NUMBER(10),
        part_no NUMBER(6),
        adm_state NUMBER(6),
        oper_state NUMBER(6)
);
```

The present invention, in this stage, acts as a simple translator which essentially translates an object template from one source language (C++) to another (SQL). These commands may be sent to the SQL interface of any relational database management system for immediate execution, or may be stored in a file for later execution.

DESCRIPTION OF GENERALIZED MAPPING

In order to provide the translation function of the present invention, several techniques are used by the present invention for handling more complex cases of class attributes and methods. These cases are handled as follows:

1. Attributes

Direct attributes are easily handled by the mechanism described above, viz. primitive types are stored using columns of the appropriate type or width, and class-valued direct attributes are stored by creating a column containing a reference into the appropriate table.

2. Inheritance

In C++, a class may be a derived class, in which case it inherits attributes from its parent class. A declaration for a derived class may be as follows:

```
// Define class Modem as a subclass of class ManagedObject
class Modem : public ManagedObject
{
        public:
        short dbkup;    // Dial Backup status
        short txcar;    // TX carrier - constant or switched
        short rxcar;    // RX carrier - constant or switched
        short speed;    // Operating speed
        short altspd;   // Alternate speed
        short nports;   // Number of ports
        short txstat;   // TX status - enables or disabled
        short struc;    // Structure - pt-pt or multipoint
        short orient;   // Orientation - central or remote
}
```

In this example, the object Modem has a number of primitive integer attributes. The feature of interest here is the construct class Modem : ManagedObject, which specifies that the class Modem is a derived subclass of class ManagedObject, which implies the "IS-A" relationship between them. (i.e. A modem "IS-A" managed object). This is also handled through references. The obj_id column, which is automatically created for each class, is now used to store a reference to the instance of the superclass which the current instance in the subclass derives from. Thus, this column will contain the same value as the appropriate record in the schema for the parent class, which can then be used to perform a relational "join" between the two tables. This preserves the concept of inheritance whereby every element of a derived class automatically inherits all attributes of its parent class.

For clarity, the column naming convention is slightly changed. Instead of naming the default column obj_id, it is now named after the identifier for the parent class. The column serves exactly the same function in identifying the object instance; except that it is now used specifically as a join column into the parent's table. The standard SQL command generated in this instance is as follows:

```
-- Definition of table structure to hold instances of Modem objects
create table Modem
(
        ManagedObject NUMBER(10),  // Is now a reference
        to parent
        dbkup NUMBER(6),
        txcar NUMBER(6),
        rxcar NUMBER(6),
        speed NUMBER(6),
```

```
        altspd NUMBER(6),
        nports NUMBER(6),
        txstat NUMBER(6),
        struc NUMBER(6),
        orient NUMBER(6),
);
```

The same technique is used for further derived subclasses. For example, if a class V32modem is a derived subclass of class Modem, it may need to possess additional attributes which an ordinary instance of class Modem may not—e.g. one might need to know if it were an originating or answering unit. Since all other needed attributes for this class would be automatically inherited from class Modem, the definition for this class would simply be:

```
class V32modem : public Modem
{
    public:
        short orig; // Originating or answering unit
}
```

The corresponding schema translation generated by the present invention would simply be:

```
-- Definition of table structure to hold instances of V32modem
-- objects
create table V32modem
(
        Modem NUMBER(10),
        orig NUMBER(6)
);
```

Thus, any created instance of an V32modem object would contain a record in each of the three tables ManagedObject, Modem and V32modem. The value in the column obj_id in the table ManagedObject would be equal to the value in the column ManagedObject in the table Modem, which in turn would be equal to the value in the column Modem of the table V32modem. This value can then be used to "join" the three records together, as is usually done in any normalized relational database.

3. Multiple Inheritance

Multiple inheritance—in which a class may inherit attributes from more than one parent class—is easily handled by creating one reference column as a pointer into the schema for each parent class. For the purposes of persistent storage of objects this is merely an extension of the reference-to-parent implementation and does not represent any conceptual difficulty.

4. View Creation

For derived classes, as well as for classes that contain other class-valued attributes, the schema can be augmented for convenience with the creation of appropriate views, such that all references into parent and attribute classes are automatically resolved, giving the appearance of a single, cohesive entity. For example, a view may be created for class V32modem above with the following SQL command:

```
-- Define a complete view of V32modem objects including
attributes
-- inherited from parent classes
create view vV32modem
as
(
    SELECT * FROM ManagedObject, Modem, V32modem,
        Site, Vendor
    WHERE ManagedObject.%s = %s
        AND ManagedObject.obj_id = Modem.ManagedObject
        AND Modem.ManagedObject = V32modem.Modem
        AND ManagedObject.site = Site.obj_id
        AND ManagedObject.vendor = Vendor.obj_id
);
```

This provides the flexibility of retrieving the entire V32modem object merely by selecting from the view vV32modem, which internally performs the joins the resolve the references to its parent and its attribute classes.

The SQL command to create views such as the above can be automatically generated during the parsing phase, as the parameters of the above command (table names, join column names) have already been determined by recognizing the class structure and its position in the hierarchy.

Description of Run-Time Operations

The previous section defined the generalized mappings between elements of an object class hierarchy and their corresponding schema within a relational database. This section defines how these mappings are used in practice, i.e. how actual instances of objects are stored and retrieved from a relational database.

The purpose of this run-time interface, which is also generated automatically, is to hide the underlying relational structures from the application, so that the application need not be cognizant of how exactly the persistent objects are stored. The application need merely make calls to the new methods store, retrieve and delete which the present invention will define for the objects.

1. Instance Definition

The present process, while preprocessing source constructs, is designed not only to perform template translation from C++ classes to SQL schema, but also to create new methods (which are similar to functions) associated with the object, which an application may then us to store and retrieve it.

For example, consider the actual code fragment from a C++ application which actually declares instances of objects defined in the previous section.

```
// EXAMPLE OF AN APPLICATION CODE FRAGMENT
    Site s1;          // Declare an object of type Site
    Vendor v1;        // Declare an object of type Vendor
    V32modem e1;      // Declare an object of type V32modem
    enum { CENTRAL, REMOTE };  // enumerators
        for site category
// Assign values to attributes of site s1
// (This could have been done through constructors
// but is shown as explicit assignments for clarity.)
    strcpy(s1.name, "Bigtime Corporation");
    strcpy(s1.address, "12345 High St, Megalopolis, USA 00000");
    strcpy(s1.phone_no, "800-BIGTIME");
    s1.site_category = CENTRAL;  // Central site
    strcpy(s1.contact_person, "John Q. Public");
// Assign values to attributes of vendor v1
    strcpy(v1.name, "Racal-Milgo");
    strcpy(v1.address, "1601 N. Harrison Parkway, Sunrise,
        FL 33323");
    strcpy(v1.phone_no, "305 846 1601");
    strcpy(v1.sales_contact, "I. Sellit");
```

```
        strcpy(v1.svc_contact, "1. Fixit");
// Assign values to attributes of V32modem e1: note that
// attributes are inherited from class ManagedObject and class
// Modem as well
        enum { LOCKED, UNLOCKED, SHUTTING_DOWN };
            // Enum for adm_state
        enum { DISABLED, ENABLED, ACTIVE, BUSY };
            // Enum for oper_state
        strcpy(e1.name,"My_v32_1");
        e1.site = s1;
        e1.vendor = v1;
        e1.part_no = 12345;
        e1.adm_state = LOCKED;
        e1.oper_state = DISABLED;
        e1.dbkup = 0;
        .
        .
        .
        e1.orig = 0;
```

The above example illustrates a declaration of one instance each of objects of type Site, Vendor and V32modem. The declared instances s1, v1 of types Site and Vendor also happen to the attributes site and vendor of the instance e1 of type V32modem.

2. Storage of Simple Types

At preprocessing time, therefore, the process needs to create mechanisms for storing assigned instances within the relational schema defined in the previous section. This is done by creating new methods associated with an object which can be used for storage and retrieval. These methods can also be generated simplistically and algorithmically. For objects Site, Vendor and V32modem these methods would be as follows:

```
// Example of method to store a Site object
void Site::store( )
{
    char sql_buffer[1024];
    int obj_id;
    obj_id = get_new_obj_id("Site"); // Get site-id for new site
Construct SQL INSERT command to store site
    sprintf(sql_buffer, "INSERT INTO SITE (obj_id, name, address,
        phone_no, site_category, contact_person) VALUES
        (% d,'%s','%s','%s',%d,'%s');",
        obj_id,
        this→name,
        this→address,
        this→phone no,
        this→site_category,
        this→contact_person);
    sql_cmd(sql_buffer); // Execute SQL Command
}
```

The syntax above demonstrates that the method store( ) is associated with the class Site (through the use of the Site: scope qualifier), returns no value (void), accepts no arguments, and uses the implicit pointer this which in C++ is always available to all methods as a reserved pointer for referencing the object for which the method is invoked.

Note that in the above code, which is generated automatically, no special intelligence is required, as all the information needed to generate the above code is already available in the class Site construct which is already known. The only assumptions made in the above are:

A. It is assumed that the routine get_new_obj_id already exists and generates a unique new object identifier from the name space of like objects. This is a fairly simple functionality which is commonly available in many database systems and/or database applications. The call above (get_new_obj_id("Site")) may have a simple implementation such as looking at all records in the table Site, selecting the maximum value in the obj_id column, adding one to it and returning the value, which is now guaranteed to be unique. Details are omitted as they are only peripherally relevant to the current invention.

B. The library call to actually execute the constructed SQL command (exemplified by sql_cmd in the above code) may vary in name depending on the host language interface of the selected relational database management system.

Similarly, the code for storing an instance of class Vendor would be:

```
// Example of method to store a Vendor object
void Vendor::store( )
{
    char sql_buffer[1024];
    int obj_id;
    obj_id = get_new_obj_id("Vendor");
    sprintf(sql_buffer, "INSERT INTO VENDOR (obj_id, name,
        address, phone_no, sales_contact, svc_contact) VALUES
        (%d,'%s','%s','%s','%s','%s');",
        obj_id,
        this→name,
        this→address,
        this→phone_no,
        this→sales_contact,
        this→svc_contact);
    sql_cmd(sql_buffer);
}
```

As a comparison of the methods Site::store( ) and Vendor::store( ) will show, it is apparent that all the information required for generating the <objectname>::store( ) code already exists in the definition of the class, which is already known. Therefore the above code fragment can be simply generated by the present process in a completely deterministic, algorithmic fashion from just the class definition.

The above source code, which is generated automatically by the present invention at preprocessing time, can be compiled along with the rest of the source code. An application then may make calls at run-time to actually store the object. For example, the calls
    s1.store( );
    v1.store( );
made at runtime by any application, would cause the actual storage of the objects s1, v1 in the database, by the insertion of records in the corresponding relational table.

3. Retrieval of Simple Classes

Retrieval of values from persistent storage is done by application through its corresponding retrieve method, which is also generated automatically. The major difference between the store and the retrieve methods is the fact that the latter takes arguments. These arguments are respectively used as the value and name of the key attribute, which serve as a "handle" to tell the method which instance of the object to retrieve from persistent storage, since in general multiple instances of the same object type may have been stored.

The code for this method, generated automatically, would be as follows:

```
// Example of method to retrieve a Site object
```

-continued

```
void Site::retrieve(const char *value_str,
    const char *key_attribute="name")
{
    char sql_buffer[1024]; // Buffer to construct sql command char
    data_buffer[1024];     // Buffer to receive data
    sprintf(sql_buffer, "SELECT * FROM Site WHERE %s = %s",
        key_attribute, value_str);
    sql_select(sql_buffer, data_buffer);
// Deconstruct data buffer into current class Site object instance
    site_parse(data_buffer, this);
}
```

The syntax above demonstrates that the method retrieve( ) is associated with the class Site (through the use of the Site: scope qualifier), returns no value (void), and uses the implicit pointer this to reference into the current object. In addition, it uses the arguments value_str and key_attribute to construct the selection condition. The key_attribute argument has the default value of "name", which means that if retrieve is invoked with only one (the first) argument, it is automatically assumed to be the value for the name attribute of the desired object. The process of the preferred embodiment of the present invention is designed to always generate the identifier for the first attribute in a class structure as the default key attribute in the retrieve method, since that is the most common expected usage. Of course, the default can always be overridden by actually specifying a second argument, in case it is desired to select the object using an attribute other than "name".

Note that in the above code, which is generated automatically, no special intelligence is required, as all the information needed to generate the above code is already available in the class Site construct which is already known. The only assumptions made in the above are:

A. The library call to actually execute the constructed SQL request (exemplified by sql_select in the above code) may vary in name depending on the host language interface of the selected relational database management system.

B. It is also trivial to generate code for the function site_parse, which is used to format the retrieved data for casting into the in-core class representation of the current object, pointed to by this; its details vary on the format of the data returned by the underlying RDBMS, and are omitted as they are not essential to the current invention.

C. Additional, standard code can also be generated into the function for handling error conditions which may happen due to no matches on the SELECT condition, multiple matches on the SELECT condition, etc. This code is required for completeness but is not relevant to the essence of the current invention, and hence is omitted for simplicity.

An application wishing to retrieve information from persistent storage for a site named "Bigtime Corporation" and store in the variable s1, would then simply make the call s1.retrieve("Bigtime Corporation")

An application wishing to retrieve information from persistent storage for a site with the contact person "John Q. Public", would simply make the call s1 retrieve("John Q. Public", "contact_person");

which would cause the Site::retrieve( ) method to select using the contact_person attribute instead of the default name attribute.

Similarly, the code for retrieving an instance of class Vendor would be:

```
// Example of method to retrieve a Vendor object
void Vendor::retrieve(const char *value_str,
    const char *key_attribute="name")
{
    char sql_buffer[1024];
    char data_buffer[1024];
    sprintf(sql_buffer, "SELECT * FROM Vendor
        WHERE %s = %s", key_attribute,
        value_str);
    sql_select(sql_buffer, data_buffer);
    vendor_parse(data_buffer, this);
        // Deconstruct retrieved values into "this"
}
```

Again, all the information required to generate the above code fragment is directly available from the definition of class Vendor which is already defined, and no special intelligence is necessary. Therefore, the code for the above method can be generated in a simple, algorithmic fashion from the definition of the class Vendor itself.

Finally, it should be noted that the call to the routines store and retrieve is the only interface seen by the application, which need not be aware of how exactly the objects are stored, the underlying relational structures, or even the fact that there is an infrastructural relational database.

4. Storage of Derived Classes

The case for class V32modem is a little more complicated, since it requires insertion of records into three tables, and referencing records in two others. However, this is presents no real conceptual difficulty, since the information is already known, from parsing the source class constructs, that class V32modem is a derived class in the object class hierarchy, and therefore a SQL INSERT statement must be issued for each one of the table schemes corresponding to all its superclasses. The code fragment for this case is then generated as:

```
// Example of method to store an V32modem object
void V32modem::store()
{
    char sql_buffer[1024];
    int obj_id;
    int site_ref, vendor_ref;
// First obtain the reference values for Site and Vendor
// which must be inserted into the ManagedObject record.
    sprintf(sql_buffer, "SELECT obj_id FROM Site WHERE name = %s",
        this->site.name);
    site_ref = atoi(sql_cmd(sql_buffer));
    sprintf(sql_buffer, "SELECT obj_id FROM Vendor WHERE name =
        %s", this->vendor.name);
    vendor_ref = atoi(sql_cmd(sql_buffer));
```

-continued

```
// known that the ManagedObject is the highest superclass
// of the derived class V32modem, and therefore the record
// insertion must start from there. Hence, a new object id is
// obtained from the ManagedObject namespace rather than from
// the V32modem namespace.
    obj_d = get_new_obj_id("ManagedObject");
// Store attributes inherited from parent class ManagedObject into
// the table for ManagedObjects
    sprintf(sql_buffer, "INSERT INTO ManagedObject (obj_id, name,
           site, vendor, part_no, adm_state, oper_state)
           VALUES (%d, '%s', %d, %d, %d, %d, %d);",
         obj_id, this->name, site_ref, vendor_ref,
         this->part_no, this->adm_state, this>oper_state);
    sql_cmd(sql_buffer); // Execute it
// Store attributes inherited from parent class Modem into the
// table for Modems
    sprintf(sql_buffer, "INSERT INTO Modem (ManagedObject, dbkup,
         txcar, rxcar, speed, altspd, nports, txstat, struc,
         orient) VALUES (%d, %d, %d, %d, %d, %d, %d, %d,
         %d, %d);",
         obj_id, this->dbkup, this->txcar, this->rxcar,
         this->speed, this->altspd, this->nports,
         this->txstat, this->struc, this->orient);
    sql_cmd(sql_buffer); // Execute it
// Store direct attributes for V32modem in its own table
    sprintf(sql_buffer, "INSERT INTO V32modem (Modem, orig) VALUES
         (%d, %d);",
         obj_id, this->orig);
    sql_cmd(sql_buffer); // Execute it
}
```

While the code above may appear complicated, it is completely derivable using a deterministic, algorithmic procedure using only the knowledge of class structures and the relationships between them (attribute-domain relationships and subclass-superclass relationships), which is already known. Briefly, these steps may be listed as follows:

A. For a class having no superclasses and no class-valued attributes, the INSERT statement is simply generated by creating a new obj_id in its name space and inserting all its attributes into the table (as was done in the methods Vendor::store( ) and Site::store( ) earlier.)

B. For a class having class-valued attributes, a reference needs to be stored for the attribute class; therefore, select the obj_id column from the record for the attribute class from its own schema, and insert its value in the appropriate place in the record for the current object (as was done for the attributes Vendor and Site of class ManagedObject above).

C. For a class having one parent class, start at the highest superclass. Obtain a new obj_id from the name space of the objects in the highest superclass, and insert a record in its table. Using the same obj_id, step all the way down the class hierarchy tree, inserting appropriate records in each table, until we have completed the record for the current object instance.

D. For a class having multiple parent classes, start at each highest superclass. Iterate over each path from each highest superclass down to the current class, as explained above. Note that the table for the current class will now have multiple reference columns, one for each parent class; the appropriate reference will be stored in each one of these columns to complete the record for the current object instance.

E. For a class having parent classes which may contain private attributes, the insertion command for the record in the parent's table will contain a NULL placeholder where the attribute value would normally have been. This is because private members of a parent class are not visible in derived classes, and thus a reference to (this→private_member_of_parent) would cause an error.

As can be seen, the above algorithm can be automated in a computer program, and requires no knowledge other than class structure and the structural relationships between them. Both types of class relationships (attribute-domain relationships, such as between ManagedObject and Site, and hierarchy relationships, such as between ManagedObject and Modem) can be accommodated within this method.

5. Retrieval of Derived Types

Retrieval of derived types can also be accomplished using the knowledge of class structure and relationships. This requires the creation of a statement that uses the appropriate kinds of relational joins, using the references which have been stored in the database.

An example follows:

```
// Example of method to retrieve an V32modem object
void  V32modem::retrieve(const char *value_str, const char
         *key_attribute="name")
{
    char sql_buffer[1024];
    char data_buffer[1024];
    sprintf(sql_buffer, "SELECT * FROM ManagedObject, Modem,
         V32modem, Site, Vendor WHERE ManagedObject.%s = %s
           AND ManagedObject.obj_id = Modem.ManagedObject
           AND Modem.ManagedObject = V32modem.Modem
           AND ManagedObject.site = Site.obj_id
           AND ManagedObject.vendor = Vendor.obj_id",
```

```
        key_attribute, value_str);
// Alternately, if views have been defined for derived classes, the
// above call can be changed to select directly from the view:
//
// sprintf(sql_buffer, "SELECT * FROM vV32modem WHERE %s = %s",
// key_attribute, value_str);
        sql_select(sql_buffer, data_buffer);
        v32modem_parse(data_buffer, this);
// Deconstruct retrieved values into "this"
}
```

The retrieval algorithm for a derived class works exactly the same way as that for the simple class, the one change being that the SELECT statement is a little more complicated, requiring joins into tables to reconstruct both the attribute-domain relationships and sub-class-superclass relationships from the relational schema. However, the generation of this SELECT statement can also be simply automated as it requires no knowledge other than class relationships, which is already available.

Therefore, the only interface seen by an application for inserting and retrieving derived objects from persistent storage, is also simply e1.store( );
e1.retrieve("My_v32_1");

and requires the application to have no knowledge whatsoever of the underlying relational representation.

Another alternative to retrieval of instances of derived classes would be to retrieve from the view of the class object, similar to the one described above in the Section on Views. If the view definition is generated, then the joins implementing the complete view of the object instance need no longer be specified in the embedded SQL within the ,object-class>::retrieve( ) function. The retrieve function may now be merely implemented with a SQL statement that selects from the view. This will produce identical results, as it is now the view definition which internally implements the required joins.

6. Deletion of Object Instances

Another simple interface method can be created on every object for applications to request the deletion of objects from persistent storage. The <object-name>::delete( ) method would take no arguments, and would delete objects based on the name attribute which is already available in its in-memory representation through the this pointer. As with the retrieve method, the present invention is designed to assume that the first data member attribute of a class structure is an object identifier, based on whose value deletion decisions can be made.

```
// Example of method to delete a Site object
void Site::delete()
{
    char sql_buffer[1024]; // Buffer to construct sql command
    sprintf(sql_buffer, "DELETE FROM Site WHERE name = %s",
        this->name);
    sql_cmd(sql_buffer);
}
```

```
// Example of method to delete a Vendor object
void Vendor::delete()
{
    char sql_buffer[1024];
    sprintf(sql_buffer, "DELETE FROM Vendor WHERE name = %s",
        this->name);
    sql_cmd(sql_buffer);
}
```

```
// Example of method to delete an V32modem object
void V32modem::delete()
{
    char sql_buffer[1024];
    int obj_id;
    // Start at the highest superclass and determine its obj_id from
    // its name attribute
    sprintf(sql_buffer, "SELECT obj_id FROM ManagedObject
        WHERE ManagedObject.name = %s", this->name);
    obj_id = atoi(sql_cmd(sql_buffer)); // Execute it, determine
                        // obj_id
// Starting at the highest superclass, delete records of the
// current object instance from each table along its object class
// hierarchy
    sprintf(sql_buffer, "DELETE FROM ManagedObject where obj_id =
        %d", obj_id);
    sql_cmd(sql_buffer);
    sprintf(sql_buffer, "DELETE FROM Modem where ManagedObject =
        %d", obj_id);
    sql_cmd(sql_buffer);
    sprintf(sql_buffer, "DELETE FROM V32modem where Modem = %d",
        obj_id);
    sql_cmd(sql_buffer);
```

```
}
```

As the above example for the delete method for a derived class shows, the DELETE FROM clause only operates on records from the tables involving direct hierarchy relationships. No deletion is performed from the tables corresponding to attribute domains. Thus, the method V32modem::delete( ) causes deletion of records from tables ManagedObject, Modem and V32modem only; it does not cause records to be deleted from tables Vendor and Site, even though these classes are attributes of class V32modem and entries in the V32modem table contain references to entries in these tables. An application would therefore delete object instances merely by performing calls to the appropriate delete methods, as follows:
    e1.delete( );
    s1.delete( );
    v1.delete( );

7. Updates of Object Instances

Updates can be accomplished by a combination of retrieve( ), delete( ), modify memory representation, and store( ) sequences. Alternatively, specialized routines for updates based on various key attributes can also be generated by the present invention if necessary. This presents no conceptual difficulty, but rather depends on the kind of operations performed by each specific application.

8. Encapsulation

In the source language, run-time visibility control is achieved using public, private and protected sections of class definitions. Since such visibility control is not meaningful for persistent storage of objects, the difference between private, protected and public attributes is ignored for the purposes of storage in the relational schema.

All created methods (e.g. store, retrieve and delete) are considered private, as they are not required to be visible outside the current class definition. In preprocessing the C++ source code, the present preprocessor would actually rewrite the class definition placing the additional declarations
    private
    virtual void store( );
    virtual void retrieve( );
    virtual void delete( );
within the class definition. It is this re-declared class that would then be passed on the actual C++ compiler. The key word private implies that these methods are not visible outside the current object. The key word virtual is a mechanism for supporting polymorphism and implies that derived classes are free to re-implement those functions as they choose.

The examples of the created methods above were shown in detail above for clarifying the concept. In general, however, it should be possible using C++ syntax to re-implement, for example, the V32modem::store( ) method by making internal calls to the Modem::store( ) and ManagedObject::store( ) methods, since the storage of an V32modem object causes records to be inserted in all three tables ManagedObject, Modem and V32modem.

DESCRIPTION OF PREFERRED ENHANCEMENTS

Numerous enhancements to the present invention are possible and will occur to those skilled in the art. Examples of the types of enhancements currently envisioned and anticipated are as follows:

1. Error Checking

A preferred implementation of the present invention would contain many enhancements to the simple functionality described above, including rigorous error-checking and graceful error recovery. Techniques for implementing such error trapping and recovery are well known and will be apparent to those skilled in the art. Important considerations in an actual implementation would be issues such as atomic commits, rollbacks in case of error, and returning an indication of status to the application (possibly through a status code as the return value of the method, in which case all methods above need to be re-declared as int rather than void).

Appropriate code fragments should preferably also be generated to log on to the underlying relational database host platform, to log off, to commit work, and to rollback in the event of error.

2. Precompiler SQL Interface

The examples shown contain implementations using a call interface, in which SQL statements are passed as strings inside character buffers. A different but completely equivalent implementation could also be generated using embedded SQL constructs. This means that the relevant SQL statements would not be executed through the sql_cmd( ) function, but directly following an EXEC SQL source construct. This would then be passed as source to a vendor-supplied SQL precompiler before being passed to a C++ compiler. Such an alternative implementation does not change the basic process or its design, as it is completely equivalent; the variations are only in the generated output source code.

For brevity, only a few examples are shown below to demonstrate how equivalent functionality may be obtained using SQL precompiler calls.

```
// Example of method to store a Site object
// using SQL Precompiler calls
void Site::store()
{
    EXEC SQL BEGIN DECLARE SECTION;
    char sql_buffer[1024];
    EXEC SQL END DECLARE SECTION;
    int obj_id;
    obj_id = get_new_obj_id("Site"); // Get site-id for new site
    // Construct SQL INSERT command to store site
    sprintf(sql_buffer, "INSERT INTO SITE (obj_id, name, address,
```

```
                phone_no, site_category, contact_person) VALUES
            (%d,'%s','%s','%s',%d,'%s');",
        obj_id,
        this->name,
        this->address,
        this->phone_no,
        this->site_category,
        this->contact_person);
    EXEC SQL EXECUTE :sql_buffer;
}
// Example of method to retrieve a Site object
// using SQL Precompiler calls
void Site::retrieve(const char *value_str, const char
        *key_attribute="name")
{
    EXEC SQL BEGIN DECLARE SECTION;
    char sql_buffer[1024]; // Buffer to construct sql command char
    name[32]; // Temporary variables to read attributes into
    char address[1024];
    char phone_no[20];
    short site_category;
    char contact_person[32];
    EXEC SQL END DECLARE SECTION;
    sprintf(sql_buffer, "SELECT * FROM Site WHERE %s = %s",
        key_attribute, value_str);
    EXEC SQL DECLARE C CURSOR FOR :sql_buffer;
    EXEC SQL OPEN C;
    EXEC SQL FETCH C INTO
            :name, :address, :phone_no, :site_category,
            :contact_person;
    EXEC SQL CLOSE C;
    strcpy(this->name, name);
    strcpy(this->address, address);
    strcpy(this->phone_no, phone_no);
    this->site_category = site_category;
    strcpy(this->contact_person, contact_person);
}
// Example of method to delete a Site object
// using SQL Precompiler calls
void Site::delete()
{
    EXEC SQL BEGIN DECLARE SECTION;
    char *name;
    EXEC SQL END DECLARE SECTION;
    name = this->name;
    EXEC SQL DELETE FROM SITE WHERE name = :name;
}
```

3. Handling of Pointers

For class data members whose type is "pointer to type" rather than just a type, the approach taken by the present invention is to de-reference the object (as many times as necessary) until a non-pointer type is obtained. The primitive type is then stored directly in the corresponding database column. Often this takes the form of a BLOB (Binary Large Object) if the pointer was actually pointing to a large array, for example.

During retrieval, the BLOB is read off persistent storage into memory allocated from the free store. The appropriate number of indirections are performed to obtain a semantically meaningful value for the pointer to this object, which is then assigned to the instance variable of the current object this. Thus, while the reconstructed object has exact values restored in its non-pointer data members, the value restored to its pointer members will be different. However, the representation restored to the area in memory to which the pointer points, will be exactly consistent with what it was when the object was stored, albeit this will be in different location within the runtime memory.

The number of bytes stored from the de-referenced pointer into the BLOB column is determined using the sizeof( ) operator, applied to the type of the object pointed to. However, sometimes it is not apparent from the class definition how large the object pointed to by the pointer member is. This could be the situation when the pointer points to, say, dynamically allocated memory from the free store, whose size is determined at runtime. In this event, a difficulty is encountered in determining exactly how large the blob is, i.e. how much binary data should be dumped from memory into the persistent store. This difficulty is not handled intelligently at the present time, and therefore developers are advised not to use pointers to objects of unspecified size, as members of classes that will require persistent storage.

4. Automation

The storage and deletion of objects in persistent storage can be automated if desired, by making automatic calls to the <object-name>::store( ) and <object-name>::delete( ) methods from the constructors and destructors for the object class, respectively. This is possible if there is sufficient initialization information in a C++ constructor for attribute columns in a relational schema to be inserted at the time of object creation. Similarly, a destructor may automatically drop an object from persistent storage when it is deleted from memory or exits out of scope.

For persistent objects, language support in the form of constructors and destructors may be viewed as special cases of triggers in a database representation. In particular, an example can be provided in the case of a copy constructor, in which a new object instance may be initialized by merely copying attributes from a pre-existing instance of the same object class. In C++, a copy constructor is of the type X::X ( const X& )

A copy assignment operator may also be defined as follows:

X& X::operator=( const X& )

In both these situations, if the new instance is required to be persistent, the copy constructor or the copy assignment operator may choose to internally invoke the X::store( ) method. Similarly, the destructor X::~X( ) may choose to internally invoke the X::delete( ) method.

In general, the automation of consistency between the persistent representation of an object and it's in-memory image—which may need to be maintained upon object creation, deletion and modification—depends on the requirements of the application and is best defined by the application developer.

5. Indexing

Indexing is performed automatically from within the present process to define unique key attributes for each table. The process assumes that, for a class having no superclasses, the object identifier (i.e. the obj_id column, which is automatically generated) is the defining (key) attribute. It will then construct a unique index on that column in the entity table. For derived classes, this will not be the case; the join column into the parent class table will be used as the unique index. Further, non-unique indices will also be created on join columns into tables of class-valued attributes.

In the above examples, the following commands will be automatically generated to implement this indexing scheme:

```
-- For top-level classes, construct a unique index on
-- the obj_id column
    create unique index xSite on Site
        (obj_id);
    create unique index xVendor on Vendor
        (obj_id);
    create unique index xManagedObject on ManagedObject
        (obj_id);
-- For derived classes, construct a unique index on the
-- reference column into the parent's table
    create unique index xModem on Modem
        (ManagedObject);
    create unique index xV32modem on V32modem
        (Modem);
-- Create additional non-unique indexes on reference columns
-- into the tables of class-valued attributes, to speed join
-- performance
    create index xManagedObject2 on ManagedObject
        (site);
    create index xManagedObject3 on ManagedObject
        (vendor);
```

REFERENTIAL INTEGRITY

1. Integrity Between Filial Classes

In the implementation described above, referential integrity between filial classes (i.e. classes that share a subclass-superclass relationship along the class hierarchy) is always assured since insertions and deletions of records take place atomically, i.e. within a single interface method. Therefore, given graceful error recovery in an actual implementation, there should be no situations where dangling references remain in the database and thus render it inconsistent. This is because the values in all superclasses tables are also dropped when an object is dropped (making use of the join-into-parent table columns), thus always leaving the database in a consistent state. Therefore, garbage collection is never necessary for references along the class hierarchy.

2. Integrity Between Non-Filial Classes

Non-filial classes are classes that do not share a subclass-superclass relationship, but are related in other ways. For example, a member attribute of one class may be another class.

Care should be taken for class-valued attribute domains for ensuring referential integrity. When an object instance which is referred to by another object instance is deleted, the referring object instance now contains a garbage pointer. For example, let us suppose an object instance of type class V32modem has entries in the tables ManagedObject, Modem and V32modem. This object also contains in its ManagedObject.Site column, a reference to a valid instance of an object of type class Site, which has its own record in table Site. Now, if this Site object were destroyed, its record in the table Site would be deleted. However, a reference to this object is still contained in the record of the object V32modem, which now becomes a garbage pointer or a dangling reference.

Several approaches may be taken to solve this problem, for example:

A. Strong Referential Integrity Preservation: We do not allow a Site record to be deleted if there are any ManagedObject records that contain a reference to it. This implies the implementation of the Site::delete( ) method must check whether any records in the ManagedObject table point to current Site instance requested to be deleted. If no reference is found, deletion proceeds normally; otherwise, an error is returned.

This requires the method to know what other objects classes could possibly contain references to the current object class—which can be determined at compile-time by remembering references in the object class hierarchy, or at run-time by querying the data dictionary. Further, it involves run-time checking for possible references from other objects on every delete request, which slows down performance. On the other hand, it always leaves the database in a consistent state.

B. Weak Referential Integrity Preservation: We allow the deletion of Site records, but we still check whether any instance of a ManagedObject refers to it. If a reference is found, we replace that reference with a NULL value. Thus, a potential garbage pointer now becomes a NULL pointer. Obviously, whether this makes sense depends on the semantics of that particular relationship.

C. Garbage Collection: We allow the deletion of Site records without checking for external references. Periodically, we run a garbage collector to track down dangling references in the ManagedObject and possibly other tables, and replace those values with NULL values. The garbage collection mechanism is not described as it is a well-understood technology and lies outside the scope of the present invention.

D. No Integrity Preservation: We allow the deletion of records and never make an attempt to resolve any dangling references. This would be the simplest to implement, but clearly the least desirable solution.

The preferred embodiment offers the chose of all the above options, and will generate <object-name>:-:delete methods corresponding to each one of the above referential integrity strategies, as shown in the following examples.

```
// Site deletion method under Strong Referential Integrity strategy
void Site::delete(const char *value_str, const char
      *key_attribute="name")
{
    char sql_buffer[1024]; // Buffer to construct sql command
    int refcounts;      // Number of reference counts
    sprintf(sql_buffer, "SELECT COUNT(*) FROM ManagedObject, Site
          where Site.%s = %s AND ManagedObject.Site = Site.obj_id",
          key_attribute, value_str);
    refcounts = atoi(sql_cmd(sql_buffer));
                // Execute counting command
    if (refcounts != 0)
}
    return ERROR; // Return an error if nonzero reference count
}
// Proceed with normal deletion otherwise
    sprintf(sql_buffer, "DELETE FROM Site WHERE %s = %s",
          key_attribute, value_str);
    sql_cmd(sql_buffer);
}
// Site deletion method under Weak Referential Integrity strategy
void   Site::delete(const    char    *value_str,  const    char
*key_attribute="name")
{
    char sql_buffer[1024]; // Buffer to construct sql command
// Update any reference counts to NULL
    sprintf(sql_buffer, "UPDATE ManagedObject SET Site = NULL
          WHERE ManagedObject.Site = Site.obj_id AND Site.%s
          = %s",
          key_attribute, value_str);
    sql_cmd(sql_buffer);
// Proceed with normal deletion
    sprintf(sql_buffer, "DELETE FROM Site WHERE %s = %s",
          key_attribute, value_str);
    sql_cmd(sql_buffer);
}
```

For all other strategies, the Site::delete( ) method would remain the same as shown in the Section on Storage of Simple Types, to be invoked periodically at the user's discretion, can also be generated automatically under the third strategy described above; the code for this method is not shown as it is not central to the theme of the current problem.

Again, all the source code above can be automatically generated from knowledge of references through the object class hierarchy, and knowledge of the kind of referential integrity strategy desired—indicated by the application developer.

3. Automation of Referential Integrity Mechanisms

More sophisticated relational database management systems will ease the code generation burden by taking advantage of advanced capabilities. For example, on versions of SQL which support stored procedures and triggers, the present preprocessor can take advantage of these capabilities to automate the store and delete methods in the database itself, rather than in translator generated software. Thus, instead of generating extensive C++ code as in the above example, the present invention would generate the SQL code for creating stored procedures and enforcing integrity through triggers. The methods store( ), retrieve( ) and delete associated with an object would then become extremely simple routines which merely make calls to these stored procedures.

Strategies for preservation of referential integrity would now be embedded inside of triggers, rather than in the <object-name>::delete( ) method as shown above. This is not conceptually different, as the source SQL statement for defining these triggers can also be automatically generated.

DESCRIPTION OF NORMALIZATION

1. Automatic Third-Normal Form

It should be clear from the above description that the schema created by the present process are "naturally self-normalizing", i.e. due to the use of references both in the case of attribute-domain relationships between classes as well as hierarchy relationships between classes, the resulting schema automatically organizes itself in Third Normal Form.

To clarify this concept further, the following Table 4 illustrates the mapping from an object oriented class hierarchy to a traditional entity-relationship model used in relational database design.

TABLE 4

| OBJECT-ORIENTED DESIGN | ENTITY-RELATIONSHIP MODEL |
| --- | --- |
| object class | entity table |
| object instance | entity record |
| simple attribute | primitive-typed attribute column |
| class-valued attribute | foreign key into entity-attribute table |
| derived class (child : parent) | "is-a" relationship (child "is-a" parent) |
| derived attributes | fields from Join of parent and child entity records |

This is the normal mode under which the present invention functions. This can be readily converted to a table of basic rules under which the translation process converts object class hierarchy elements are translated into relational schema elements as follows:

TABLE 5

| OBJECT-CLASS HIERARCHY ELEMENT | RELATIONAL SCHEMA ELEMENT |
|---|---|
| object class | relational table |
| object instance | record |
| simple attribute | primitive-typed attribute column |
| class-valued attribute | foreign key into entity-attribute table |
| derived class (child : parent) | relational table with reference column to parent table |
| derived attributes | columns from join of parent and child entity records |

2. Class-Hierarchy De-normalization

To optimize performance, it may be desirable to use a technique called Class Hierarchy Flattening to avoid the overhead of performing several joins when retrieving the values of derived attributes. This means that the stored representation of every object instance contains not only its direct attributes, but also directly stores values for inherited attributes as well. Thus, processing a retrieval request is faster as we no longer have to search up the class hierarchy for values of inherited attributes.

In mapping the object class hierarchy to a relational schema, the technique of Class Hierarchy Flattening corresponds to Table De-normalization across what would ordinarily be join columns into the parent class tables. This implies that no tables are created for the parent class. Rather, the columns that would have constituted the parent class table, now directly become columns of the leaf class table, and the information is directly stored therein. Thus, retrieval operations need no longer perform joins (or select from views which perform joins) into the table for the parent class. This leads to faster performance.

The present invention has an option to perform this de-normalization during the preprocessing phase, to achieve Class Hierarchy Flattening. This is specified using an invocation-time option to the program. As usual, the preprocessor remembers the object class hierarchy during the preprocessing phase; however, it does not automatically generate a table definition for each class encountered. If a class has a derived class, no table is created for the class; rather, only the attributes and relations are remembered. Finally, when a leaf class (one that has no derived classes) is encountered, a table definition is created for it, which contains both the direct attributes for the leaf class and the remembered inherited attributes for each of its parent classes up the tree.

Under Class Hierarchy Flattening, there are no parental joins to be performed, and so the columns containing the references into the tables for the parent classes are no longer necessary. Multiple inheritance is not a problem, as attributes inherited from every parent class become columns in the entity table for the leaf class.

Under the flattening option, in the example above, no tables will be created for the classes ManagedObject and Modem, as they have subclasses that derive from them. Class V32modem does not, and so a table creation command will be generated for it as follows:

```
-- De-normalized table definition for V32modem under
-- flattened class hierarchy
create table V32modem
(
    obj_id NUMBER(10),       // Attributes inherited from class
                             // ManagedObject
    name CHAR(32),
    site NUMBER(10),
    vendor NUMBER(10),
    part_no NUMBER(6),
    adm_state NUMBER(6),
    oper_state NUMBER(6)
    dbkup NUMBER(6),         // Attributes inherited from class
                             // Modem
    txcar NUMBER(6),
    rxcar NUMBER(6),
    speed NUMBER(6),
    altspd NUMBER(6),
    nports NUMBER(6),
    txstat NUMBER(6),
    struc NUMBER(6),
    orient NUMBER(6),
    orig NUMBER(6)           // Direct attributes of class
                             // V32modem
);
```

Note that there are no join columns into the table for the parent class, as there are no tables for the parent class; all inherited attributes are stored directly in the table for the current object.

This also implies changes to the corresponding store, retrieve and delete functions, which now become much simpler, as they must now deal only with one table and no joins must be performed:

```
// Redefined version of V32modem::store( ) under de-normalized tables
void V32modem::store( )
{
    char sql_buffer[1024];
    int obj_id;
    int site_ref, vendor_ref;
// As before, obtain the reference values for Site and Vendor
// which must be inserted into the ManagedObject record.
    sprintf(sql_buffer, "SELECT obj_id FROM Site WHERE name = %s",
        this—>site.name);
    site_ref = atoi(sql_cmd(sql_buffer));
    sprintf(sql_buffer, "SELECT obj_id FROM Vendor WHERE name =
        %s", this—>vendor.name);
    vendor_ref = atoi(sql_cmd(sql_buffer));
// Under a flattened class hierarchy, records need only be
// inserted in the one table for that object class.
    obj_id = get_new_obj_id("V32modem");
    sprintf(sql_buffer, "INSERT INTO V32modem (obj_id, name, site,
        vendor, part_no, adm_state, oper_state, dbkup, txcar,
        rxcar, speed, altspd, nports, txstat, struc, orient,
        orig)
```

```
            VALUES (%d, '%s', %d, %d, %d, %d, %d, %d, %d, %d,
                %d, %d, %d, %d, %d, %d, %d);",
        obj_id, this—>name, site_ref, vendor_ref,
        this—>part_no, this—>adm_state, this—>oper_state
        this—>dbkup, this—>txcar, this—>rxcar,
        this—>speed, this—>altspd, this—>nports,
        this—>txstat, this—>struc, this—>orient);
        this—>orig);
        sql_cmd(sql_buffer); // Execute it
}

// Redefined version of V32modem::retrieve( )
// under de-normalized tables
void V32modem::retrieve(const char *value_str, const char
    *key_attributes="name")
{
    char sql_buffer[1024];
    char data_buffer[1024];
    sprintf(sql_buffer, "SELECT * FROM V32modem WHERE %s = %s",
        key_attribute, value_str);
    sql_select(sql_buffer, data_buffer);
    v32modem_parse(data_buffer, this);
            // Deconstruct retrieved values into "this"
}

// Redefined version of V32modem::delete( )
// under de-normalized tables
void V32modem::delete( )
}
    char sql_buffer[1024];
    sprintf(sql_buffer, "DELETE FROM V32modem WHERE name = %s",
        this—>name);
    sql_cmd(sql_buffer); // Execute it
}
```

Note that neither the table definitions nor the methods associated with class Site and class Vendor do not change under flattening, as they are stand-alone classes in the hierarchy, i.e. have no superclasses or subclasses, and therefore there is nothing to flatten. Class-hierarchy flattening only corresponds to table de-normalization under parent-child class relationships. All other kinds of relationships stay "naturally normalized".

The tradeoff is that now applications can never instantiate an object of the type of any parent class, as now there are no tables for the parent class in which this information could be stored! Only leaf-level objects may be instantiated. In practice, this is not a severe restriction, as most real-world applications only instantiate leaf-level classes. Parent classes are generally used as a modeling abstraction to express commonality and generalization relationships between leaf-level objects.

It is expected that the present invention will be used in the normal mode during preliminary development, prototyping, and testing, during which phase the object class hierarchy itself may not be stable. For production systems, once the object model is stable, it could be used with the flattening option so that the resulting schema will improve run-time performance.

Note that it makes no difference to any application whether or not this option is used, as the application does not know or care about the layout of the underlying relational schema; it only interfaces with the persistent storage through the use of the interface methods store, retrieve and delete.

THE OBJECT DICTIONARY

1. Description of the Object Dictionary

The present invention internally creates and maintains a class dictionary which contains a representation of the object class hierarchy. It uses this to remember inheritance and other relationships between classes. The present invention also has the facility of optionally outputting this object class dictionary in a relational tabular form, so that it may be queried by applications at runtime. This may be necessary depending on the semantics of the application.

The Object Dictionary contains metaclass information, or information about the overall schema of the application domain. The population of the Object Dictionary was described in detail in connection with FIG. 11. It contains the list of all classes, and includes information about attributes, superclasses, subclasses, and methods.

The Object Dictionary is itself relational in form and includes the following data structures:

TABLE 6

| OBJECT DICTIONARY TABLE: CLASS_HIERARCHY | | |
|---|---|---|
| class | superclass | visibility |
| | | |
| | | |

TABLE 7

| OBJECT DICTIONARY TABLE: CLASS_ATTRIBUTES | | | |
|---|---|---|---|
| class | superclass | attribute-type | attribute-visibility |
| | | | |
| | | | |

TABLE 8

| OBJECT DICTIONARY TABLE: CLASS_METHODS | | | | | |
|---|---|---|---|---|---|
| class | method-name | method-args | method-source | method-location | method-visibility |
| | | | | | |
| | | | | | |

The difference between the Object Dictionary tables and application domain tables is that the structure of Object Dictionary tables is fixed and immutable, and does not change with the application domain. The application domain tables may be considered "user" tables, i.e. those whose structure is determined depending on the nature of the C++ class declarations defined by the application developer, and parsed by the parser. The dictionary tables may be considered "system" tables, whose structure is predefined, but whose contents will change depending on the class definitions encountered.

The CLASS_HIERARCHY table has at least one entry per class. If a class has no parent classes, it has exactly one entry with a NULL value for its superclass. If a class is derived from exactly one parent class, it has exactly one entry with its parent class name in the superclass column. If a class has multiple parent classes, it has multiple entries in this table, with the same value in the class column but with different values in the superclass column. The visibility column indicates whether the derivation between the particular class-superclass pair is public, protected or private.

Thus, the CLASS_HIERARCHY table can be queried if necessary by applications at runtime. If necessary, applications could dynamically determine the structure of the class hierarchy, i.e. all parent and child classes for a given class, by issuing appropriate SQL statements querying this table.

The CLASS_ATTRIBUTES table contains a list of attributes for each class. There is exactly one entry in this table for every attribute of every class. The record indicates the name of the class possessing the attribute, the name of the attribute, and the type of the attribute. If the domain of the attribute is a primitive type (e.g. integer, string), this is indicated in the attribute-type column. If it is another class, this column now contains the name of that class. If it is a pointer to one of these types, the name of the type pointed to is stored, along with an indication of the level of indirection. The attribute-visibility column indicates the visibility of the attribute—public, protected or private. This column is dictionary information only, and does not affect the algorithms for persistent storage of the object.

This table may be queried by applications if they need to dynamically determine, for example, the list of attributes and their types for a given class.

The CLASS_METHODS table is similar, containing entries for every method in every class. In general, the representation of a method is stored with the class definition itself rather than with every object instance, since all instances of a given class share the same method. Specific instances of object variables become bound to the method at runtime.

The record indicates the name of class containing the member method in the class column, the name of the method in the method-name column, and the list of arguments it accepts in the method-args column. If the method is overloaded, multiple entries are recorded for the class-method pair, depending on the degree of overloading. For each such entry, however, the method-args column will be different. The column method-source indicates whether the method is a direct member of the class, is a virtual method (to be implemented subsequently by a subclass) or an inherited method (implemented earlier by a superclass).

As before, the method-visibility column is an informational column indicating the visibility of the method—public, protected or private. The column method-location may be used to point to the location of an implementation of that method, e.g. possibly the name of the file containing the compiled method code which is to be linked into an application executable program. Alternately, if the RDBMS supports large text or unstructured data (BLOBs, or Binary Large Objects) the method-location may be replaced by a method-text column to directly store the source or the compiled code for the method, in the database itself.

For the purposes of the object dictionary, operators defined for a class are treated as methods and are also stored in the CLASS_METHODS table, with identical semantics. (It should be noted that the CLASS_METHODS table above is not strictly normalized, since the method-args column is list-valued and could possibly contain repeating groups. For strict normalization this should really be split up into two tables, which can be joined together using an method-index column. The second table would contain one record for each argument for each method instance in each class. This is a further improvement which can be made to the present invention).

2. Generation of the Object Dictionary

Under the object dictionary option, the present process will always output the SQL commands to create the table structures shown above. The specific SQL commands are not shown for brevity. A single unique index is created for the pair of columns (class, superclass) on table CLASS_HIERARCHY; another for the pair of columns (class, attribute-name) on table CLASS_ATTRIBUTES; and another unique index for the triad of columns (class, method-name, method-args) on table CLASS_METHODS.

As soon as processing begins and a class structure is recognized, appropriate SQL INSERT statements are issued to populate the above tables with the details of the structure of each class. Thus, the complete nature of a C++ class can be captured in the above three relational tables, which together constitute the Object Dictionary. Note that the dictionary entries depend only the source class hierarchy and not any other representation of it. Therefore, the content of the dictionary will be the same whether or not the relational representation of the hierarchy is de-normalized under the flattening option.

3. Use of the Object Dictionary

Runtime applications which require to determine the nature of the class hierarchy and the relationships between them, can do so by querying the Object Dictionary. It should be pointed out that the contents of the Object Dictionary will never change at runtime, since C++ is a statically bound language in which the object schema must be completely declared at compile time. Since class definitions cannot be created, destroyed or modified at runtime, the contents of the Object Dictionary will be static until such time as the system is recompiled and the preprocessor re-parses new class declarations. Further, since not all applications require this facility, the Object Dictionary is only generated as an option.

4. Name Space Support

The design described above assumes that every object instance possesses its own name space, i.e. the object identifier for a given type of object is unique only within all other objects of that type. Therefore, a unique object is specified using the identifier pair object-id, instance-id, which in the above representation maps to table-name, obj_id-value. This is because the new-object-id generator function is currently set up to only return a unique object id from the name space of the current object type.

This can be optionally changed if necessary, so that all objects have a common name space irrespective of their type, and thus could be specified merely using an instance-id. This can be accomplished by re-implementation of the new-object-id generator function to draw a unique identifier from a global name space. This may be desirable depending on the semantics of the application, and the process may offer this facility optionally. A re-coded implementation of the get_new_obj_id function is generated, with appropriate changes to the underlying data structures to support a globally unique name space.

Under this option, the data structure defining the global name space will be a relational table, and will also be part of the Object Dictionary. This will be a special table whose contents will change at runtime, as objects are instantiated and destroyed.

Figure 32A:
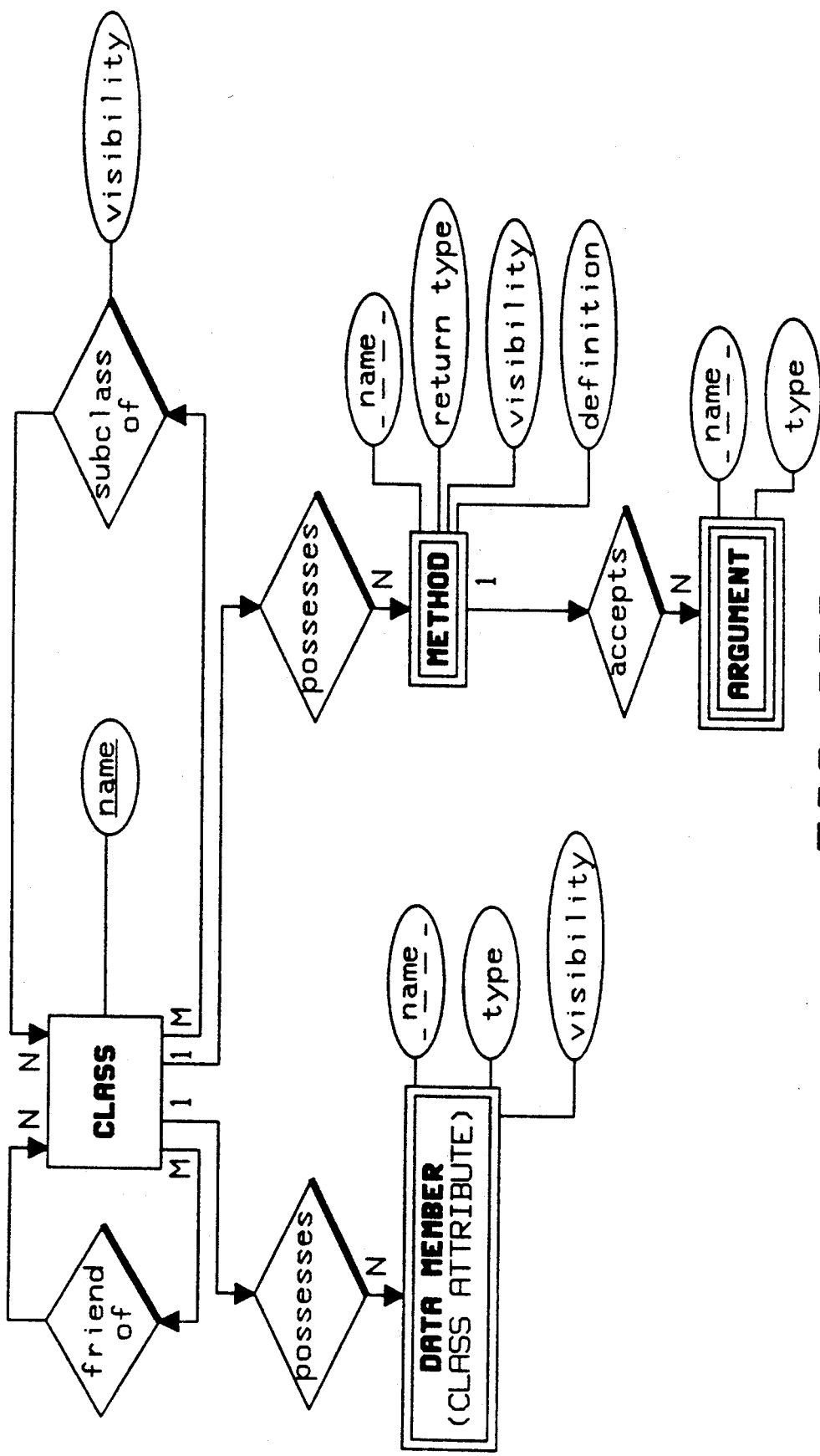
FIG. 32A is an entity relationship diagram describing the relationships between classes, attributes, methods and argument.
Figure 32B:
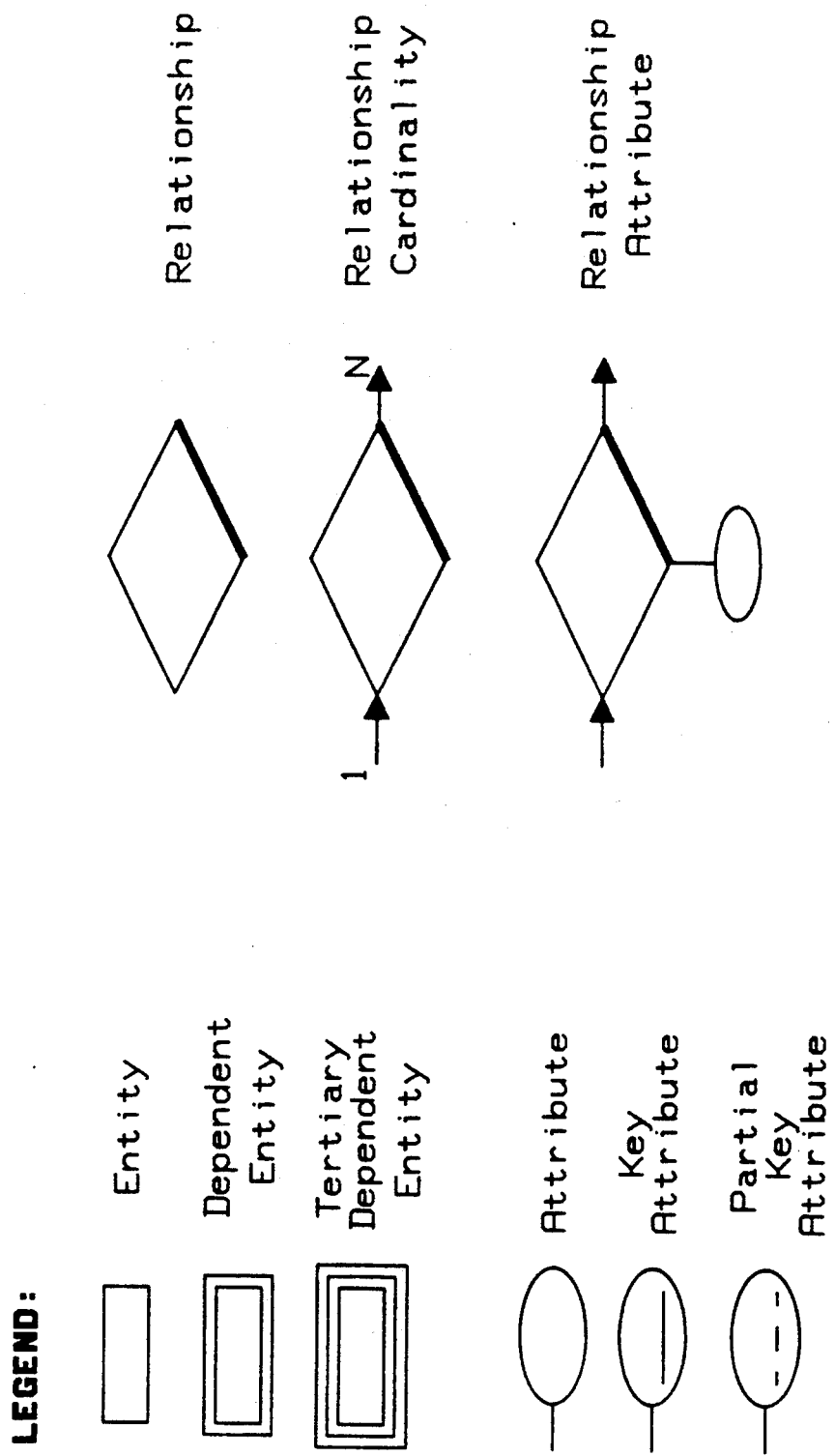
FIG. 32B is a continuation of the entity relationship diagram describing the relationships between classes, attributes, methods and argument shown in FIG. 32A.

FIG. 32, which is shown divided into two sheets labeled 32A and 32B, is an entity relationship diagram describing the relationships between classes, attributes, methods and argument. In this diagram the following relationship are described. Class is a subclass of another class. A member is possessed by a class. A method is possessed by a class. An argument is accepted by a method. Each attribute of each one of these entities described is indicated in the ellipse with the primary or identifying attribute indicated by an underscored line. This diagram is self-explanatory to those familiar with such diagrams and is redundant to information already provided. Accordingly, no further discussion is provided.

Figure 33:
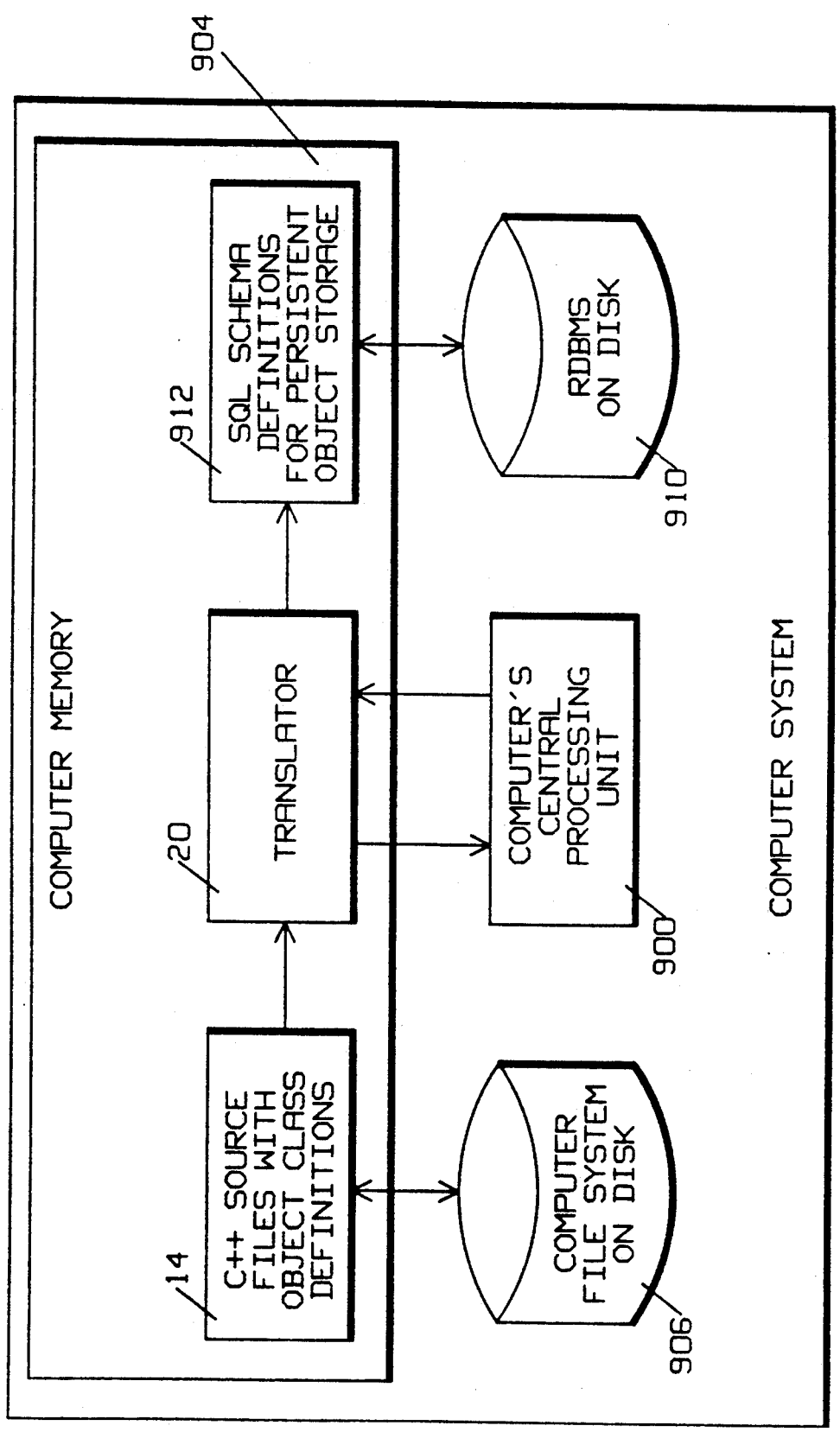
FIG. 33 is a diagram of a computer system implementing the compile time portion of the preferred embodiment of the present invention.

Referring now to FIG. 33, a computer system used to implement the pre-compile time portion of the present invention is shown. This may be a stand-alone system or network of computers. At compile time, the process described grossly by step 114 (and steps 112 and 118) is implemented. The computer system of FIG. 33 includes one or more Central Processing Units (CPU) 900 for processing all of the respective code as well as computer memory (e.g. RAM memory) 904 which at compile time holds the OOP (e.g. C++) object definition portion 14 (at least) of the source code which is read off the file system 906 as well as the portion of the translator 20 which performs the precompiler operations. Also present is the Relational Database which resides on a disk 910. At this time, the source code is pre-processed to produce the relational schema 912 (that is the table definitions, etc.) and methods which can, if desired, be stored in persistent storage (e.g. a disk drive). After the compile time operation is completed, those skilled in the art will appreciate that other operations may be carried out on a separate computer system at run-time. Other variations of the actual hardware configurations are possible without departing from the invention. In addition, each of the disks may be network disks and the computer system may take on various actual hardware configurations.

Figure 34:
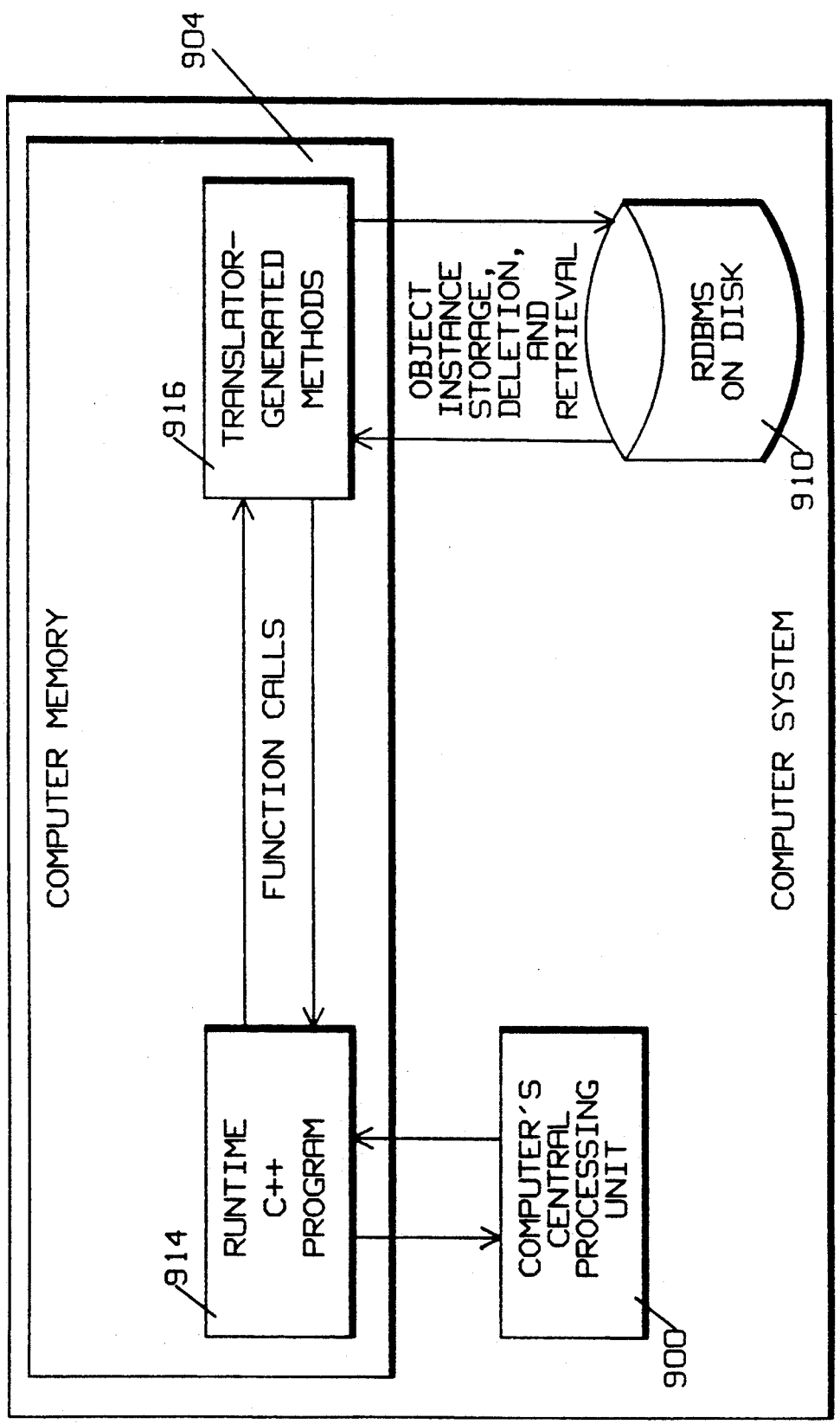
FIG. 34 is a diagram of the computer system of FIG. 33 implementing the runtime portion of the preferred embodiment of the present invention.

The runtime operation and configuration of the system is shown in FIG. 34 in which the memory 904 now contains the compiled runtime C++ code 914 as well as the methods 916 generated by the translator of the present invention. These methods are called by the runtime object-oriented program to instantiate the objects as required to the tables defined by the pre-compiler portion of the translation process. These tables may reside in the RDBMS 910. That is, these methods are called to read, add, delete or update the records of the various tables resulting in the retrieval, storage, deletion, and modification of object instances in persistent storage.

Those skilled in the art will appreciate that many variations are possible without departing from the present invention. It is also noteworthy that one can translate from the tables generated by the process herein back to the object class hierarchy if desired. Also, if tables were originally properly generated from such a hierarchy, a process opposite that described can be used to translate from a relational schema to an object class hierarchy. Many variations of the present invention are possible by using other languages than those specifically described. Also, many rearrangements, variations and permutations of the process steps are possible without departing from the present invention.

Thus it is apparent that in accordance with the present invention, an apparatus that fully satisfies the objectives, aims and advantages is set forth above. While the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the scope of the appended claims.

What is claimed is:

1. A method for a computer to translate an object class hierarchy into a relational schema, comprising in combination the steps of:

providing said computer with a computer memory;

providing in said computer memory a first computer program having at least one class hierarchy organization of object-oriented information and being in source code form, said class hierarchy organization comprising at least one parent class of objects having a first attribute and one derived class including at least one of said objects of said parent class, said derived class having a second attribute, said derived class inheriting said first attribute from said parent class;

analyzing said first computer program with a second computer program to locate automatically said class hierarchy organization;

using said second computer program to create automatically from said located class hierarchy organization a first source code routine in said computer memory for defining a first table structure, corresponding to said parent class, including a first table name, said first table structure including:

a first instance identifier field for storing a unique first instance identifier for each particular object instance of one of said objects, and a first attribute field for storing an attribute instance of said first attribute for said each perpendicular object instance, said first instance identifier field and said first attribute field composing a record of said first table structure;

using said second computer program to create automatically from said located class hierarchy organization a second source code routine for defining a second table structure, corresponding to said derived class, including a second table name, said second table structure including:

a second instance identifier field for storing a second instance identifier which identifies said particular object instance of said one of said objects included said derived class, and a second attribute field for storing an attribute instance of said second attribute for said particular object instance of said one of said objects included in said derived class, said second instance identifier field and said second attribute field composing a record of said second table structure; and referencing said second identifier field to said first identifier field.

2. The method of claim 1, wherein said referencing step comprises placing identical said instance identifiers in said first and second instance identifier fields.

3. The method of claim 2, further comprising the step of using said second computer program to create automatically a third source code routine in said computer memory for joining said record of said first table structure to said record of said second table structure by using said instance identifier in said first and second instance identifier fields to extract said attribute instances of said first and second attribute fields for said particular object instance, whereby said derived class inheriting said first attribute from said parent class of said class hierarchy is preserved in said relational schema.

4. The method of claim 1, further comprising the step of using said second computer program to create automatically a third source code routine in said computer memory for querying said table structures using a "JOIN" operator from SQL to find said instances of said attributes in said records having said first and second instance identifier fields referenced.

5. The method of claim 3, further comprising the step of compiling said first program and said third source code routines to create a run-time computer program stored in said computer memory.

6. The method of claim 5, further comprising the step of storing said table structures in a persistent media operatively coupled to said computer.

7. The method of claim 1, further comprising the step of generating a source code routine for a set of dictionary tables which contain information adequate to define the class hierarchy relationship.

8. The method of claim 1, wherein said steps of creating said source code routines includes creating said source code routines for constructing SQL commands to create said table structures; and further including the steps of providing a relational database management system stored in a persistent memory and sending said SQL commands to said relational database management system to cause said table structures to be generated and stored in said persistent memory.

9. The method of claim 8, wherein said SQL commands are generated using function call syntax.

10. The method of claim 8, wherein said SQL commands are generated using imbedded precompiler syntax.

11. The method of claim 1, further comprising the step of generating a source code routine for creating a view of said second table structure which includes a join into said first table structure.

12. The method of claim 1, further comprising the step of using said second computer program to create automatically additional source code routines in said computer memory for storage, deletion and retrieval of object instances in said table structures.

13. The method of claim 12, further comprising the step of generating a source code routine for checking referential integrity upon deletion of said particular instance from said table structures.

14. The method of claim 1, further comprising the step of generating source code creating indexes on said table structures.

15. An apparatus for translating information represented as an object-class hierarchy into a relational table schema, comprising in combination:

central processing means;

computer memory means, operatively coupled to said central processing means, for temporary storage of information;

a computer program, stored in said computer memory means in source code form, including at least one data organization in the form of said object class hierarchy, said object class hierarchy being for object-oriented data and including at least one parent class of objects having a first attribute and one derived class of at least one of said objects having a second attribute, said derived class inheriting said first attribute from said parent class;

schema translator means, stored in said computer memory, for locating automatically said object class hierarchy in said computer program and for translating said object class hierarchy into said relational table schema;

said schema translator means including first table means for defining automatically in said relational table schema a first table structure, corresponding to said parent class, including a first table name, said first table structure including:

a first instance identifier field for storing a first instance identifier which identifies a particular object instance of said one object, and a first attribute field for storing an attribute instance of said first attribute for said one object, said first instance identifier field and said first attribute field comprising a record of said first table structure;

said schema translator means further including second table means for defining automatically in said relational table schema a second table structure, corresponding to said derived class, including a second table name, said second table structure including:

a second instance identifier field for storing a second instance identifier which identifies said particular object instance of said one object, and a second attribute field for storing an attribute instance of said second attribute for said one object, said second instance identifier field and said second attribute field comprising a record of said second table structure; and said schema translator means further including reference means for said relational table schema to reference said second instance identifier field to said first instance identifier field.

16. The Apparatus of claim 15, wherein said schema translator means further includes joining means for creating automatically said relational table schema to have means for extracting from said table structures said instances of said first and second attributes for said particular object instance by using said referencing of said second identifier field to said first identifier field, whereby said derived class inheriting said first attribute from said parent class of said class hierarchy is preserved in said relational schema.

17. The apparatus of claim 15, wherein said reference means is adapted for placing identical instance identifier information in said first and second instance identifier fields.

18. The apparatus of claim 17, further comprising means for joining said record of said first table structure to said record of said second table structure by using said instance identifier information in said first and second instance identifier fields to extract said attribute instances from said first and second attribute fields for said particular object instance, whereby said derived class inheriting said first attribute from said parent class of said class hierarchy is preserved in relational schema.

19. The apparatus of claim 15 wherein said schema translator means translates elements of said object class hierarchy into elements of said relational table schema according to the following table:

| OBJECT-CLASS HIERARCHY ELEMENT | RELATIONAL SCHEMA ELEMENT |
| --- | --- |
| object class | relational table |
| object instance | record |
| simple attribute | primitive-typed attribute column |
| class-valued attribute | foreign key into entity-attribute table |
| derived class (child : parent) | relational table with reference column to parent table |
| derived attributes | columns from Join of parent and child entity records |

20. The apparatus of claim 15, further comprising means for generating a source code routine for a set of dictionary tables which contain information adequate to define the class hierarchy relationship.

21. The apparatus of claim 15, wherein said first and second table means automatically are operable for generating source code routines for constructing SQL commands to create said first and second table structures, respectively; and further comprising a relational database management system stored in a persistent memory and means for sending said SQL commands to said relational database management system to cause said table structures to be generated and stored in said persistent memory.

22. The apparatus of claim 21, wherein said SQL commands are generated using function call syntax.

23. The apparatus of claim 21, wherein said SQL commands are generated using imbedded precompiler syntax.

24. The apparatus of claim 15, further comprising means for generating a source code routine for creating a view of said second table structure which includes a join into said first table structure.

25. The apparatus of claim 16, further comprising means for generating a source code routine for checking referential integrity upon deletion of said particular object instance from said table structures.

26. The apparatus of claim 15, further comprising means for for generating a source code routine for creating indexes on said table structures.

27. The apparatus of claim 15, wherein said translator means further includes means for generating automatically a plurality of computer routines for storage, deletion and retrieval of said particular object instance in said table structures.

* * * * *